United States Patent
Kutch et al.

(10) Patent No.: US 12,026,116 B2
(45) Date of Patent: Jul. 2, 2024

(54) NETWORK AND EDGE ACCELERATION TILE (NEXT) ARCHITECTURE

(71) Applicant: Intel Corporation, Santa Clara, CA (US)

(72) Inventors: Patrick G. Kutch, Tigard, OR (US); Andrey Chilikin, Limerick (IE); Niall D. McDonnell, Limerick (IE); Brian A. Keating, Shannon (IE); Naveen Lakkakula, Chandler, AZ (US); Ilango S. Ganga, Cupertino, CA (US); Venkidesh Krishna Iyer, Chandler, AZ (US); Patrick Fleming, Slatt Wolfhill (IE); Lokpraveen Mosur, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 17/134,361

(22) Filed: Dec. 26, 2020

(65) Prior Publication Data
US 2021/0117360 A1   Apr. 22, 2021

Related U.S. Application Data

(60) Provisional application No. 63/022,193, filed on May 8, 2020.

(51) Int. Cl.
*G06F 13/40* (2006.01)
*G06F 3/06* (2006.01)
(Continued)

(52) U.S. Cl.
CPC ........ *G06F 13/4027* (2013.01); *G06F 3/0604* (2013.01); *G06F 3/061* (2013.01);
(Continued)

(58) Field of Classification Search
None
See application file for complete search history.

(56) References Cited

U.S. PATENT DOCUMENTS 8,862,783 B2   10/2014   Yadlon et al.
9,641,435 B1   5/2017   Sivaramakrishnan
(Continued)

FOREIGN PATENT DOCUMENTS

KR   20140141348 A   12/2014
WO   2016003489 A1   1/2016

OTHER PUBLICATIONS

Intel, "NFV Reference Design for a Containerized vEPC Application", ZTE, White Paper, © 2017 Intel Corporation, Jun. 20, 2017, 23 pages.
(Continued)

*Primary Examiner* — Scott C Sun
(74) *Attorney, Agent, or Firm* — Compass IP Law PC

(57) ABSTRACT

Examples described herein include a system comprising: a processing unit package comprising: at least one core and at least one offload processing device communicatively coupled inline between the at least one core and a network interface controller, the at least one offload processing device configurable to perform packet processing. In some examples, the at least one offload processing device is to allow mapping of packet processing pipeline stages of networking applications among software running on the at least one core and the at least one offload processing device to permit flexible entry, exit, and re-entry points among the at least one core and the at least one offload processing device.

26 Claims, 48 Drawing Sheets

(51) Int. Cl.
G06F 9/50 (2006.01)
G06F 12/0802 (2016.01)
G06F 13/42 (2006.01)

(52) U.S. Cl.
CPC .......... G06F 3/0656 (2013.01); G06F 3/0679 (2013.01); G06F 9/5083 (2013.01); G06F 12/0802 (2013.01); G06F 13/4221 (2013.01); G06F 2212/6042 (2013.01); G06F 2213/0026 (2013.01); G06F 2213/40 (2013.01)

(56) References Cited

U.S. PATENT DOCUMENTS

| | | | |
|---|---|---|---|
| 10,225,183 | B2 | 3/2019 | Chayat et al. |
| 2013/0254766 | A1 | 9/2013 | Zuo et al. |
| 2013/0318275 | A1 | 11/2013 | Dalal |
| 2013/0340977 | A1* | 12/2013 | Singleton ................ F28D 15/02 165/104.11 |
| 2013/0343408 | A1 | 12/2013 | Cook et al. |
| 2014/0201417 | A1 | 7/2014 | Dalal et al. |
| 2016/0092238 | A1 | 3/2016 | Codrescu et al. |
| 2017/0063808 | A1 | 3/2017 | Manapragada et al. |
| 2018/0152540 | A1 | 5/2018 | Niell et al. |
| 2019/0124054 | A1* | 4/2019 | Zhang ................... H04W 12/10 |
| 2020/0192757 | A1 | 6/2020 | Qin et al. |

OTHER PUBLICATIONS

First Office Action for U.S. Appl. No. 15/931,476, dated Jun. 1, 2023, 14 pages.
International Search Report and Written Opinion for PCT Patent Application No. PCT/US20/65076, dated Apr. 9, 2021, 9 pages.
International Search Report and Written Opinion for PCT Patent Application No. PCT/US20/67073, dated May 6, 2021, 13 pages.
"5G User Plane Function (UPF)—Performance with ASTRI", Intel Solution Brief, Jun. 8, 2020, 6 pages.
"5G; System architecture for the 5G System (5GS) (3GPP TS 23.501 version 15.5.0 Release 15)", ETSI, Technical Specification, (Apr. 2019) 242 pages.
"Intel Ethernet Adaptive Virtual Function (AVF) Hardware Architecture Specification (HAS)", Intel, Networking Division, Feb. 5, 2018, 90 pages.
"TCP Offload Engine (TOE)", Chelsio Communications, https://www.chelsio.com/nic/tcp-offload-engine/, downloaded from the internet Dec. 27, 2022, 1 page.
"What is a semiconductor package substrate?", Toppan Electronics, https://www.toppan.co.jp/electronics/english/package/semicon/, downloaded from the internet Dec. 27, 2022, 3 pages.
"What is the 5G User Plane Function (UPF)?", Metaswitch, https://www.metaswitch.com/knowledge-center/reference/what-is-the-5g, Aug. 16, 2020, 5 pages.
Benton, Brad, "CCIX, GEN-Z, OpenCAPI: Overview & Comparision", Openfabrics Alliance, AMD, 13th Annual Workshop 2017, Mar. 2017, 16 pages.
Go, Younghwan, et al., "APUNet: Revitalizing GPU as Packet Processing Accelerator", School of Electrical Engineering, KAIS, Feb. 26, 2017, 14 pages.
King-Smith, Tony, "Offload now, or your CPU dies!", aiMotive Team, https://medium.com/aimotive/offload-now-or-your-cpu-dies-ae1d9c5aec3c, Aug. 30, 2019, 14 pages.
Shainer, Gilad, "Offloading vs. Onloading: The Case of CPU Utilization", HPC Wire, https://www.hpcwire.com/2016/06/18/offloading-vs-onloading-case-cpu-utilization/, Jun. 18, 2016, 3 pages.
Tian, Kevin, "Intel® Scalable I/O Virtualization", LF Asia, LLC, Jun. 24, 2018, 21 pages.
Adrian M Caulfield et al: "A cloud-scale acceleration architecture", MicroArchitecture, IEEE Press, 445 Hoes Lane, PO Box 1331, Piscataway, NJ, 08855-1331USA, Oct. 15, 2016 (Oct. 15, 2016), pp. 1-13, 13 pages.
Extended European Search Report for Patent Application No. 20934614.7, Mailed May 6, 2024, 12 pages.
Krishnan Venkata et al: "COnfigurable Network Protocol Accelerator (COPA) + : An Integrated Networking/Accelerator Hardware/Software Framework", 2020 IEEE Symposium on High-Performance InterConnects (HOTI), IEEE, Aug. 19, 2020 (Aug. 19, 2020), pp. 17-24, 8 pages.
Liu Ming et al: "Offloading distributed application onto smartNICs using iPipe", Data Communication, ACM, 2 Penn Plaza, Suite 701New YorkNY 10121-0701USA, Aug. 19, 2019 (Aug. 19, 2019), pp. 318-333, 16 pages.

* cited by examiner

NETWORK AND EDGE ACCELERATION TILE (NEXT) ARCHITECTURE

RELATED APPLICATION

The present application claims the benefit of a priority date of U.S. provisional patent application Ser. No. 63/022,193, filed May 8, 2020, the entire disclosure of which is incorporated herein by reference.

DESCRIPTION

Computing devices include hardware components such as processors, memory, and a communications interface. With ever increasing cloud functionality and volumes of data, the speed of operation of hardware devices is also increasing. In some cases, the hardware devices can be coupled together using conductive leads on a circuit board to permit communications and device inter-operation. Other models of inter-operation can be used such as distributed computing whereby devices communication using a local network or the Internet and using packet-based communication.

DETAILED DESCRIPTION

Figure 1:
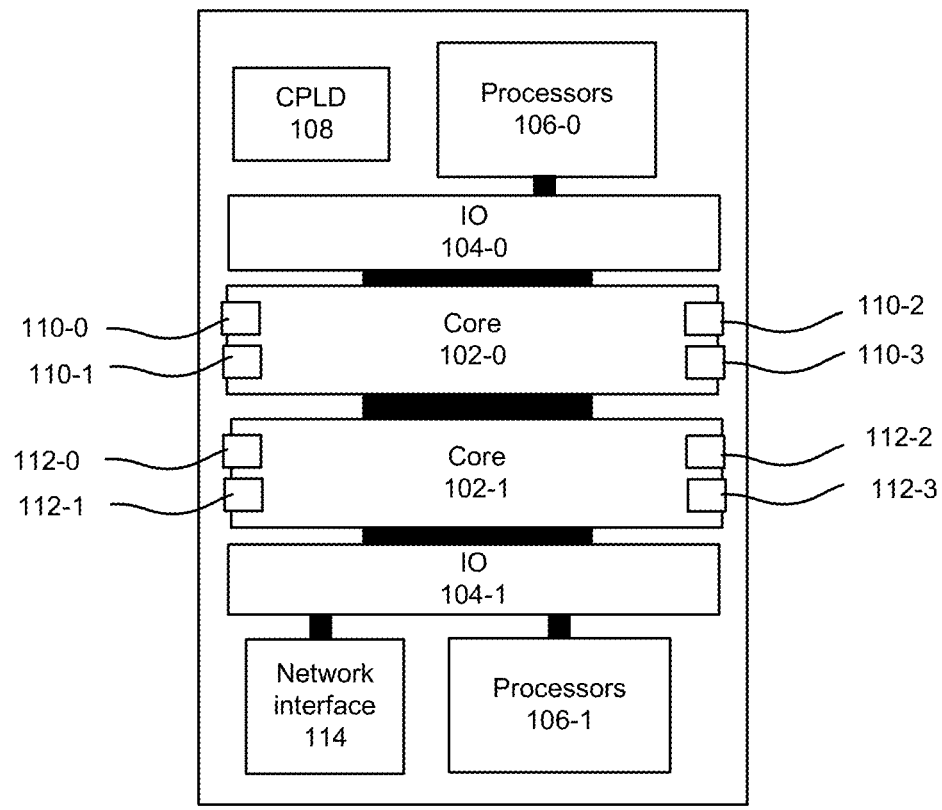
FIG. 1 depicts an example architecture.

Networking applications are increasing in speed and performance requirements. Accordingly, augmenting computing architecture with targeted acceleration capabilities may be needed to achieve the target performance for complex networking workloads. Examples of network processing workloads include, but are not limited to, 5G base stations, 5G User Plane Function (UPF) solutions, virtual Cable Modem Termination Systems (CMTS), Next Generation Firewall (NGFW), routers, load balancers, and more.

The number of general purpose computing cores can be scaled or increased to achieve higher performance. However, there is a ceiling to the total number of cores that can be practically integrated in a single socket with a reasonable power performance ratio at a reasonable cost with a certain process technology. Network processors (also known as Network Processing Units, or NPUs) can be used to achieve higher packet processing capability. NPUs can utilize a specific programming environment that has difficulty in porting the software from generation to generation or to other processing architectures. Software porting (or migration) takes lot of investment and longer time to market (TTM) compared to general purpose compute. Hardware accelerators based on Application Specific Integrated Circuits (ASICs) can be used to achieve target performance at lower power and/or at lower cost. However, ASICs are designed to work with specific applications (or workloads) and are not flexible to run other applications (workloads). The degree of programmability is limited and requires different ASICs to be built for different applications.

Overview

Various embodiments provide an offload processing device inline between a network interface controller (NIC) and CPU to perform pre-processing of received (ingress)

packets, post-processing of egress packets (e.g., packets to be transmitted by the NIC as well as fast path processing or lookaside processing. Fast path processing can include actions programmed to be executed fully in the offload processing device without forwarding packets to a virtual network function (VNF). Lookaside processing can include a CPU executing software offloading processing tasks to the offload processing device.

Various embodiments provide a software-defined hardware pipeline to program mapping of packet processing pipeline stages of networking applications among software running on the one or more cores and the offload processing device to permit flexible entry, exit, and re-entry points among the one or more cores and the offload processing device.

Various embodiments provide use of peer-2-peer (P2P) communication between a NIC and the offload device for ingress and egress packets. Ingress packets received at the NIC can be directed to the offload processor, rather than to host memory of the CPU. The offload processor can perform pre-processing on packets before providing packets to host memory and signaling the CPU that the packet has arrived. For egress traffic, using a P2P communication, the offload processor can be configured to perform post-processing on packets, before sending packets to the network interface. Various embodiments provide for use of input-output memory management unit (IOMMU) Address Translation to permit splitting header and payload so that a header and/or payload can be provided to the offload processor or CPU.

Various embodiments provide for partitioning of applications to run in software on general purpose computing cores and/or partly on the hardware accelerators depending on the workload.

Various embodiments provide a central processing unit (CPU) complex with a CPU communicatively coupled with software-defined configurable packet processing devices to provide general purpose computing and acceleration of processing of networking application workloads. Various embodiments provide a workload accelerator (e.g., Network and Edge Acceleration Tile (NEXT) or workload acceleration technology (WAT)) that integrates targeted programmable acceleration hardware with general purpose computing cores in the CPU complex to take advantage of higher bandwidth connectivity in the CPU fabric and low latency access to CPU cache and memory hierarchy. Coupling targeted packet processing acceleration to a CPU fabric can provide performance scaling (e.g., terabit/s, or lower or higher rates), and allow for use of cache and memory hierarchy for packet processing purposes. Use of general-purpose compute can provide for ease of programmability and software development.

Various embodiments provide for a network interface controller (NIC) to provide ingress traffic to a packet processing pipeline. The packet processing pipeline can be distributed over one or more packet processing devices and general purpose computing (e.g., CPU). A Network Interface Manager (NIM) can receive traffic from the NIC and manage queue descriptors and storage of buffer content in one or more memory devices before passing packets to the next stage of a packet processing pipeline. Various embodiments provide a mechanism by which ingress packets placed within NIM memory can be sent to the next stage out of order to achieve separation of the slow and fast data path improving overall system performance and latency.

Various embodiments provide a packet processing pipeline that resides within the CPU package and is communicatively coupled to the CPU using an IO die, which in turn is connected to one or more PCIe lanes. The CPU can receive traffic from a physical NIC port directly over the IO die and the NIC port (e.g., VF, MDEV, etc.) can be configured to copy data via DMA directly into a memory within the NEXT die. In some examples, the packet processing pipeline can be a separate device and coupled to a CPU using a device interface. The packet processing pipeline and CPU can be built as Multi-Chip-Packages (MCP), System-On-Chip (SoC) or as combination of MCP/SoC and discrete devices connected over PCIe bus. In some examples, NEXT, WAT or a smartNIC can be integrated in CPU or xPU inside a package.

DMA can allow an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations. Without DMA, when the CPU or core is using programmed input/output, the CPU or core is typically occupied for the entire duration of a read or write operation and is unavailable to perform other work. With DMA, the CPU or core can, for example, initiate a data transfer, and then perform other operations while the data transfer is in progress. The CPU or core can receive an interrupt from a DMA controller when the data transfer is finished.

When the workload accelerator receives a packet, workload accelerator can process the packet (or portions thereof), such as sending packet on to a Virtual Network Function (VNF) executing in the host or decrypting the packet inline with a cryptography component. The workload accelerator can include a Network Interface Manager (NIM) that is responsible for sending traffic from and to a NIC attached to the IO die. The NIM can behave as a poll mode driver, reading the descriptors, checking for incoming packets, and when a packet is received, classifying the packet for priority and then providing the packet to packet processor (e.g., Flexible Packet Processor (FXP)) for processing. The workload accelerator can include a Host Interface Manager (HIM) that can provide an interface to a host, a FXP, a Traffic Manager (TM) or security component for the encryption and decryption activities.

A VNF can dynamically program a flow for traffic based upon rules, such as to drop packets, let the packets proceed, decrypt the packets on ingress and so forth and assign priority to a flow based on some fields present in the packet's header. Some actions can be programmed to be executed fully in the workload accelerator without forwarding packets to VNF, providing fast path processing in the workload accelerator.

Various embodiments provide for support of NICs from multiple vendors. For example, a Network Interface Manager (NIM) can perform descriptor translation from a descriptor format provided by software executed on a core to a second descriptor format accepted by a network interface controller.

Various embodiments allow mapping the packet processing pipeline stages of networking applications (e.g., 5G UPF, NGFW, transport layer security (TLS), packet metering) between software running on general purpose compute cores and programmable hardware engines of the workload accelerator using configurable and flexible entry, exit, and re-entry points.

Example Embodiments

FIG. 1 depicts an example CPU architecture. In this example, a physical package can include discrete dies and tiles connected by mesh or other connectivity as well as an interface (not shown) and heat dispersion (not shown). A die can include semiconductor devices that compose one or more processing devices or other circuitry. A tile can include semiconductor devices that compose one or more processing devices or other circuitry. For example, a physical CPU package can include one or more dies, plastic or ceramic housing for the dies, and conductive contacts that conductively coupled to a circuit board.

Core tile 102-0 and core tile 102-1 can include one or more cores. A core can be an execution core or computational engine that is capable of executing instructions. A core can access to its own cache and read only memory (ROM), or multiple cores can share a cache or ROM. Cores can be homogeneous (e.g., same processing capabilities) and/or heterogeneous devices (e.g., different processing capabilities). Frequency or power use of a core can be adjustable. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Cores may be coupled via an interconnect to a system agent (uncore). System agent can include a shared cache which may include any type of cache (e.g., level 1, level 2, or last level cache (LLC)). System agent can include one or more of: a memory controller, a shared cache, a cache coherency manager, arithmetic logic units, floating point units, core or processor interconnects, or bus or link controllers. System agent or uncore can provide one or more of: direct memory access (DMA) engine connection, non-cached coherent master connection, data cache coherency between cores and arbitrates cache requests, or Advanced Microcontroller Bus Architecture (AMBA) capabilities. System agent or uncore can manage priorities and clock speeds for receive and transmit fabrics and memory controllers.

Core tiles 102-0 and 102-1 can be conductively connected together using a high speed interconnect compatible with any of Intel QuickPath Interconnect (QPI), Intel Ultra Path Interconnect (UPI), Intel On-Chip System Fabric (IOSF), Omnipath, Compute Express Link (CXL) (see, for example, Compute Express Link Specification revision 2.0, version 0.7 (2019), as well as earlier versions, later versions, and variations thereof). The number of core tiles is not limited to this example can be any number such as 4, 8, and so forth. Core 102-0 can include various interfaces 110-0 to 110-3, although any number of interfaces can be used. For example, any interface 110-0 to 110-3 can be compatible with Peripheral Component Interconnect express (PCIe), or other standards. Likewise, core 102-1 can include various interfaces 112-0 to 112-3, although any number of interfaces can be used. For example, any interface 112-0 to 112-3 can be compatible with Peripheral Component Interconnect express (PCIe), or other standards. See, for example, Peripheral Component Interconnect (PCI) Express Base Specification 1.0 (2002), as well as earlier versions, later versions, and variations thereof.

Core tile 102-0 can be conductively connected with input output (IO) device 104-0 using a high speed interconnect compatible at least with any standard described herein. Likewise, core tile 102-1 can be conductively connected with input output (IO) device 104-1 using a high speed interconnect compatible at least with any standard described herein. IO device 104-0 can be formed on a separate integrated circuit or die as that of core tile 102-0 and/or offload processors 106-0. Likewise, IO device 104-1 can be formed on a separate integrated circuit or die as that of core 102-1 and/or offload processors 106-1.

Offload processors 106-0 and 106-1 can be available as offload engines for respective core 102-0 and core 102-1. Offload processors 106-0 and 106-1 can reside within a same CPU package as that which houses and provides connectivity to a circuit board for one or more of: IO 104-0, IO 104-1, core 102-0, core 102-1, and network interface 114. For example, offload processors 106-0 and 106-1 can include accelerators (e.g., fixed or programmable circuitry) for operations such as packet processing, cipher (e.g., encryption or decryption), access control list, applied machine learning (ML), or other operations. For example, offload processors 106-0 can receive packet traffic from a physical port of network interface 114 (e.g., Ethernet Controller) directly via IO 104-0. One or more ports of network interface 114 (e.g., virtual function (VF), mediated device and so forth) can be configured to copy data directly into a memory (e.g., by direct memory access (DMA)) of offload processors 106-1 via a software component (e.g., Control Plane Application (CPA) that executes in user space). When data from offload processors 106-1 is to be transmitted using network interface 114, offload processors 106-1 can copy data to host memory (not shown) and notify network interface 114 there is data to be transmitted.

Memory available for use by offload processors 106-1 can be limited and small compared to the size available in host memory. In some cases, network interface 114 or another device (e.g., core 102-1) can send data at un-deterministic rates (e.g., slow, fast, or bursty) to offload processors 106-1 and due to a limited size of memory buffers of offload processors 106-1, data may be copied into and out of memory buffers of offload processors 106-1 to host memory repeatedly or often and each data copy can introduce latency in the completion of an operation or availability of data as well as use of interface bandwidth for each data copy that can reduce interface bandwidth available for other uses or other devices. For example, egress traffic can be copied from offload processors 106-1 to host memory and then from host memory to network interface 114 due to limited buffer space available within offload processors 106-1.

Various embodiments provide for an offload engine (e.g., processors) to select available buffer space within the offload engine or host memory to attempt to reduce an amount of copy operations between host memory and the buffer. For example, to reduce latency or reduce utilized interface bandwidth, content can be copied from a processor buffer to host or system memory based on one or more of: buffer space is low on space, data is higher latency or lower priority, or available bandwidth through an interface between the buffer and the host memory.

Various embodiments can reduce latency of data availability or transmission and reduce usage of interface bandwidth by not copying all traffic to the host memory and storing some traffic in buffers. For example, for a data transmission operation, retaining data in buffers can reduce an amount of copy operations and data can be available to transmit sooner than if the data were copied to host memory and then copied to a network interface for transmission. As a traffic rate increases or scenarios arise where traffic is to be moved to host memory, placing the traffic in the host memory can still allow the processors to achieve target throughput rates of data processed.

Various embodiments provide processing operations prior to packet transmit or after packet receipt. For example, processing operations can include one or more of: packet processing, checksum calculation or validation, tunnel encapsulation or decapsulation, cipher, encryption or decryption, metering, Transmission Control Protocol (TCP)

offload, others described herein, and so forth. In some examples, metering can be performed in accordance with A Two Rate Three Color Marker of RFC 2698 (1999), although other examples can be used. Processors can perform packet processing for a virtualized network function (VNF) executed by a CPU. For example, the processors can receive packet and perform actions on it (e.g., decrypt the packet in line with a cryptography component) and send the processed packet to host memory for access by the VNF executed by the host. The processors can perform actions required by VNFs including 5G User Plane Function (UPF) or Next Generation Firewall (NGFW).

In some configurations, an offload processor may be inserted "inline" between a network interface and a CPU. In such configurations, the CPU can execute device drivers for both the offload processor and the network interface. For ingress traffic, the network interface can be configured such that packets arriving from the network are directed to the offload processor, rather than to the host memory of the CPU, for example using PCIe "Peer-to-Peer" (P2P) communication; while the offload processor can be configured to perform pre-processing on packets before sending them to host memory and signaling the CPU that the packet has arrived. For egress traffic, the offload processor can be configured to perform post-processing on packets, before sending packets to the network interface (e.g., using PCIe P2P communication). In some cases, data path interaction (e.g., send/receive of packets) from the CPU utilizes the offload processor, rather than directly utilizing or commanding the network interface.

In some examples, the offload processor can use DMA or remote direct memory access (RDMA) (or other direct copy operation) to copy content from an offload processor buffer to host memory within a same package or different package. In some examples, the offload processor can use DMA or remote direct memory access (RDMA) (or other direct copy operation) to copy content from an offload processor buffer to a network interface within a same package or different package. In some examples, the CPU can use DMA or remote direct memory access (RDMA) (or other direct copy operation) to copy content from memory to an offload processor buffer within a same package or different package. In some examples, the CPU can use DMA or remote direct memory access (RDMA) (or other direct copy operation) to copy content from memory to a network interface within a same package or different package. In some examples, the network interface can use DMA or remote direct memory access (RDMA) (or other direct copy operation) to copy content to an offload processor buffer within a same package or different package. In some examples, the network interface can use DMA or remote direct memory access (RDMA) (or other direct copy operation) to copy content to a memory within a same package or different package.

For example, a package may include one or multiple dies, tiles, or chips (e.g., processor, CPU, network interface). A package can include one or more dies, tiles, or chips, plastic or ceramic housing for the dies tiles, or chips and conductive contacts to connect to a motherboard or circuit board. Dies, chips or devices can be fabricated using different semiconductor process node sizes (e.g., 3 nm, 5 nm, 7 nm, 10 nm, or larger or smaller). Dies, tiles, or chips can communicate using protocols such as Intel® Embedded Multi-die Interconnect Bridge (EMIB) or other protocol which can provide in-package interconnect of homogeneous dies, tiles, or chips (e.g., dies, tiles, or chips made of different process node sizes or different functionality) or heterogeneous dies, tiles, or chips (e.g., dies, tiles, or chips made of different process node sizes or different functionality). In some examples, NEXT could be integrated into an IO die and an interface between NEXT and a CPU could be EMIB.

Various embodiments can reduce east-west traffic (e.g., traffic within a data center) by providing one or more offload processors within a package.

Figure 2:
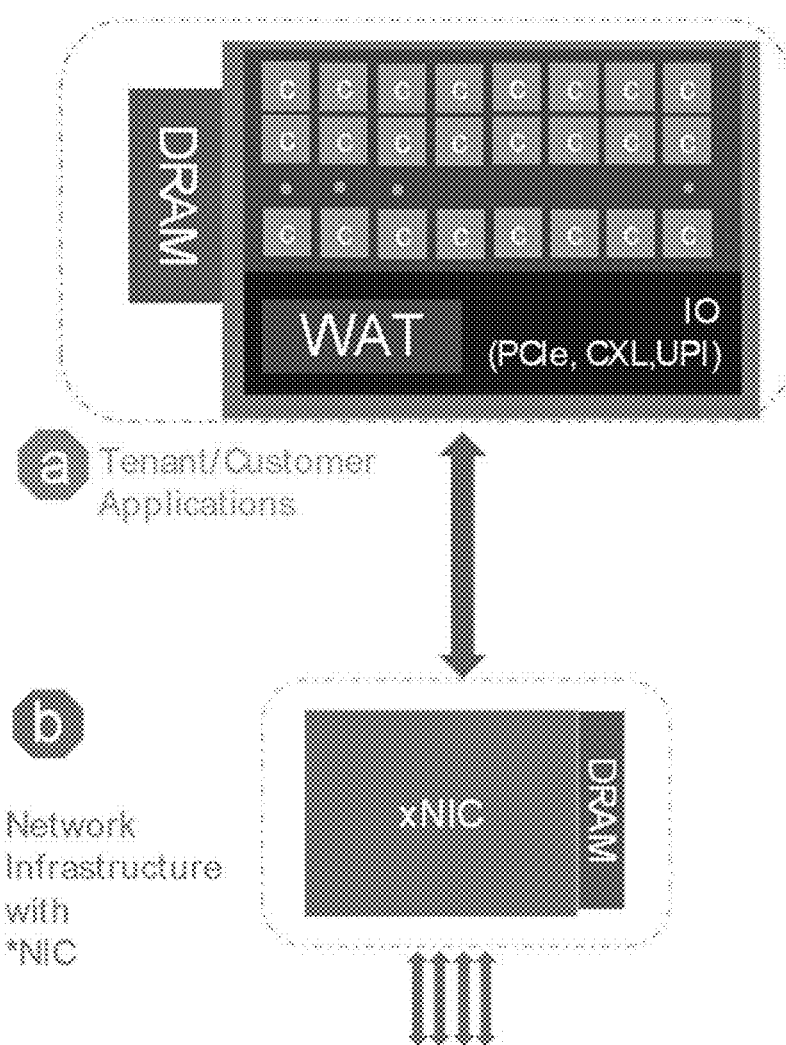
FIG. 2 illustrates a high-level block diagram of the workload acceleration technology (WAT) in relation to other server technology.

FIG. 2 illustrates a high-level block diagram of the workload acceleration technology (WAT) in relation to other server technology. In some examples, offload processors 106-0 or 106-1 can include WAT. In some examples, offload processor, WAT and NEXT can refer to similar technologies. As illustrated in the block diagram, the workload acceleration technology (WAT) is integrated within the CPU complex and this could be implemented as a monolithic die, or in a disaggregated model, implemented with multiple die solution with high speed (internal) interconnects. Examples of high speed interconnects can include EMIB, interposer, multi-chip package connection (MCP), System In Package (SiP), bridge, 2.5D integrated circuit (e.g., multiple integrated circuit dies in a single package that are not stacked into a three-dimensional integrated circuit with through-silicon vias (TSVs)), 3D integrated circuit (e.g., an integrated circuit manufactured by stacking silicon wafers or dies and interconnecting them vertically using TSVs or Cu-Cu connections), PCIe, CXL, UPI, IOSF, and so forth. A semiconductor package can be a metal, plastic, glass, or ceramic casing that includes one or more discrete semiconductor devices or integrated circuits. Individual components can be fabricated on semiconductor wafers before being diced into die, tested, and packaged. The package can provide a manner for connection to a printed circuit board, via connections such as lands, balls, or pins. The package can provide protection against mechanical impact, chemical contamination, or light exposure. The package can help dissipate heat produced by heat emitting devices within the package.

Applications accelerated by WAT could be customer applications in multi-tenant data center usage model or simply applications in a bare metal (e.g., single tenant) appliance usage model. The applications could be partitioned to run in software on general purpose computing cores and/or partly on the hardware accelerators depending on the workload. In some examples, CPU and WAT can share caching hierarchy and share system memory. Various embodiments allow use of any vendor's NIC (e.g., smart-NICs) or lower power NICs and provide inline packet processing in WAT.

Figure 3:
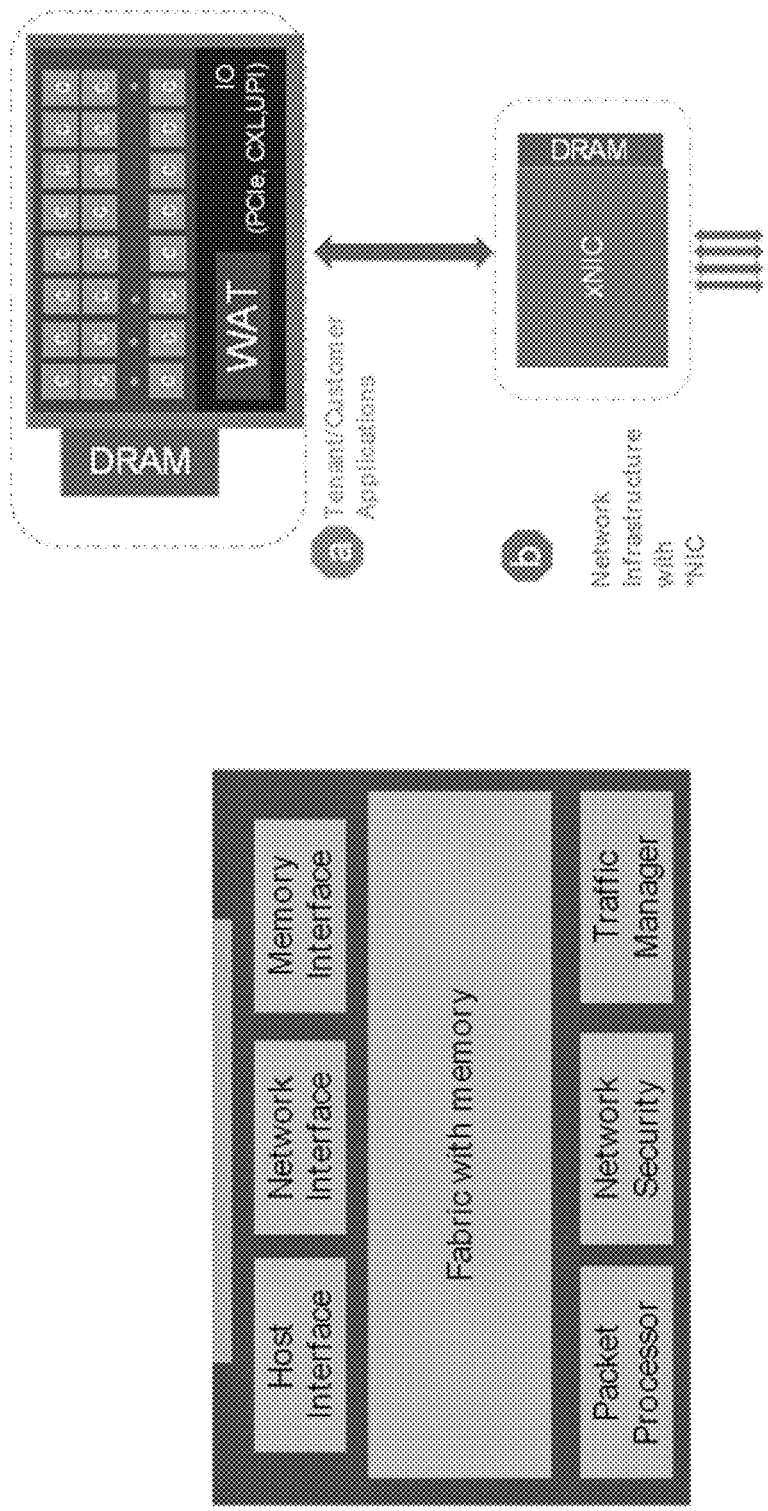
FIG. 3 illustrates an example internal architecture of a WAT and various functional units within the WAT.

FIG. 3 illustrates an example internal architecture of a WAT and various functional units within the WAT. Other acceleration complexes such as media processing and 5G base band acceleration technologies could be interconnected to the internal fabric.

Host interface can be used to interface with the CPU complex and could be interconnected using various high bandwidth, low latency, CPU interconnect technologies such as any connection, interface or protocol described herein. Inter-component connections within WAT can include mesh, ring or point-to-point topologies using protocols (e.g., Advanced eXtensible Interface (AXI), Arm® AMBA® ACE interface, IOSF, custom protocol). The WAT network interface can provide peer-to-peer connectivity to the network interface card (NIC). The interconnect could use coherent protocols (e.g., CXL) to be cache coherent with the CPU system memory. The memory within the WAT could also be accessed by the CPU in a coherent manner. The memory within the WAT could be organized with a cache hierarchy (with level 1 (L1), level 2 (L2) and the last level cache of CPU is also used by WAT).

Traffic Manager provides complex hierarchical quality of service (QoS) operation to determine order of packet processing or packet transmission. Packet processor can provide flexible and programmable hardware packet processing operations. Network security can provide network and application security acceleration functions such as IPsec, Datagram Transport Layer Security (DTLS), QUIC, TLS, kernel Transport Layer Security (kTLS), and so forth. Components within WAT can be interconnected through an internal fabric and memory interconnect that allows to compose the flexible entry, exit and reentry points between the software running on CPU cores and components and hardware pipeline stages in WAT.

Multiple recirculation paths can be provided within the functional units in WAT such as recirculation paths between hardware and software pipeline stages. Processors connected to the CPU through high bandwidth low latency cache coherent interconnect allows flexibility to have multiple entry and reentry points between hardware and software to realize high performance packet processing capability for complex networking applications.

Figure 4:
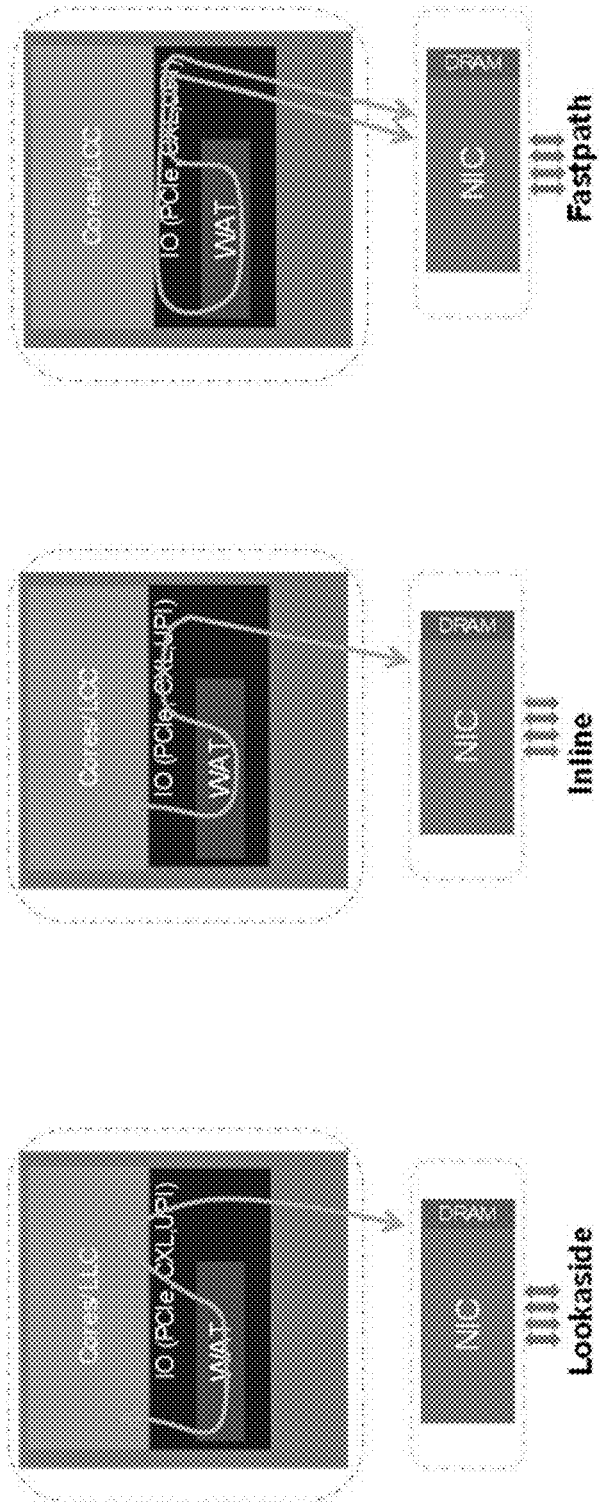
FIG. 4 shows some example data flows supportable by the WAT.

FIG. 4 shows some example data flows supportable by the WAT. For example, the data flows are referred to as Lookaside, Inline and Fast path flows. In a Lookaside flow, for a transmit case, a core that executes software requests use of WAT and the result from the WAT can be made available to the requesting software for processing. The software requests that the result be provided to the NIC for transmission. In the Lookaside flow, for a packet received by the NIC, a core executes software that requests use of WAT and the result is made available to the requesting software.

In Inline computation, for a packet transmit case, a core that executes software requests use of WAT and the result is made available to the NIC for transmission, instead of being initiated for transmission by the core. In Inline computation, for a packet receive case, the NIC receives a packet and provides the packet for processing by the WAT and the WAT provides results to the core.

In the Fastpath flow, for a received packet, the WAT handles processing of received packets and transmission of processed content (e.g., packets) to a same or another device (e.g., NIC) and the core does not perform processing.

Figure 5:
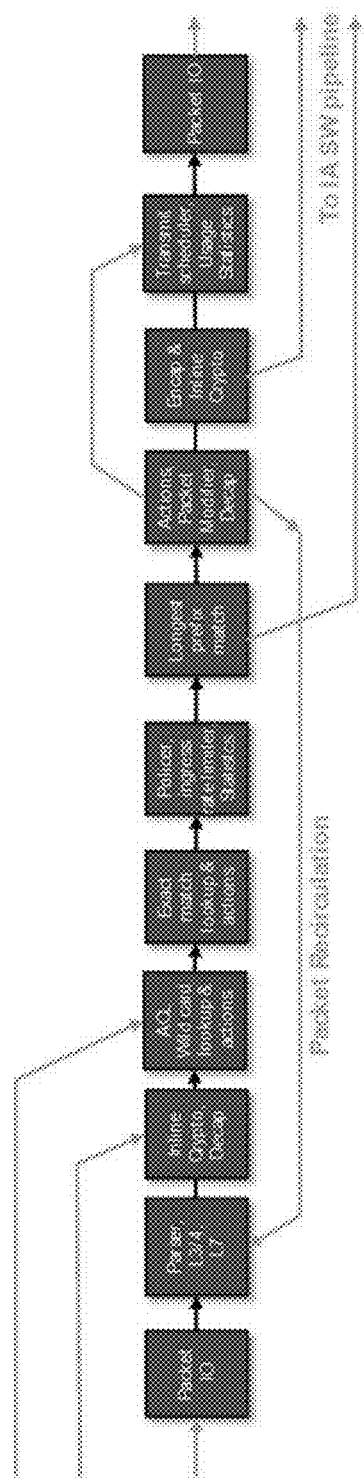
FIG. 5 illustrates a programmable hardware pipeline that includes flexible entry points, exit points and reentry points.

FIG. 5 illustrates a programmable hardware pipeline that includes flexible entry points, exit points and reentry points. Entry, exit, and reentry stages can be defined by software executed on a core of a CPU for acceleration of packet processing operations. A networking application can be composed between software running on general purpose compute cores and the software defined hardware pipeline running on an offload engine (e.g., WAT or NEXT). Some application pipelines could have multiple recirculation and entry, exit and reentry points between software and hardware pipelines. Multiple entry and exit points into the hardware pipeline can be software-defined.

For example, packets arriving from the network can directly arrive from the network interface to the hardware stage (shows as packet input output (IO)) for pre-processing before being sent to the CPU for further processing. Alternatively, the packets from the network can arrive in the software pipeline from the network interface and then sent to WAT hardware pipeline stages for post processing before being sent to the network. In some examples, a software pipeline running on the cores can handle the ingress and egress of the packets from the network interface but send the packets to the hardware pipeline for processing intermediate stages of the application pipeline. In some examples, the software executing on a core can instruct WAT to handle the entire packet processing for certain flows in the hardware pipeline without the software processing those packets. For example, any of the following operations can be initiated or offloaded from a core to NEXT or WAT such as packet encapsulation, packet de-encapsulation, parsing, cryptography, access control list (ACL), match-action, packet policer, packet metering, and so forth.

In some examples, a core could request WAT to provide cryptographic operations and de-encapsulation onward to encapsulation and cryptography and then exit to provide results to an application or VEE running on a core. In another example, a core could request the WAT to perform ACL operation onward to longest prefix match and then exit to provide results to an application or VEE running on a core.

Various embodiments provide an API for software to use to configure rules that WAT could be vendor-neutral such as Data Plane Development Kit (DPDK), vector packet processing (VPP), Linux kernel, P4, and/or others. Different APIs exist in different ecosystems, including rte_flow (DPDK) and tc flower (Linux). Some embodiments extend the existing APIs (e.g., rte_flow, tc flower, etc.) to support new features (e.g., inline TLS).

Some examples utilize orchestration (e.g. OpenStack or Kubernetes), whereby applications/VNFs can describe their hardware requirements, and hardware platforms can describe their capabilities and the orchestration can match-make between VNFs and platforms. In some examples, a set of capabilities of NEXT could be queried by software to identify available features (e.g., inline TLS). In some examples, capabilities of the WAT may be queried by a device driver to determine whether WAT supports specific capabilities may be and the capabilities advertised to an operating system for usage by an application.

Figure 6:
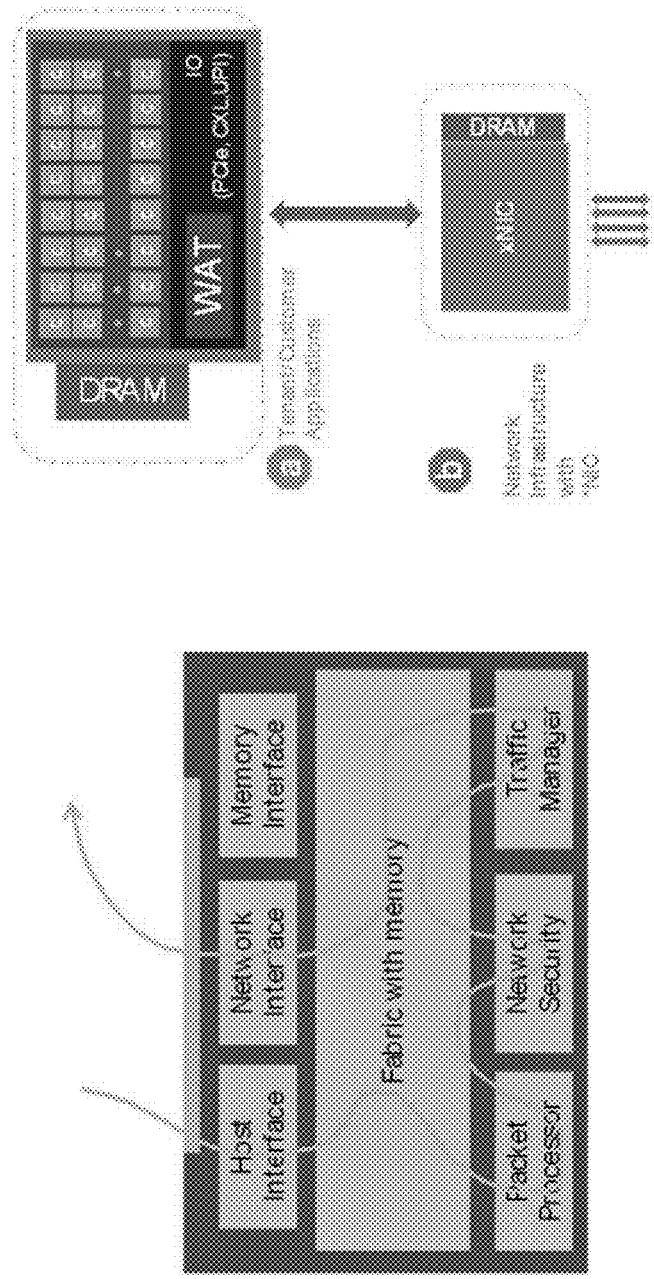
FIGS. 6 and 7 illustrate data flows within various functional units for preprocessing and fast path modes.
Figure 7:
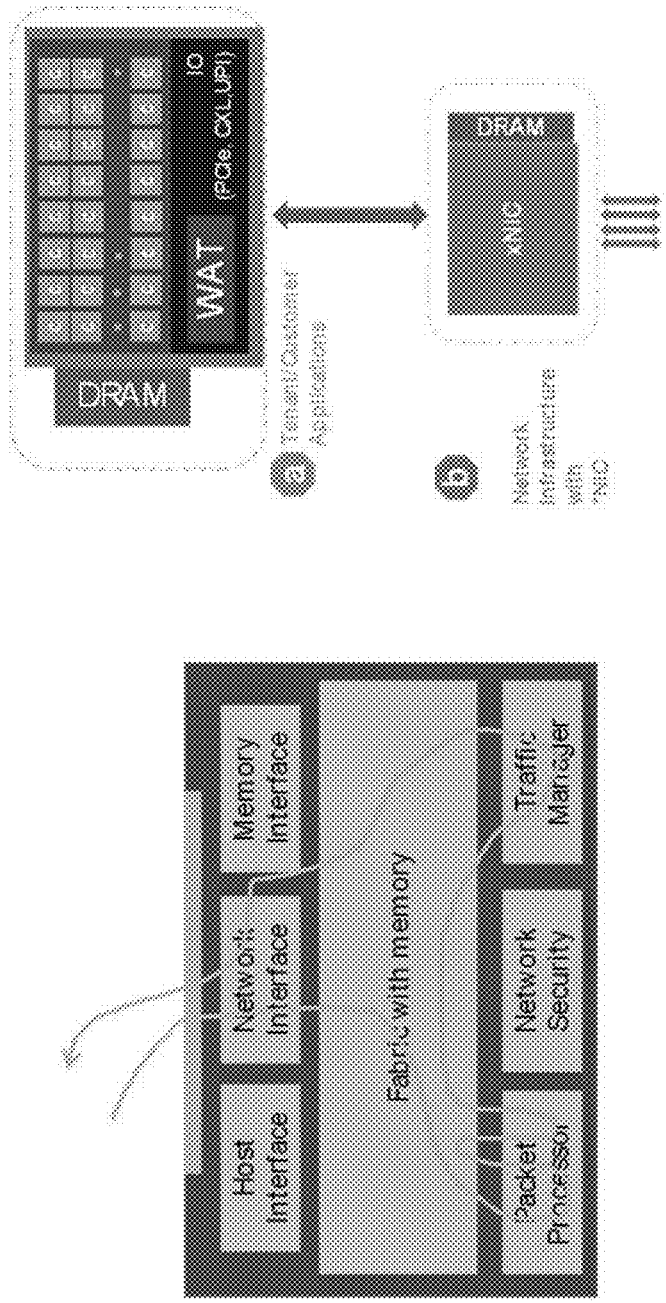

FIGS. 6 and 7 illustrate data flows within various functional units for preprocessing and fast path modes. In the example of FIG. 6, a packet, to be transmitted, is received from a host at the request of an application or VEE running on a core through a host interface and processed using packet processor, network security, and a traffic manager prior to transmission using the network interface. In the example of FIG. 7, a packet is received by the network interface and provide to a packet processor for processing and then transmitted using the network interface. In the example of FIG. 7, an application or VEE can instruct the WAT to process received packets and the application or VEE do not process the packet.

Scalable and Modular Hardware Accelerator Framework

Figure 8A:
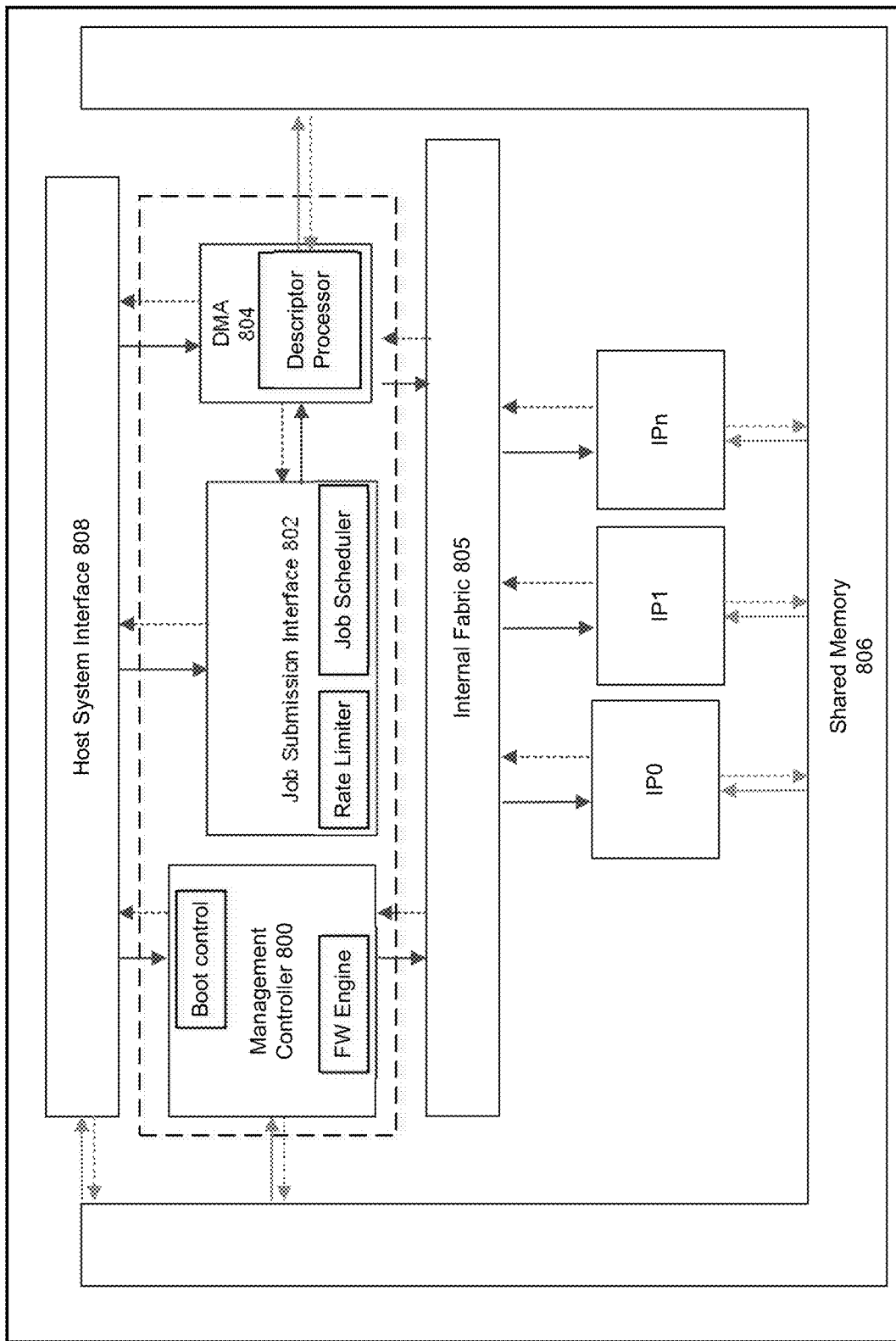
FIG. 8A depicts an example of a system.

FIG. 8A depicts an example of a system. At startup, NEXT (e.g., WAT) can be enumerated as a PCIe device by an operating system (OS). OS can call a NEXT driver, which can initialize NEXT and create a virtual session to a guest and guest access to NEXT resources through a virtual interface (e.g., VF or SIOV ADI). The guest can access address space where NEXT is registered and can write requests into one or more queues in the address space.

Management Controller (Mgmt Cntrl) 800 can be responsible for boot and bring up of the NEXT such as initialization (e.g., memory 806) and configuration of NEXT device, verify the authenticity of the firmware, reliability, availability, and serviceability (RAS) and error handing and recovery.

Management Controller 800 can receive a firmware upgrade to allow expansion of use cases such as by programming of Management Controller 800 and/or any of IP blocks (e.g., IP0 to IPn, where n is an integer) as to which operations to perform. In some examples, a job descriptor can include executable instructions for an IP block to execute. For example, IP blocks can perform a sequence of operations such as compression, encryption, write out, decryption, and decompress. Another example sequence can include encode, compress, write out. Yet another example can include compress, encrypt, write out. Management Controller 800 can perform functions as programmed by firmware or executable instructions as any IP block.

Host System Interface 808 can expose offload engine (e.g., NEXT or WAT) to communicate to the host memory and receive a job processing request. To submit a request, an application can write to an MMIO address associated with NEXT or utilize an instruction to submit a job request. Job submission interface 802 can provide a queue interface for software running on a host processor (e.g., CPU) to submit work request or packet-related descriptors. A job request can be submitted in a descriptor in some examples via Host System Interface 808. Job submission interface 802 can read requests from multiple guests from queues. IP blocks (e.g., IP0 to IPn, where n is an integer) can present themselves to job submission interface 802 as available or not available for use. Job submission interface 802 can perform arbitration among requests. Job submission interface 802 can monitor for service level agreements (SLA) applicable to guests. Rate limiter of job submission interface 802 can limit use of IP blocks use according to an applicable rate of job request submissions specified in an applicable SLA. If an SLA of a guest does not permit job request execution, job submission interface 802 can decline execution of a job or wait for permission to schedule execution of a job request. If an applicable IP block is available to perform a job request, then job submission interface 802 can permit the job to be dispatched for performance by an IP block. In some examples, multiple IP blocks could be capable to perform a job and job submission interface 802 can select an IP block to perform the job request.

Direct memory access (DMA) 804 can provide a controller to copy data from host memory to memory of WAT or NEXT or copy data from memory of WAT or NEXT to host memory. If a job has pointer to a descriptor, job submission interface 802 can provide the descriptor pointer to DMA engine 804 and indicates which descriptor to fetch. A descriptor can include an instruction set for execution by the IP block. For a request selected by job submission interface 802 to be executed, job submission interface 802 can inform DMA engine 802 which IP block is to access retrieved data. In some examples, a job request has an associated descriptor and job submission interface 802 causes DMA engine 804 to write the descriptor into a relevant IP block via internal fabric 805. Internal fabric 805 can provide any connection type, interface, topology, and use any protocol such as those described herein. Internal Fabric 805 can permit communication with internal components of NEXT and shared memory 806.

A descriptor can indicate which IP blocks are involved to perform a request. An example descriptor format can include: control portion (e.g., operation(s) (encode, decode, compression, encode and compress, single or fused operations, and so forth)), source pointer to data, and destination pointer to memory location to store data after performance of the job request.

For example, DMA engine 804 can push control operation and source data to a memory of a first IP block (or shared memory accessed by the first IP block) to process data. The first IP block can write processed data into shared memory 806 for processing by second IP block or for DMA engine 804 to write processed data to a destination memory address. IP0 to IPn can represent acceleration core and engines that provide the offload processing. For example, any of IP0 to IPn can perform compression, encryption, decryption, decompress, data verification, and other configured operations.

Figure 8B:
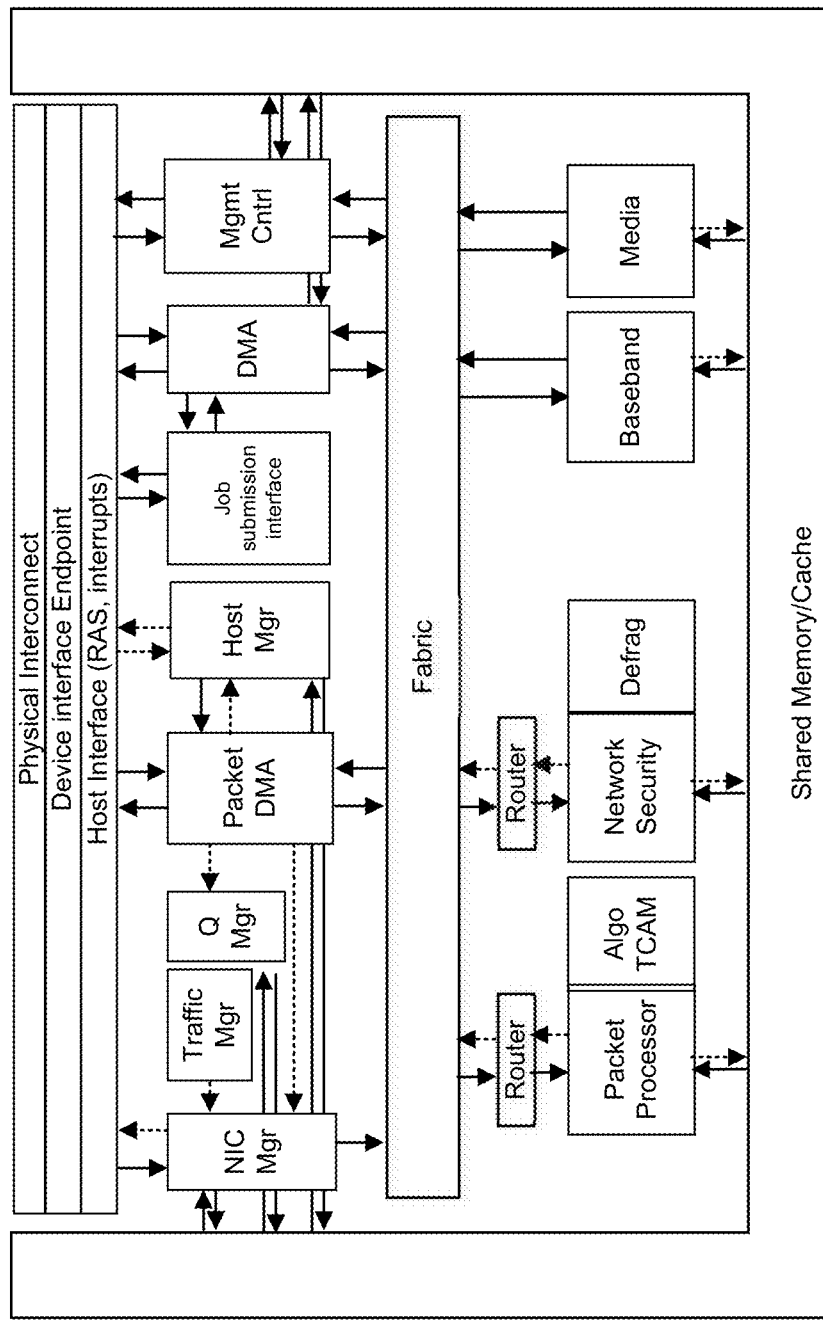
FIG. 8B depicts an example overview of a hardware architecture.

FIG. 8B depicts an example overview of a hardware architecture. The architecture can use a common infrastructure framework for all accelerators for packet processing as well as acceleration of media or baseband operations or any deployment model. Accelerator blocks can be agnostic to the external connectivity and job submission models. This example shows availability of packet processors, network security operations, baseband processing, or media processing.

Figure 9:
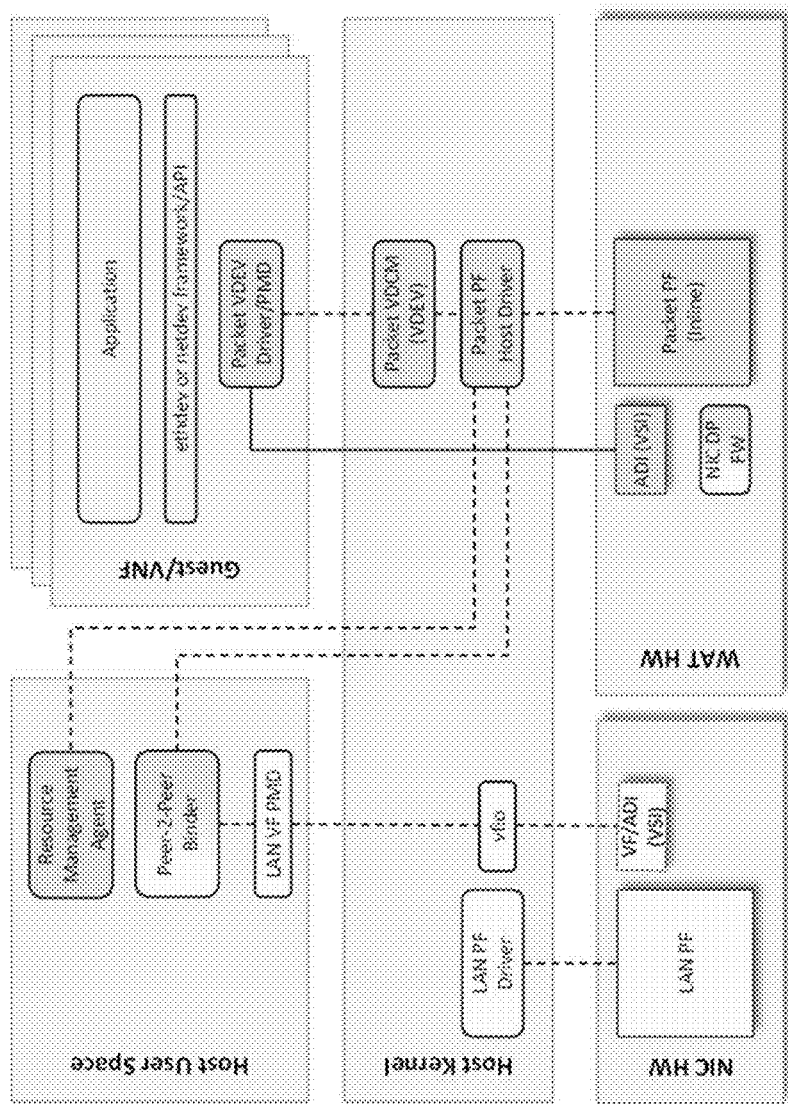
FIG. 9 depicts an example overview of a software architecture.

FIG. 9 depicts an example overview of a software architecture. Various embodiments provide a peer-2-peer (P2P) communication between a NIC and WAT. Various embodiments provide permit splitting header and payload so that a packet header and/or payload can be provided to the WAT and the packet header and/or payload can be provided for processing by a CPU. A peer-2-peer binder (P2PB) executing in user space can communicate with a NIC hardware (HW) and WAT HW and send commands to both devices to configure both NIC and WAT. P2PB and Resource Management Agent can be used for host and VNF configuration, respectively. A WAT can expose a physical function (PF). A PF Host Driver can act as device driver for a WAT. A VDCM can compose SIOV virtual devices (VDEVs). A VDEV driver can provide access to WAT to a VNF or application running in VM, container, etc. NIC DP firmware (FW) can act as a data path of device driver for a NIC. More specific examples of providing a guest with access to a WAT and NIC are described herein.

P2PB can communicate with the PF driver to provide to the PF the Bus Device Function (BDF) information for the NIC VF/FSI. In some examples, BDF information can be provided to P2PB via VFIO to PMD driver mapping. The P2PB can provide information about the underlying NIC/VSI such as the descriptor BARs can be accessed by the PF driver for configuration and IOMMU configuration. Resource Management Agent can communicate with the PF driver when a resource common to the downstream Ethernet device (NIC) is to be configured. For example, if an application or workload sends a message via the Packet VDEV driver to PF driver communication path for a request to configure an Access Control List (ACL), the PF driver can communicate with the Resource Management Agent which in turn tracks requests and determines if the request is valid and feasible. If the request is valid and feasible, Resource Management Agent configures the requested resources via the communication path to the PF driver, and then responds back with a success code to the original configuration request via the same communication path. In response, the PF can provide a success response to the VDEV device used by the workload.

Figure 10:
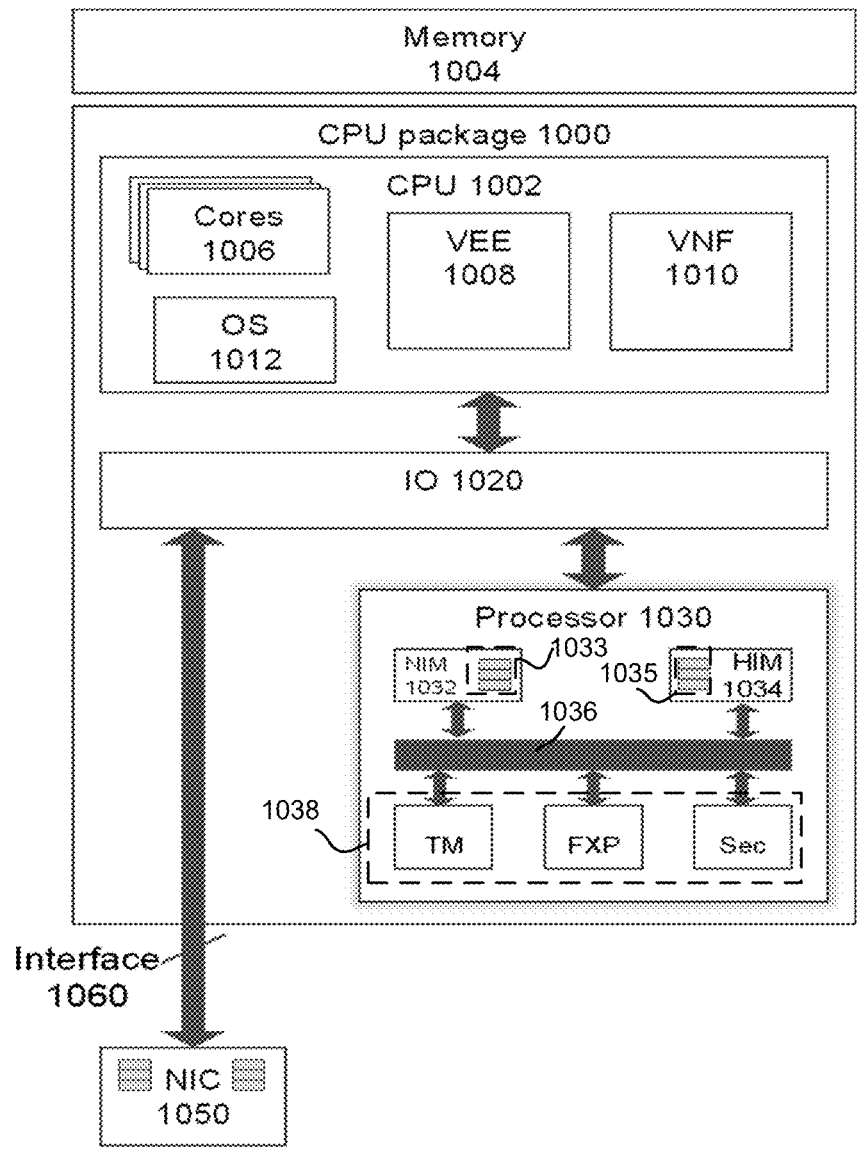
FIG. 10 depicts an example system.

FIG. 10 depicts an example system. CPU package 1000 can use cores 1006 and memory 1004 to execute at least virtualized execution environments (VEEs) 1008, VNF 1010, an operating system 1012, or applications (not shown). In some examples, cores 1006 can include one or more of: a core, graphics processing unit (GPU), field programmable gate array (FPGA), or application specific integrated circuit (ASIC). In some examples, a core can be sold or designed by Intel®, ARM®, AMD®, Qualcomm®, IBM®, Texas Instruments®, among others. In some examples, an operating system (OS) 1012 can be Linux™, Windows®, FreeBSD®, Android®, MacOS®, iOS®, VMware vSphere, openSUSE, RHEL, CentOS, Debian, Ubuntu, or any other operating system. Memory 1004 can be any type of volatile memory (e.g., DRAM), non-volatile memory, or persistent memory.

Virtualized execution environment 1008 can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

For example, applications can include a service, microservice, cloud native microservice, workload, or software. Any of applications can perform packet processing based on one or more of Data Plane Development Kit (DPDK), Storage Performance Development Kit (SPDK), OpenDataPlane, Network Function Virtualization (NFV), software-defined networking (SDN), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. A virtual network function (VNF) can include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure. Some applications can perform video processing or media transcoding (e.g., changing the encoding of audio, image or video files).

For example, an application composed of microservices, where each microservice runs in its own process and communicates using protocols (e.g., an HTTP resource API, message service, RPC, or gRPC). Microservices can be independently deployed using centralized management of these services. A management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery.

In some examples, the system of FIG. 10 can support single-root I/O virtualization (SR-IOV). SR-IOV is a specification that describes use of a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that are capable of configuring and managing the SR-IOV functionality. For example, a PF can configure or control a PCIe device, and the PF has ability to move data in and out of the PCIe device. For example, for a network adapter, the PF is a PCIe function of the network adapter that supports SR-IOV. The PF includes capability to configure and manage SR-IOV functionality of the network adapter, such as enabling virtualization and managing PCIe VFs. A VF is associated with a PCIe PF on the network adapter, and the VF represents a virtualized instance of the network adapter. A VF can have its own PCIe configuration space but can share one or more physical resources on the network adapter, such as an external network port, with the PF and other PFs or other VFs.

Cores 1006 can perform packet processing including one or more of: VNF 1010, Cloud Native Network Functions (CNF), Network Function Virtualization (NFV), software-defined networking (SDN), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

For example, applications executed by any device can include a service, a microservice, cloud native microservice, workload, or software. Applications can be executed in a pipelined manner whereby a core executes an application and the application provides data for processing or access by another device. According to some embodiments, an application can execute on one or multiple cores or processors and the application can allocate a block of memory that is subject to cache line demotion as described herein.

A serverless or cloud-native application or function (e.g., Function as a Service (FaaS)) can use available computing resources at a data center, edge computing device, or fog network device or in disaggregated computing and memory resources. For example, for a serverless application, a cloud service provider dynamically manages allocation and provisioning of servers and a serverless application runs in stateless compute containers that are event-triggered and may last for one invocation. A serverless application can be event-driven, cloud-based application where application development relies on a combination of third-party services, client-side logic and cloud-hosted remote procedure calls. Serverless application can be pay-per-use computing or bare-code where users are charged based on time and computing resources (e.g., CPU, networking, or memory) allocated to run serverless application without associated fees for idle time of computing resources. In some examples, a serverless application or function can be performed by a network infrastructure device (e.g., forwarding element, router, switch, network interface controller) or accelerator, in addition or alternative to use of a server or general purpose computing platform.

In some examples, VNF 1010 can dynamically program processor 1030 to process a flow for traffic based upon rules (e.g., drop packets of certain flows, decrypt on ingress, encrypt on egress). The system of FIG. 10 can use a network interface (NIC) 1050 to transmit or receive packets using a network medium. A flow can be a sequence of packets being transferred between two endpoints, generally representing a single session using a known protocol. Accordingly, a flow can be identified by a set of defined N tuples and, for routing purpose, a flow can be identified by tuples that identify the endpoints, e.g., the source and destination addresses. For content based services (e.g., load balancer, firewall, intrusion detection system etc.), flows can be identified at a finer granularity by using five or more tuples (e.g., source address, destination address, IP protocol, transport layer source port, and destination port). A packet in a flow is expected to have the same set of tuples in the packet header. A packet may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Processor 1030 can access Network Interface Manager (NIM) 1032 (or packet storage controller) to manage sending traffic to NIC 1050 and receiving traffic from NIC 1050 via IO die 1020. In some examples, IO die 1020 can be implemented as a separate die in the CPU package which handles input/output operations between devices in the CPU package. In accordance with various embodiments described herein, NIM 1032 can manage whether content is stored in a buffer 1033 for ingress/egress traffic from/to NIC 1050 or host memory 1004 for egress traffic to NIC 1050, based at least in part on one or more of: buffer space is low on space, data is higher latency or lower priority, or available bandwidth through an interface between the buffer and the host memory. NIM 1032 can poll for and read descriptors indicating one or more packets have been received by network interface 1050. In some examples, NIM 1032 can adapt descriptor format supported by NIC 1050 (which may be an Intel® NIC or a third party NIC)) to a descriptor format supported within the device and by CPU (e.g., a descriptor format consistent with Intel® Ethernet Adaptive Virtual Function Specification).

NIM 1032 can selectively modify receive or transmit descriptors based on storage location of respective data received by NIC 1050 or content or data to be transmitted by NIC 1050. For example, buffer 1033 can be sufficiently large to store received data that is processed at, e.g., 500 Gbps, although other data receive rates can be supported. In some examples, buffer 1033 can store descriptors and content or data for traffic received from NIC 1050 or to be transmitted by NIC 1050.

Host Interface Manager (HIM) 1034 can present a SR-IOV interface for CPU 1002 to access processor 1030. Buffers 1035 can be used to store data prior to processing or after processing. Buffers 1035 can be implemented as SRAM memory in some examples. In some examples, buffer 1033 and buffer 1035 are the same buffer that can be accessed by any of HIM 1034, NIM 1032, or any offload processor. Various offload processors 1038 can be available from processor 1030 such as but not limited to fast traffic packet processor (FXP), a traffic manager (TM) and a security component (Sec) for the encryption and decryption activities, or other accelerators or processors. A bus or other interconnect 1036 can be used to communicatively couple offload processors with NIM 1032 and HIM 1034. In some examples, processor 1030 can be implemented in a separate die than that of CPU 1002.

In some examples, a CPU processes content in buffers in system memory. HIM 1034 can use a DMA engine to write received packets to system memory before signaling to the CPU that the packet has been received. For packets to be transmitted, the entire packet can be read from system memory if NEXT is to perform some processing on the payload or read the header if NEXT is to perform packet header processing. In a case where NEXT processes a packet header but not its payload, the NIC can read the payload from system memory during or after packet header processing by NEXT.

Network interface 1050 can provide communications with other network elements and endpoint devices. Any communications protocol can be used such as one or more of: Ethernet (IEEE 802.3), remote direct memory access (RDMA), InfiniBand, FibreChannel, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect (PCIe), Intel QuickPath Interconnect (QPI), Intel Ultra Path Interconnect (UPI), Intel On-Chip System Fabric (IOSF), Omnipath, Compute Express Link (CXL), HyperTransport, Infinity Fabric (IF), NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, fabric interface, and variations thereof. Data can be copied or stored to virtualized storage nodes using a protocol such as NVMe over Fabrics (NVMe-oF) or NVMe.

Figure 11:
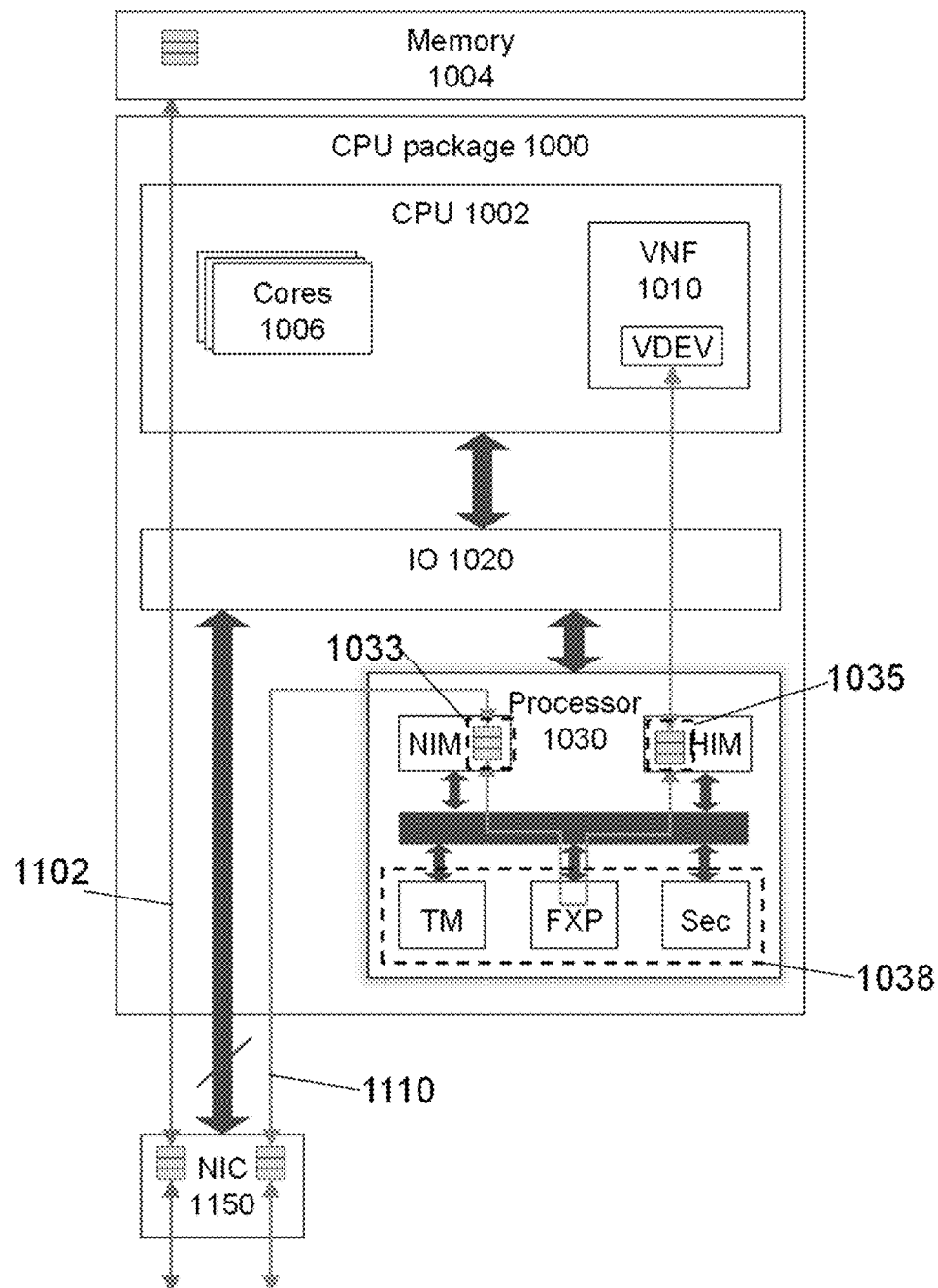
FIG. 11 depicts an example receive operation.

FIG. 11 depicts an example receive operation. In some examples, received packets can traverse a path 1102 or path 1110. According to path 1102, for packets that are not to be processed by processor 1030 (e.g., particular packet flows), NIC 1050 copies received packets to system memory 1004. For example, NIC 1050 can perform a DMA or RDMA operation to copy the received packet (or portion thereof) to system memory 1004. According to path 1110, packets are to be processed by processor 1030 (e.g., particular packet flows) and NIC 1050 copies such received packets to buffer 1033. For example, NIC 1050 can perform a DMA or RDMA operation to copy the received packet (or portion thereof) to buffer 1033. After one or more offload processors 1038 performs the associated processing on portions of the received packets, processed packets are stored in buffer 1035. For example, processor 1030 can perform a DMA or RDMA operation to copy the processed content from buffer 1035 to system memory 1004.

Figure 12:
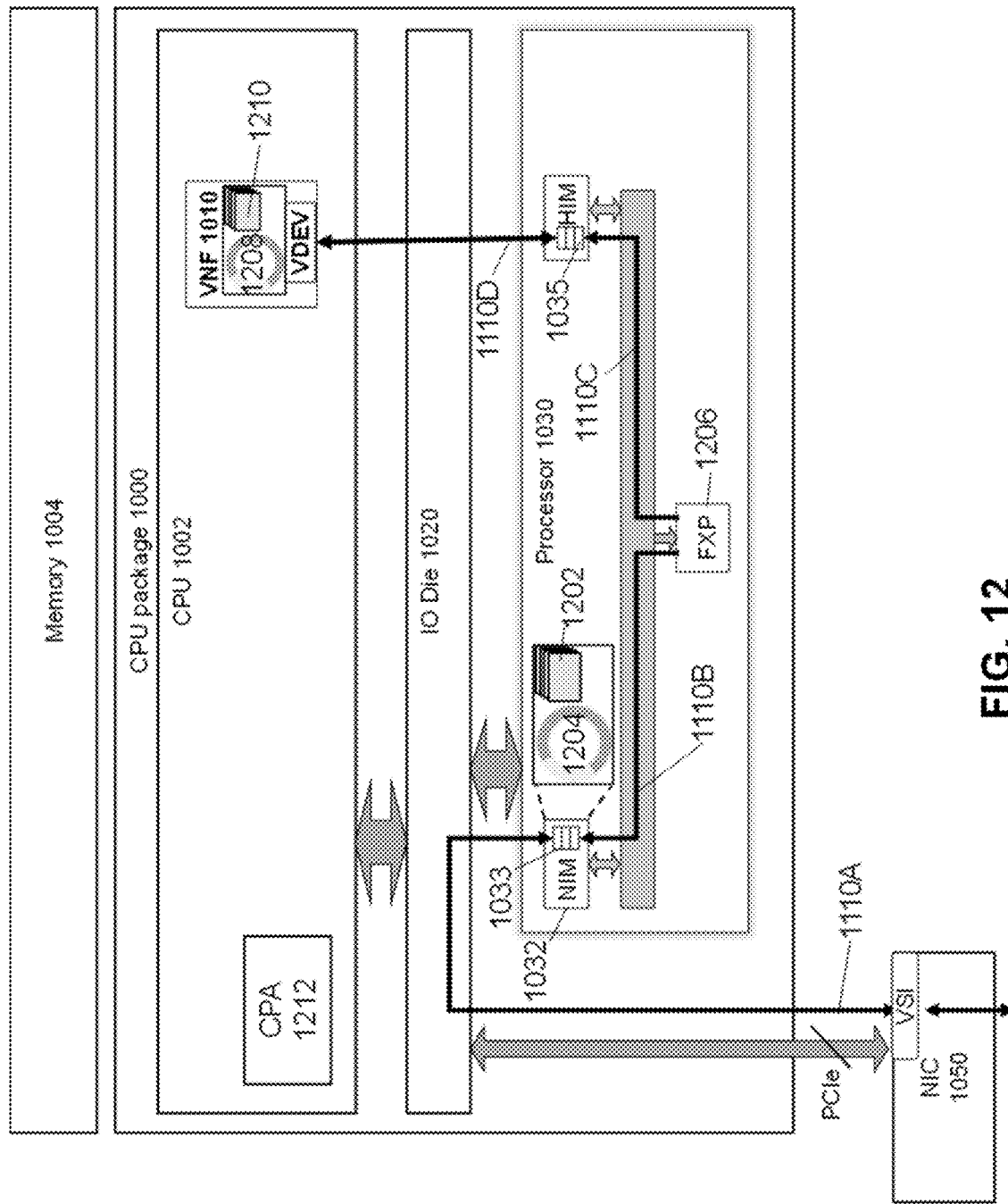
FIG. 12 depicts an example receive operation.

FIG. 12 depicts an example receive operation. In this example, the path 1110 is depicted and use of Flexible Packet Processor packet processing (FXP) offload processor 1206. Control plane application (CPA) 1212 can configure and connect NIC 1050 to one or more of IO die 1020, CPU 1002, and processor 1030. NIC 1050 can complete receive descriptors for received packets by providing a destination address in the descriptor as a location within buffer 1033 of processor 1030. At 1110A, NIM 1032 can receive a descriptor for inclusion in a descriptor ring 1204 as well as data for storage in buffer 1202. In some examples, NIM 1032 can convert received descriptors to an internal format of the NIM. At 1110B, processor 1030 can copy or provide a pointer to FXP 1206 to access data of the received packet or packets from buffer 1033. In some examples, FXP 1206 can access data from buffer 1033 using a pointer, process the data and store the process data into buffer 1033. In some examples, FXP 1206 can copy the data to an intermediate buffer (not shown), process the data, and store the process data into the intermediate buffer. At 1110C, processed data is made available to HIM 1034 by copying the processed data to buffer 1035 or providing a pointer to data in the intermediate buffer or buffer 1033. Accordingly, in some examples, data that is processed can be transferred from buffer 1033 to buffer 1035.

Virtual Device (VDEV) can present an Ethernet device to VNF 1010. At 1110D, HIM 1034 can copy processed data to buffer 1210 (e.g., in memory 1004) and an associated descriptor to a descriptor ring 1208 (e.g., in memory 1004). In some examples, NIM 1032 can modify any associated descriptor to identify storage location of the processed packets in a buffer in memory 1004 and provide the modified descriptors for access by CPU 1002 (e.g., one or more cores). In this example, modified descriptors and data in buffer 1202 in memory 1004 are provided for access by VNF 1010.

In some examples, if data is to be transmitted after processing received data, the data can be stored in buffer 1033 and not copied to a buffer 1210 of memory 1004. For example, VNF 1010 can initiate transmission of data by NIC 1050 from buffer 1033. Additional processing can occur prior to transmission such as encryption or packet header formation using offload processors of processor 1030.

Figure 13:
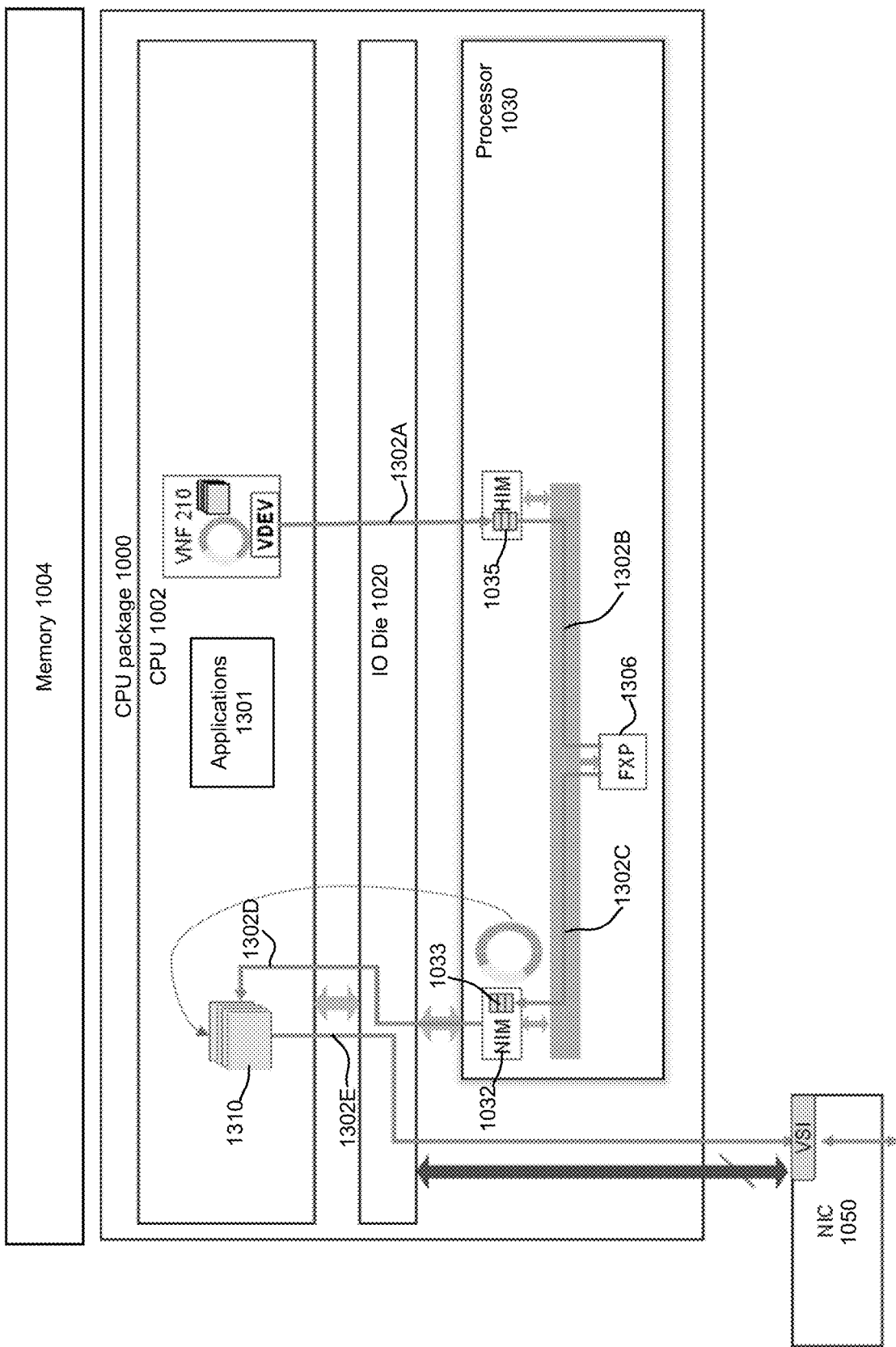
FIG. 13 depicts an example transmit operation.

FIG. 13 depicts an example transmit operation. In some examples, an application software 1301 or VNF 1010 can configure a priority of packet to be transmitted and provide a transmit descriptor to NIM 1032. For example, an application or VNF 1010 (or other software or hardware) can modify a packet descriptor to specify a priority level or latency of a packet to be transmitted. For example, a destination IP address or destination MAC address can correlate with a priority level, or virtual local area network (VLAN) tag can indicate a priority level. At 1302A, CPU 1002 (e.g., one or more cores) can cause data to be sent to processor 1030 to buffer 1035 by DMA or RDMA operation. CPU 1002 can provide a descriptor for a packet to processor 1030 and indicate where the data to be transmitted is stored (e.g., in buffer 1035). At 1302B, FXP 1306 can access and process the data. FXP 1306 can access data from buffer 1035 using a pointer, process the data and store the processed data into buffer 1035. In some examples, FXP 1306 can copy the data to an intermediate buffer (not shown), process the data, and store the process data into the intermediate buffer.

At 1302C, FXP 1306 can indicate data is processed and available to transmit. Note that while the example is for use of FXP, any other offload processing or series of offload processing operations can take place such that the data may be available to transmit after a series of offload processing steps (e.g., packet processing, encryption, and so forth). FXP 1306 can provide access to processed data by providing a pointer to a location in an intermediate buffer or buffer 1035. In some examples, FXP 1306 can copy the processed data to buffer 1033. In some examples, buffer 1033 and buffer 1035 are the same buffer that can be accessed by any of HIM 1034, NIM 1032, or any offload processor. In some examples, the offload processor (e.g., FXP 1206) provides metadata (e.g., packet size, packet priority) for use by NIM 1032 to determine where to store the processed data.

In some examples, NIM 1032 can determine whether to store processed packet data in buffer 1033 or store the processed data in host memory 1004 prior to transmission by NIC 1050. For example, low latency or high priority packets can be stored in buffer 1033 prior to transmission by NIC 1050. For example, high latency or low priority packets can be stored in memory 1004 prior to transmission by NIC 1050. In some cases, if buffer 1033 does not have enough space or its fullness level is beyond a threshold, processed data can be stored to memory 1004 prior to transmission by NIC 1050. Available bandwidth of an interface between processor 1030 and memory 1004 can also be taken into to determine whether to copy data to memory 1004.

During low traffic throughput times, NIM 1032 can decide to keep packets within buffer 1033 for transmission. As the traffic rate increases, or if the available space in buffer 1033 is limited, NIM 1032 can begin placing packets for transmission in host memory 1004 and updating the descriptors to indicate data is stored in memory 1004.

A length of time that data is stored in buffer 1033 can be unknown a priori because NIM 1032 may not predict how long it will take NIC 1050 to actually perform the transmit action and provide notification that said action has been finished. As such, how much buffer space is needed can be challenging to determine. Some NIC transmit times can be determined characterized and the buffer 1033 size can be determined. However, different NIC vendors can have different transmit time characteristics. Accordingly, space in buffer 1033 can be prioritized for use for imminent transmit operations or to preserve space in buffer 1033.

At 1302D, NIM 1032 can update a transmit descriptor to indicate whether data is stored in a buffer 1310 in memory 1004 or buffer 1033. For processed data to be stored in memory 1004, processors 1030 can copy (e.g., DMA or RDMA) processed data to memory 1004 (e.g., reserved buffer by device driver for processors 1030) and NIM 1032 can revise the associated transmit descriptor with information, including the location in memory 1004 where the packet data resides, and notify NIC 1050 that there is data to be transmitted.

CPU 1002 can initialize NIC 1050 to fetch descriptors from buffer 1033 by coordination between driver of processor 1030 and driver of NIC 1050. At 1302E, NIC 1050 can retrieve processed data based on descriptor content indicating location of data to be transmitted is stored in memory 1004 or buffer 1033. In some cases, where buffer 1033 stores processed data, processors 1030 can copy processed data to NIC 1050 (e.g., by DMA or RDMA). In some cases, where memory 1004 stores processed data, CPU 1002 can copy (e.g., DMA or RDMA) processed data to NIC 1050.

Copying data twice after processing by processors 1030 can use interface bandwidth between memory 1004 and processor 1030 and slow ability to transmit data and can adversely affect performance. For example, two PCIe transactions can be used to push data to memory 1004 and retrieve the data to NIC 1050. By contrast, accessing processed data from buffer 1033 may use merely one PCIe transaction to transfer data from memory 1004 to buffer 1033 and can reduce latency to transmit data.

Figure 14:
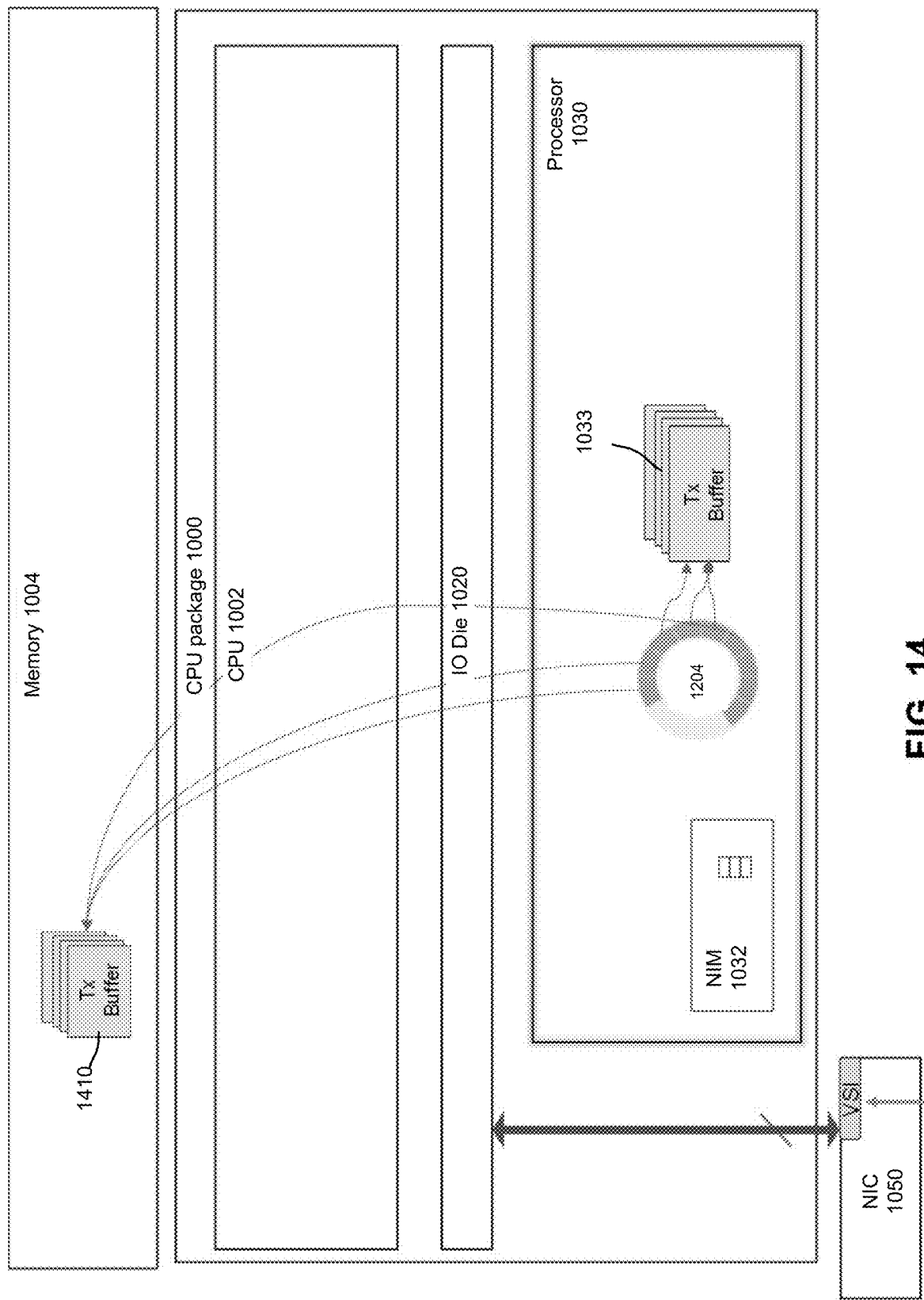
FIG. 14 depicts an example of use of descriptors in connection with a transmit operation.

FIG. 14 depicts an example of use of descriptors in connection with a transmit operation. In this example, descriptor ring 1204 includes descriptors that refer to either buffer 1033 used by processor 1030 or buffer 1310 in memory 1004. NIC 1050 can access descriptors from processors 1030 to determine whether to retrieve or request availability of data from buffer 1033 or buffer 1310. Utilizing this hybrid model, at a high rate, even if only a small percentage of traffic are sent directly to NIC 1050 from buffer 1033 rather than an extra copy or DMA operation of data from memory 1004 to NIC 1050, a performance improvement can be achieved.

Examples provided herein are not limiting and processors 1030 can be used as an intermediary device to process data or other content or generate data or other content received from any hardware device besides a network interface such as any hardware accelerator or remote network connected storage. For example, processors 1030 can be an intermediate node among multiple processing nodes and NIM 1032 can manage where data is stored after processing by processors 1030.

Figure 15A:
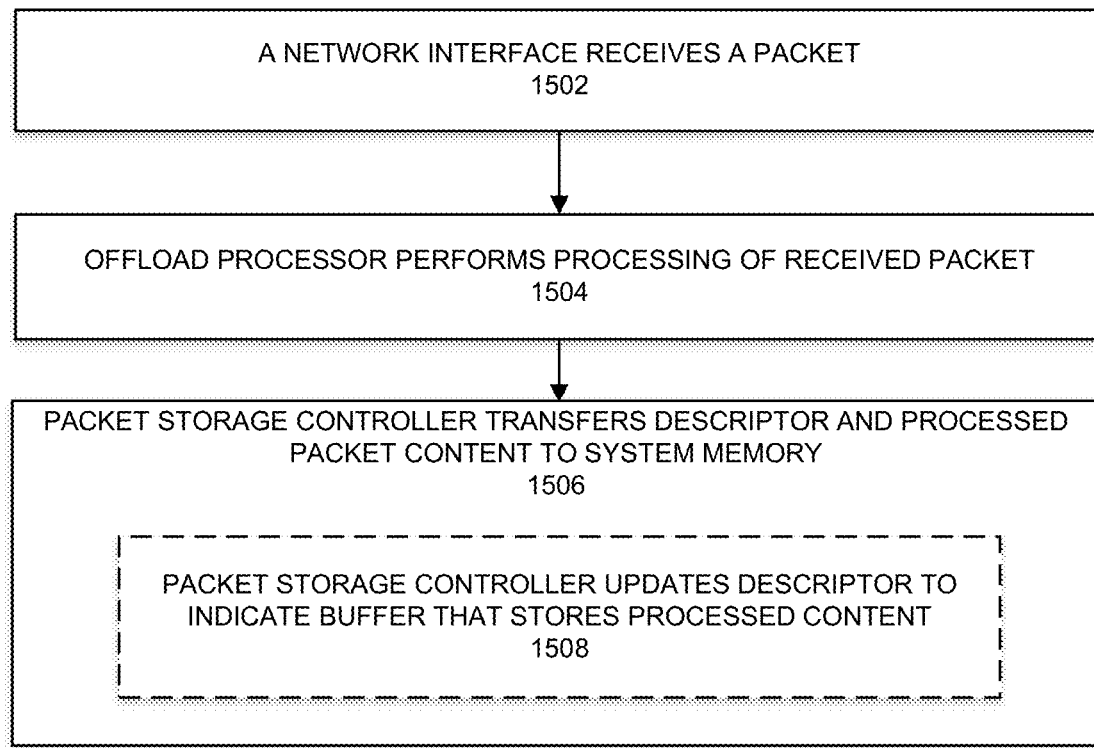
FIG. 15A depicts an example process.

FIG. 15A depicts an example process. This process can be used by various embodiments by an offload processor to modify a descriptor to indicate where data is stored in host memory. At 1502, a network interface can receive a packet and provide the packet to a buffer of an offload processor. For example, a host system can configure the network interface to store received packets in a buffer of the offload processor where the received packet is to be processed by the offload processor. The network interface can complete a descriptor for the received packet to identify a storage location of the packet in a buffer of the offload processor.

At 1504, the offload processor can perform processing on the received packet. For example, offload processing to be performed on the received packet can be configured by an application or VNF or other software or device. For example, offload processing can include one or more of: packet header processing, checksum validation, decryption, access control list (ACL), firewall, and so forth.

At 1506, the packet storage controller can transfer the descriptor for the processed packet and the processed packet contents to a buffer in system memory. In some cases, the packet storage controller includes a Network Interface Manager. At 1508, the storage controller can update the descriptor to identify the storage location of the processed packet contents in a buffer system memory.

In some cases, such as where processed packet contents are to be transmitted after being received (e.g., as part of a service function chain (SFC)), packet storage controller can elect to store the processed content in the buffer and not store the processed content in system memory. A VNF or application can provide a hint that certain packet contents are to be transmitted and in 1508, the packet storage controller can update a descriptor to indicate a storage location of the processed content is in a buffer of the offload processor and provide the descriptor to a CPU. When a VNF or other application requests packet transmission, the network interface can read a transmit descriptor that indicates the packet data is stored in an offload processor buffer and access the packet data from the offload processor buffer.

Figure 15B:
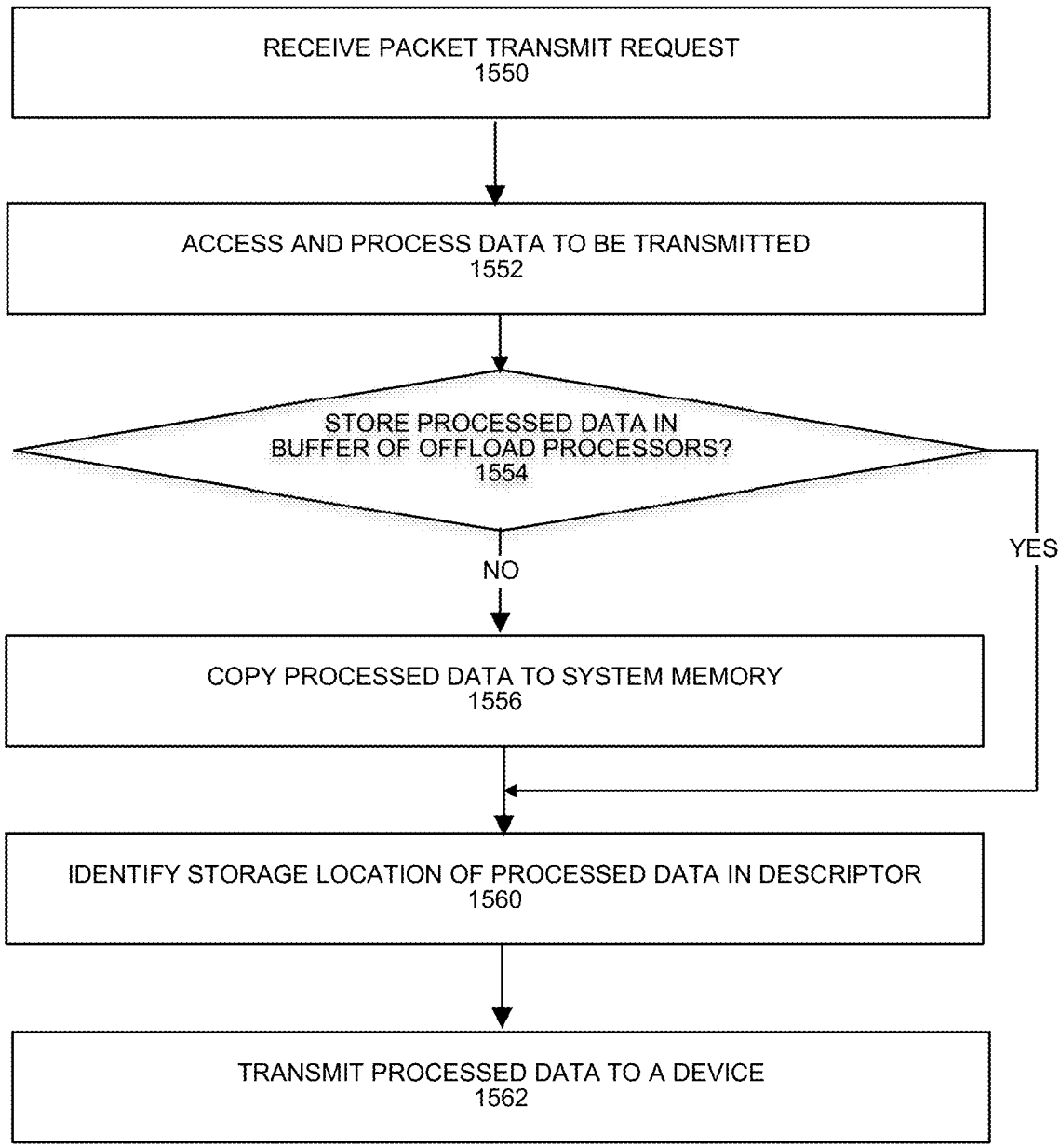
FIG. 15B depicts an example process.

FIG. 15B depicts an example process. This process can be used by various embodiments to determine whether to store data to be transmitted in a buffer of an offload processor or a host memory. At 1550, a packet transmit request is received at an offload processor. For example, a VNF or application can provide a descriptor for a packet and indicate where the data to be transmitted is stored in system memory. At 1552, an offload processor can access and process data to be transmitted. For example, on the received data, offload processor can perform one or more of: packet processing (e.g., header parsing, flow identification, checksum validation, encryption, secure tunneling (e.g., Transport Layer Security (TLS) or Secure Sockets Layer (SSL)), or other operations.

At 1554, after processing the data, a packet storage controller can determine whether to store processed packet data in a buffer of the offload processor or store the processed data in host memory prior to transmission. For example, low latency or high priority packets can be stored in a buffer of the offload processor whereas high latency or low priority packets can be stored in system memory. In some cases, if the buffer of the offload processor does not have enough space or its fullness level is beyond a threshold, processed data can be stored in system memory. Available bandwidth of an interface between offload processor and the system memory can also be taken into account to determine whether to copy data to system memory. If the packet storage controller determines to copy processed data to system memory, 1556 can follow. If the packet storage controller determines to not copy processed data to system memory, 1560 can follow.

At 1556, data can be copied to system memory by the offload processor. At 1560, the packet storage controller can update a transmit descriptor to indicate whether data is stored in a buffer of the offload processor or in system memory. At 1562, the network interface can read a transmit descriptor from a descriptor ring of the packet storage controller and access the data for transmission.

Host Interface Manager (HIM)

Figure 16:
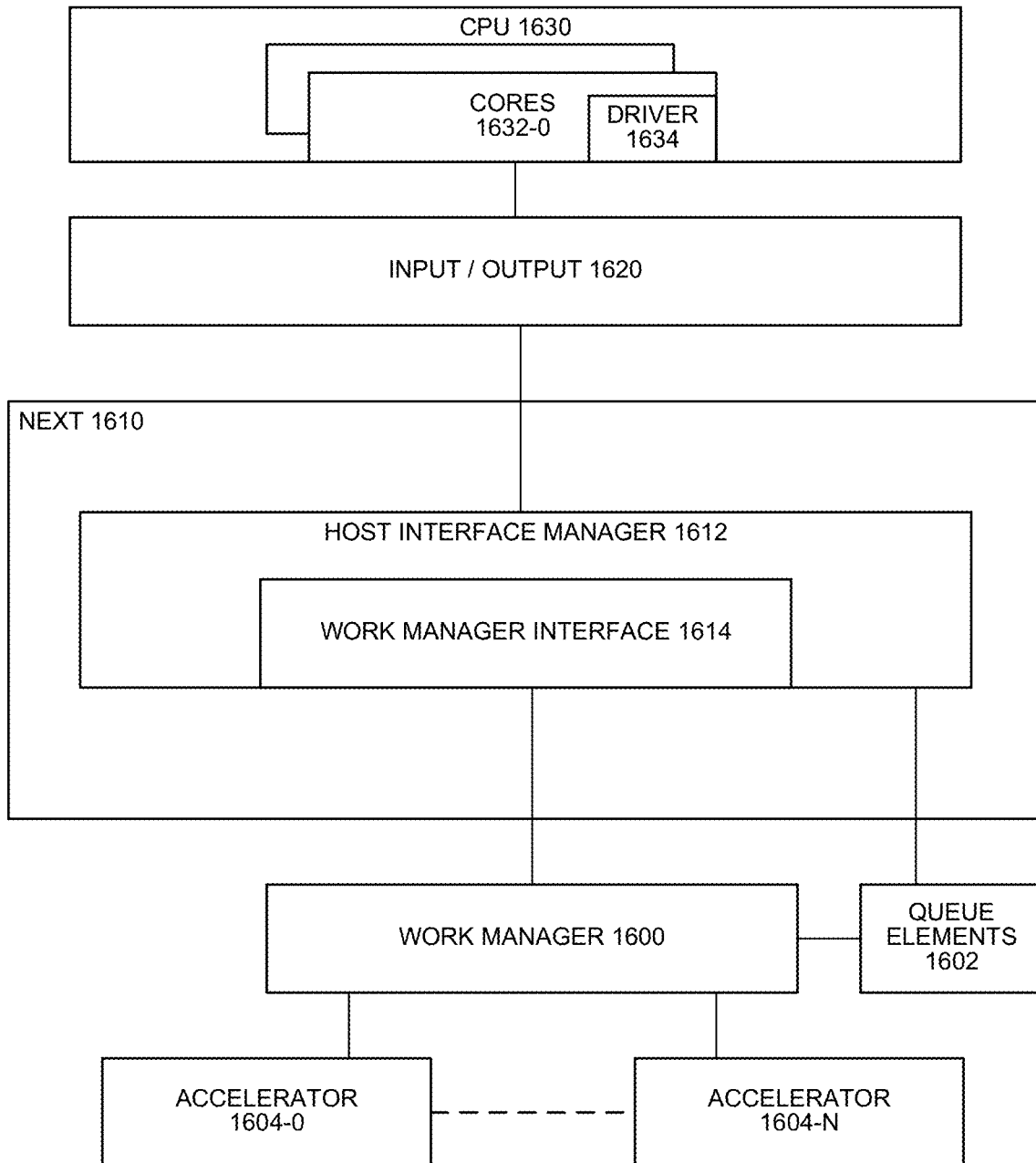
FIG. 16 depicts an example of an host interface manager (HIM).

FIG. 16 depicts an example of an HIM as used as an interface to a work manager. HIM 1612 can provide a connection of NEXT 1610 to host CPU 1630 as well as other devices (e.g., work manager 1600 and accelerators 1604-0 to 1604-N). HIM 1612 can be configured as a work manager agent, and translate or transfer communications from work manager 1600 (e.g. QMD) to NEXT 1610 or NEXT 1610 to work manager 1600.

In some examples, HIM 1612 can be accessed by a core (e.g., any of cores 1632-0 to M) of CPU 1630 using driver 1634 such as an emulated host interfaces exposed as Adaptive Virtual Function (AVF) or virtIO device, or using SR-IOV or SIOV. If an application executing on CPU 1630 requests load balancing services of work manager 1600, the application may dedicate a thread for bridging between NEXT 1610 and work manager 1600 on packet ingress and packet egress. Depending on performance requirements, a single thread might be able to perform both tasks. Such arrangement leads to threads that are unavailable for application tasks. In some examples, the application can offload management of load balancing to HIM 1612. HIM 1612 can use or include a work manager interface 1614 that can manage descriptor translation and communicate with work manager 1600 and free a thread to perform other tasks. In some examples, a work manager interface 1614 can aggregate all traffic from an application into one or more queue elements or work queues.

If a customer has a firewall or pre-classification engine security ASIC or FPGA packet engine to add special headers, then HIM 1612 can perform descriptor translation so that the firewall or pre-classification engine security ASIC or FPGA packet engine can process packets and the application does not need to manage network input/output (I/O) (e.g., QoS or traffic).

Work manager 1600 can load balance performance of services such as packet processing or other activities whereby a stream of packet descriptors can be sent to the work manager 1600 for distribution across multiple accelerators 1604-0 to 1604-N or other processors. Packet descriptor formats provided by a host can be any format including internal or vendors-specific formats.

In some examples, where work manager 1600 allows transfer for P Byte sized Queue Elements (QEs) 1602, where P is an integer such as 16, 32, 64 or other powers of 2, a full packet can be stored and represented using one or more QE. QEs 1602 can be allocated in system memory or other memory. An address of a packet in a buffer in memory can be stored in a QE, and any additional metadata, (including SGL information (described herein) if the packet is stored using multiple buffers), can be provided with the packet data itself in a QE. For example, headroom can be at the start of each a buffer supplied to the NIC or NEXT 1610. For example, DPDK allows reserving the first 128B of each buffer for metadata, and another 128B for headroom or other uses.

In some examples, for packet receipt, HIM 1610 can prepend metadata before a start of a packet in a QE. In some NICs, use of a Virtual Station Interface (VSI) could distribute received packet traffic statically using receive side scaling (RSS) across one or multiple cores. Using work manager 1600, HIM 1610, or a NIC can copy received traffic to a QE and the contents of the QEs load balanced across a number of cores, accelerators, or other devices for processing. Per VSI configuration could allocate queue identifiers (QID) whether such received traffic is ordered/atomic.

Empty receive buffers can be supplied by cores to NEXT 1610. To allow batching, a single QE can point to a list of N such empty buffers. As noted above, unlike AVF, a given thread can be provided packets whose buffers were supplied by other cores. In some examples, work manager 1600 can manage distribution of contents among queues for cores, devices, or accelerators.

For packet transmission, software running on CPU 1630 can prepend any necessary metadata (such as requested offloads) to the packet and provide a pointer to the packet in a QE to work manager 1600. A NEXT VSI processes content of the QEs and forwards the content to be processed to the NEXT pipeline for processing by one or more accelerators 1604-0 to 1604-N. Completion buffers can be returned to the application in a single memory based queue.

In some examples, HIM 1612 could determine packet priority (as described herein) and provide packet priority as part of the QE for access by work manager 1600.

Figure 17:
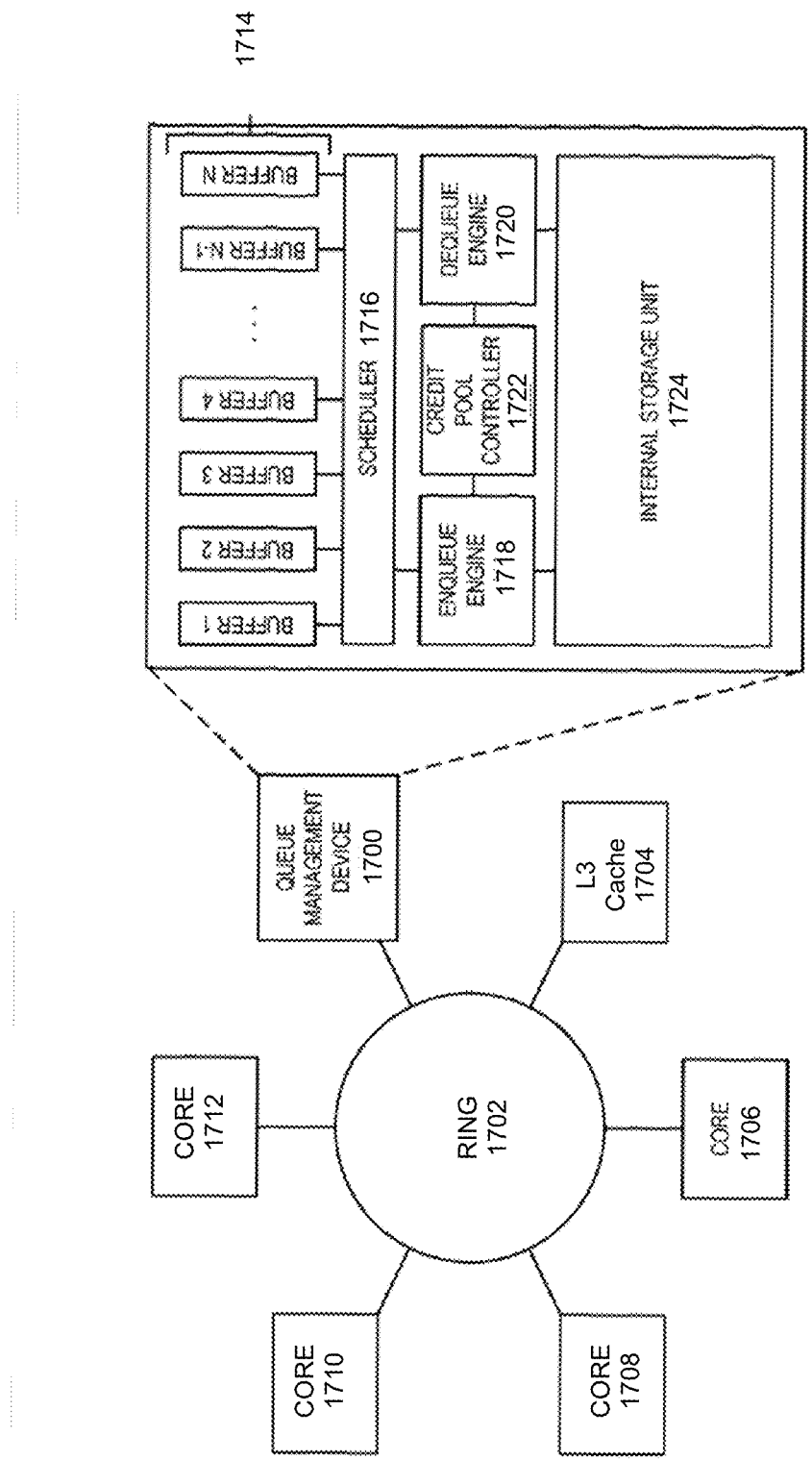
FIG. 17 depicts a schematic diagram showing an exemplary system utilizing a queue management device (QMD)

FIG. 17 depicts a schematic diagram showing an exemplary system utilizing a queue management device (QMD) (also referred to as a "work manager") according to an embodiment. QMD 1700 can be attached to any or a combination of a high-speed or network-on-chip ("NoC") interconnect, a network, mesh, or a bus. Ring (interconnect) 1702 is shown in the figure as this interconnect but other network formations, such as a mesh or network-on-chip may be also used. Any intermediate protocol-conversion block can be used between ring 1702 and QMD 1700. The high-speed interconnect connects the CPU cores 1706-1712 and L3 cache 1704 with QMD 1700. Although not illustrated in the diagram, there may be additional CPU cores, L3 caches, and/or other devices connected to the high-speed interconnect. The connection between the CPU cores 1706- 1712, L3 cache 1704, and QMD 100 may be a special dedicated interconnect or an existing shared interconnect. In other examples, other hardware devices can be coupled to ring 1702 such as accelerators, network interfaces, storage, memory pools. Enqueue and dequeue requests sent out by the CPU cores will be routed to the QMD. In one embodiment where acknowledgement is required, the QMD would send a response back to the requesting core after each successful enqueue or dequeue operation to acknowledge the completion of the request. In another embodiment, where acknowledgement is not required, a path between the requesting core and the QMD allows a request to be submitted without returning an acknowledgement back to the requesting core, so long sufficient request resources are provided or reserved. The QMD 100 can include one or more buffers (collectively labeled as 1714), a scheduler 1716, an enqueue engine 1718, a dequeue engine 1720, a credit pool controller 1722, and an internal storage unit 1724.

Enqueue and dequeue requests sent from the requesting CPU cores is first received and stored by the QMD 1700 into one of the buffers 1714. The buffers 1714 temporarily store the incoming requests as QMD 1700 may not have enough resources or bandwidth to serve all the incoming requests at the moment they are received. In some embodiments, the buffers are first in first out (FIFO) queues where the first request into the buffer will be the first request out of the buffer. In one embodiment, a subset of buffers is allocated to store only enqueue requests while another subset is reserved for only dequeue requests. Other ways for allocating the buffers, such as by core, by thread, by request type, by priority, service level agreement, etc., may also be used. A single priority level may be assigned across all the buffers to simplify implementation and to maximize throughput. Alternatively, multiple priority level may be implemented to support fine-grained Quality of Service (QoS) features. For example, given n priorities, every enqueue and dequeue buffer pair may be assigned a different priority such that n buffers are allocated for enqueue requests and n buffers are allocated for dequeue requests. Each incoming request has a priority that is either pre-assigned by the requesting core/thread or assigned by the QMD upon receipt by the QMD. Each request is then stored in a buffer that corresponds to the request's priority (1-n) and/or type (enqueue or dequeue) and/or other parameters.

Scheduler 1716 chooses a buffer and selects one or more requests from the head of buffer. The buffer is chosen according to a scheduling policy. Various scheduling policies, such as Round Robin, Weighted Round Robin, preemptive priority, and a combination of these and other policies may be implemented. In a Round Robin policy, for example, the buffers are simply chosen sequentially, e.g., lowest buffer ID to the highest, or vice versa. If a chosen buffer is empty, scheduler 1716 selects from a different buffer. In some embodiments, scheduler 1716 is aware of empty buffers and may skip a selection of such buffers to improve performance. In a Weighted Round Robin policy, scheduler 1716 chooses and serves each buffer sequentially based on their associated priority. The ability to control the order in which to serve the buffers is called request-level flow control. After choosing a buffer and selecting one or more requests from the head of the chosen buffer, the scheduler 1716 schedules each selected requests for execution by either the enqueue engine 1718 or the dequeue engine 1720 according to the request type.

The enqueue engine circuit 1718 and dequeue engine circuit 1720 read and write to the QMD's internal storage unit 1724 through dedicated ports. An enqueue request executed by the enqueue engine 1718 causes one data item to be inserted into the internal storage unit 1724. A dequeue request executed by the dequeue engine 1720 causes one data item to be retrieved from the internal storage unit 1724 and sent to the output queue. If a request cannot be executed by the enqueue or dequeue engine, it may be inserted back to the tail of the buffer to be processed later. This reduces the chances of deadlocking a requesting core or device The internal storage unit 1724 is used for storing queues and queue entries. It may be comprised of Static Random Access Memory ("SRAM"), Dynamic Random Access Memory ("DRAM"), or any other suitable memory technology. The internal storage unit 1724 is configurable to support any number of queues as well as different queue sizes.

In some examples, work manager can be used in a single root input/output virtualization (SR-IOV) or Scalable I/O Virtualization (SIOV) virtual machine (VM)-enabled example usage. SR-IOV is compatible at least with specifications available from Peripheral Component Interconnect Special Interest Group (PCI SIG) including specifications such as Single Root I/O Virtualization and Sharing specification Revision 1.1 (2010) and variations thereof and updates thereto. SIOV provides for scalable sharing of I/O devices, such as network controllers, storage controllers, graphics processing units, and other hardware accelerators across a large number of containers or virtual machines. A technical specification for SIOV is Intel® Scalable I/O Virtualization Technical Specification, revision 1.0, June 2018. SR-IOV is a specification that allows a single physical PCI Express (PCIe) resource to be shared among virtual machines (VMs) using a single PCI Express hardware interface.

NIC Interface Manager (NIM)

Figure 18:
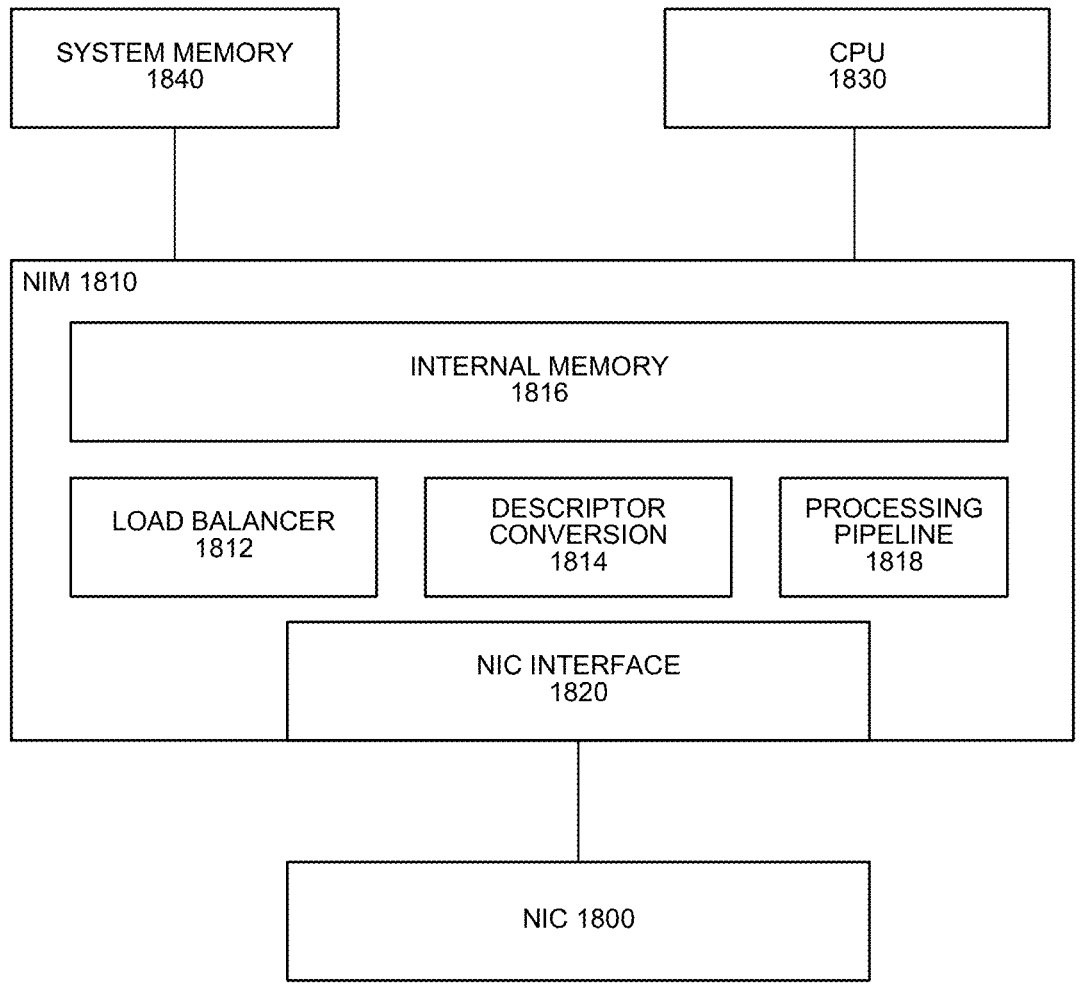
FIG. 18 depicts an example of a NIM.

As referenced in FIGS. 8B and 10, NIC manager (Mgr) (NIM) can provide communication and an interface between one or more NICs and NEXT. A NIC can include one or more of: forwarding element, router, switch, network interface controller, network interface card, infrastructure processing unit (IPU), and others. FIG. 18 depicts an example of a NIM. In some examples, the host can interact with NIM 1810 as though communicating with NIC 1800. In some examples, NIC 1800 can interact with NIM 1810 as though communicating with a host. In some examples, NIC queues in system memory 1840 can be allocated to NEXT so that NEXT can write descriptors and doorbell registers to NIC 1800. In some examples, NEXT can communicate with a NIC using a device interface (e.g., CXL, any variant of DDR, PCIe, or others).

In some examples, at least an interrupt driven driver or poll mode driver executing in the host CPU 1830 can communicate with NIC 1800 and provide NIC 1800 with descriptors. NIC Interface Manager (NIM) 1810 can provide a communication interface between NEXT and one or more discrete or integrated NICs 1800. In some examples, NIM 1810 can be responsible for management of received and transmitted packets and serve as an interface between CPU 1830 and one or more NICs 1800.

Different NICs from different vendors (e.g., Intel, Mellanox, Broadcom, Cisco) can utilize specific doorbell or completion queues or write-back descriptors. In some examples, NIM 1810 can perform one or more of: process completion events from NIC 1800; convert NIC 1810 specific receive descriptors to internal descriptor NEXT format; store received packet in NIM's internal memory 1816 or in memory of NEXT; create corresponding event for NIC 1800, including processing descriptors such as doorbell or completion; provide packets to be transmitted by NIC 1800 to internal memory or system memory to be accessed by the NIC; or convert NEXT format descriptors to NIC specific format. By providing descriptor conversion, NIM 1810 can provide flexibility for use of any vendor's NIC or any type of NIC.

For example, descriptor conversion 1814 (e.g., microcontroller, microcores, firmware engines) of NIM 1810 can be configured to perform one or more of: configure descriptor conversion format and convert descriptor format from NEXT native to NIC format to emulate host driver behavior for any number of NIC types in order to allow NEXT to communicate with NIC 1800.

NIM 1810 can utilize NIC interface 1820 to communicate with NIC 1800. NIM 1810 can allow for new or different NICs to be supported. NIM 1810 can utilize a firmware (FW) engine to emulate host behavior for a number of protocols. NIM 1810 can run on embedded microcontroller (e.g., descriptor conversion 1814) and convert formats of descriptors of different NICs to the NEXT internal format. NIM 1810 can keep NIC descriptor definitions in a tabular form, storing descriptors fields' mapping from NIC to NIM format. Mapping tables can be loaded from storage (e.g., non-volatile memory) according to a selected NIC to be attached to the NEXT.

Mapping table can include a NEXT internal format, field by field. Field entry can provide a field's offset in the NEXT descriptor and length. Mapping table can include a NEXT field information about a corresponding NIC's descriptor field such as: field valid or not, offset, length and bit order (endianness). When a new NIC is released, or customers request support for a specific NIC, an NVM part of the firmware engine can be updated to add new device to the list of supported NICs.

Descriptor conversion 1810 can modify one or more fields of an input descriptor and provide an output descriptor format. For example, an input descriptor format can be a NIC descriptor format and an output descriptor format is NEXT compatible. For example, a descriptor can include one or more of the following fields: packet length, packet type, error and validity flags, some other metadata extracted from the packet, like L2 tags (VLANs) as well as other fields described in Intel® Ethernet Adaptive Virtual Function (AVF) Hardware Architecture Specification (HAS) (2018). A mapping table can include information of how these fields can be converted to internal format and additional information, such as offset of the field in the internal descriptor, flag to indicate validity of the field and bit order, field action type, for example, if this field shall be used to assign packet's priority (or mapped to the next packet processing stage).

In some examples, using processing pipeline 1818, NIM 1810 can perform prioritization or allow FXP of a processing pipeline to do so. For example, as described herein, NIM 1810 can perform distributed packet classification by processing packets inline to extract data from descriptors to provide hints for a next processing stage to determine priority classification earlier in pipeline before FXP to minimize latency and congestion at the FXP and later stages. In some examples, FXP includes any or all elements in FIG.

8B (e.g., packet processing, network security, defragmentation, baseband processing, media process, and so forth). In some examples, NIC 1800 can perform packet classification and provide classification to NIM 1810 and NIM 1810 can perform prioritization using load balancer 1812. In some examples, NIM 1810 can perform classification and prioritization.

For example, as described herein, NIC 1800 or NIM 1810 can perform processing of packets using processing pipeline 1818 and store classification and priority of packets and determine which memory (e.g., internal NEXT memory or system memory or other memory) to use to store a packet for transmission. For example, higher priority packets can be stored in NEXT memory or lower priority packets can be stored in host memory. In some examples, where designated for processing by NEXT, received packets are stored in internal NEXT memory.

For example, for a packet transmit operation, a host can run a data plane driver to provide descriptors in a ring and provide a doorbell to NIC 1800 whereby a driver updates a pointer in NIC 1800 and points to a location of a last provided descriptor. In some examples, NIM 1810 can fill in descriptors and provide the doorbell to NIC 1800. NIC 1800 may now have knowledge of whether NIC 1800 is communicating with NIM 1810 or a CPU. NIM 1810 can determine which packet is to be transmitted and what NIC to use and what ring on the NIC to write a descriptor to. In some examples, NIM 1810 can write packets for transmission to memory, where memory can be internal NEXT memory (e.g., SRAM) and/or memory that is shared with CPU.

For received packets, NIM 1810 can associate a packet with a receive descriptor from the NIC. Descriptors and received packets may be provided to different destinations (e.g., CPU or particular processor available to NIM 1810). Packet buffers can be allocated and linked to descriptors as described with respect to FIG. 21.

Figure 19:
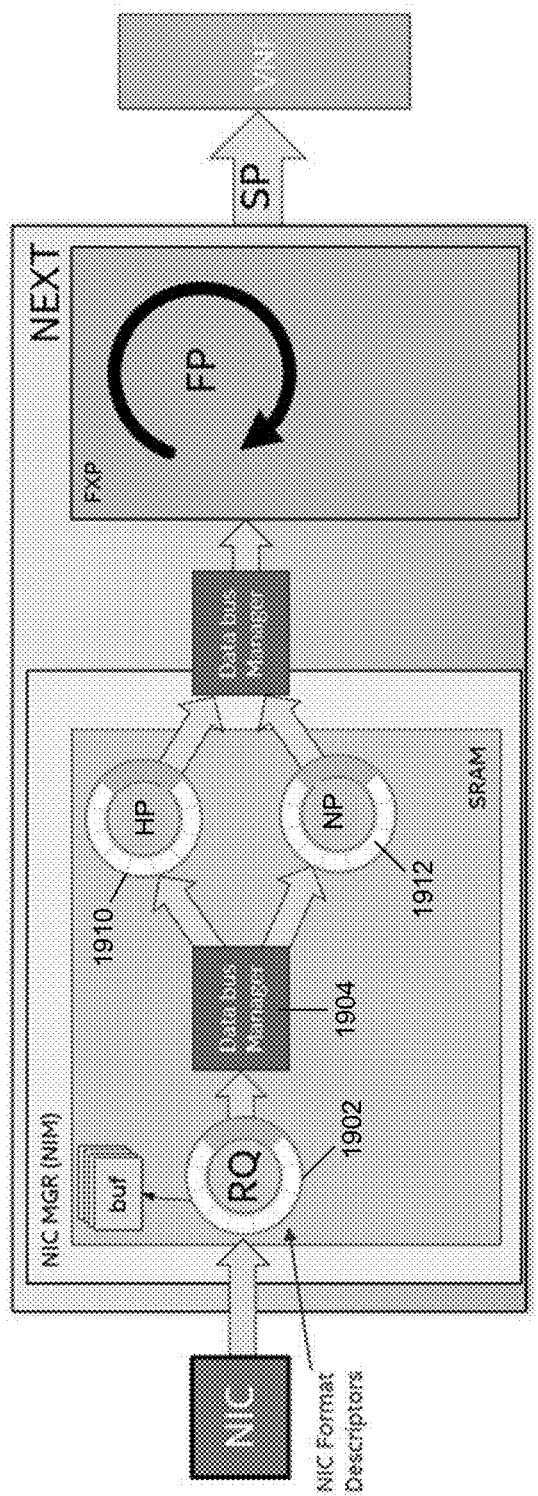
FIG. 19 depicts an embodiment of an embodiment of a NIM.

FIG. 19 depicts an embodiment of a NIM. NIM can maintain at least three ring buffers. A receive queue (RQ) ring buffer 1902 can be provided for a NIC to post packets to. A high priority or low latency ring buffer can be provided for a next or subsequent packet processing stage to access packets. A normal priority or normal latency ring buffer can be provided for a next or subsequent packet processing stage to access packets.

When a packet is received by the NIM on the receive descriptors ring queue RQ 1902, the NIM can analyze the packet descriptor using data bus manager 1904 to determine if the packet corresponds to priority criteria configured by software by use of a mapping table described earlier. NIM can place high priority packets into high priority ring buffer HP 1910 to be processed by the next stage as soon as possible. NIM can place normal priority packets into the normal priority ring buffer NP 1912. Faster path packets can be provided with lower latency access to the NEXT packet processing pipeline using offload engines available to process.

In some examples, NIM can apply priority matching criteria, for example, using one or more of the following fields of the receive descriptors: n-tuple (e.g., one or more of: source IP address, source port, destination IP address, destination port, and transport protocol utilized), Packet type (PTYPE) (e.g., GTP-C or PFCP packets), VLAN VID value, L2 tags (VLAN, MPLS) priority fields, TCP flags, or any arbitrary data extracted to programmable descriptor (CLV, for example, can extract IP addresses, DSCP bits, ESP SPI fields and so on).

Inline Packet Handling

In some CPU generations, there was no dedicated channels for traffic among peers. Such traffic among peers was carried on a common fabric, and as such, it could cause high occupancy of this fabric, leading to congestion which would inevitably affect the performance of CPU cores using the same fabric. Some CPUs have a dedicated peer-to-peer fabric such as UPI so that such traffic can stay off the infrastructure shared with the cores. In some embodiments, one or more NIC and NEXT communicate peer-to-peer using a dedicated fabric. Some NICs can have their own PCIe interface to NEXT.

Providing Tx traffic can involve provisioning adequate buffering internally in NEXT. One difficulty is that the amount of traffic "inflight" between NEXT and NIC can be very high. Inflight traffic is traffic that NEXT has made available and ready to send (and may already have issued a doorbell to the NIC for), but the NIC has yet to read the packet buffer. The maximum capacity is a function of the number of queues or buffers, queue length and Txdata length.

Additionally, the hierarchical quality of service (HQOS) (e.g., as implemented by Traffic Mgr of FIG. 8B) had potential to buffer further traffic, so for area reasons, Tx traffic is buffered in system memory, meaning it traverses the main shared fabric. The Tx descriptor rings can be located in NEXT device memory, so Tx descriptor reads and writes can be peer2peer accesses.

A P2P scheme can be used for inbound traffic. Descriptor rings and packet buffers accessible to a NIC could be located in memory regions mapped into NEXT Memory-mapped I/O (MMIO) space, such that accesses to these locations by the NIC could use traffic over P2P.

In some examples, NEXT can sink or buffer the inbound (Rx) traffic and source the outbound (Tx) traffic in manners described next.

Figure 20A:
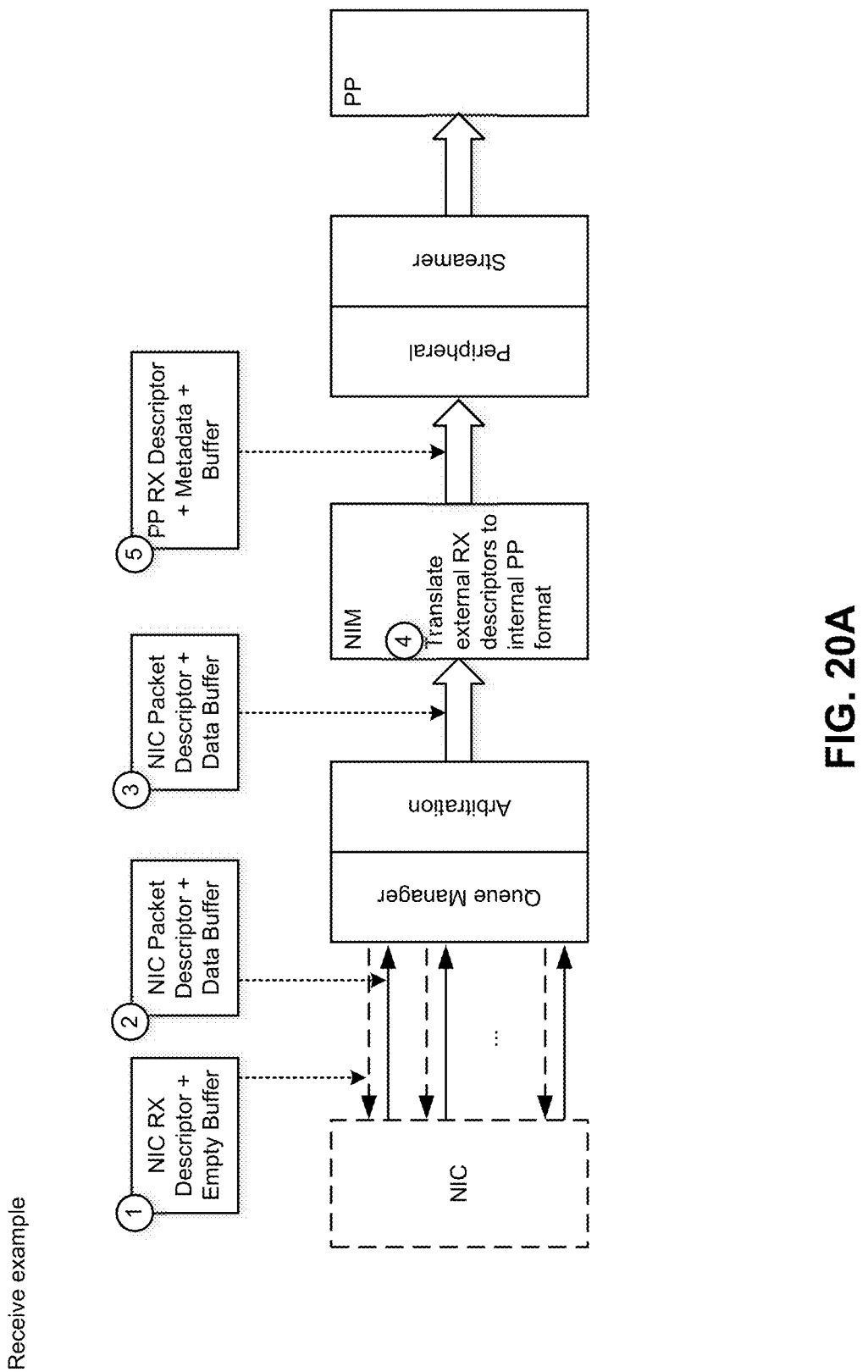
FIG. 20A depicts an example flow for a processing of a received packet.

FIG. 20A depicts an example flow for a processing of a received packet. At (1), a NIC can receive a receive (RX) descriptor indicating an available buffer to store a received packet. The available descriptor and buffer can be identified in accordance with embodiments described herein that provide a correspondence between descriptor position and buffer location. For example, the NIC can read descriptors from descriptor ring in memory region of PCIe MMIO region of NEXT. As described herein, in some examples, an assignable device interface (ADI) can be allocated for each different ring. At (2), the NIC can provide a received packet to an available buffer and descriptor to a queue manager of NEXT. At (3), after arbitration as to which descriptor is advanced to processing by the NEXT, the NIC packet descriptor and data buffer can be identified to NIM. At (4), the NIM can translate a descriptor format to a packet processing pipeline format and at (5), the NIM can provide the translated descriptor and associated metadata and identified buffer for streaming to the packet processing pipeline (PP) for processing.

Figure 20B:
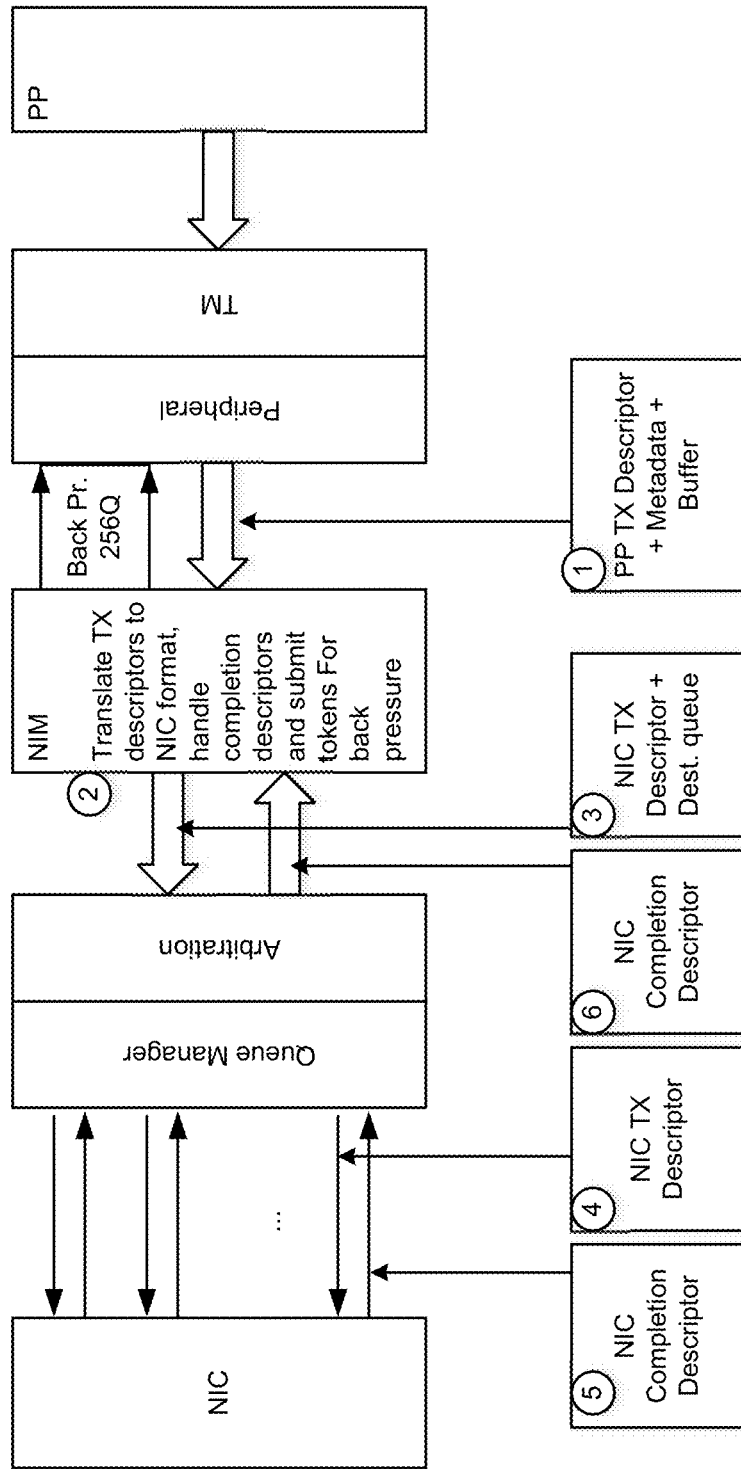
FIG. 20B depicts an example flow for a transmit operation.

FIG. 20B depicts an example flow for a transmit operation. At (1), a packet processing pipeline (PP) can provide a transmit (TX) descriptor through a traffic manager (TM) indicating metadata and an associated buffer store a packet to be transmitted. The available descriptor and buffer can be identified in accordance with embodiments described herein that provide a correspondence between descriptor position and buffer location. At (2), the NIM can translate TX descriptors to NIC compatible format, handle completion descriptors and submit tokens for back pressure. At (3), the NIM can provide the NIC TX descriptor and destination queue identifier for arbitration to determine which descriptor is advanced to transmit by the NIC. At (4), the TX descriptor in the NIC recognized format is provided to the NIC. At (5), the NIC can provide a completion descriptor indicating completion of the transmit operation. At (6), the NIC completion descriptor can be provided to the NIM for tracking completion of transmit operations.

Figure 21:
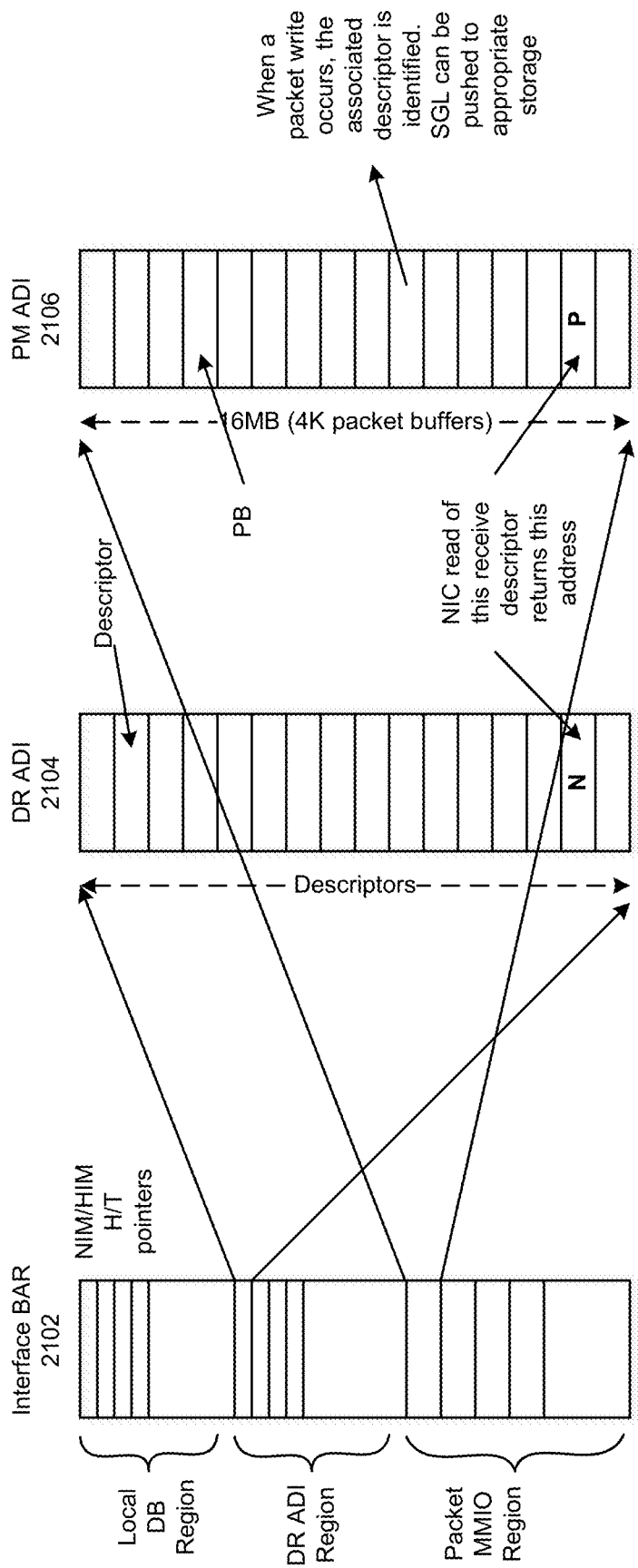
FIG. 21 depicts an example of manner of associating descriptors with packet buffer addresses in connection with packet receipt for copying of packets received by a NIC to NEXT.

FIG. 21 depicts an example of manner of associating descriptors with packet buffer addresses in connection with packet receipt for copying of packets received by a NIC to NEXT. In some examples, where NEXT is a PCIe device and internal to the CPU socket and connected to a CPU, NEXT can be allocated PCI Base Address Register (BAR) ranges that can sink reads or writes to a large address range. A BAR 2102 can be used to specify how much memory to map in main memory for the NEXT. In some examples, the BAR is split into regions for a descriptor ring, shown as descriptor ring assignable device interface (DR ADI), and for packet buffers, shown as packet memory (PM) ADI. ADIs are described in SIOV for example. The ADIs can be regions of MMIO space on the NEXT where DR ADI 2104 can be a region of the descriptor ring and PM ADI 2106 can be a region of packet buffer. When NEXT is accessible as a PCIe device, NEXT has allocated MMIO BARs which cover several GB of the system memory space. Descriptor rings can be mapped into one or more of these BARs for communication with the NIC. In some examples, there is a DR ADI for each ring. In some examples, packet buffer addresses provided to the NIC can be from this region.

A region of the BAR can be allocated for a doorbell (DB) region with HIM head and tail (H/T) pointers that are used by HIM. On the HIM side, NEXT appears as a NIC and the host software loads descriptors and delivers a doorbell. From the NIM, NIC descriptor reads/writes reach NIM directly and can be detected and a doorbell may not be used. However, NIM can issue doorbells to the NIC, as a write to the NIC memory space.

In some examples, 64 MB of BAR can be allocated for DB region, 256 MB of BAR can be allocated for DR ADI 2104, and 4 GB of BAR can be allocated for packet memory mapped input output (MMIO) such as PM ADI 2106, however any sizes of regions can be allocated. MMIO can use the same address space to address both memory and devices and memory and registers of the I/O devices are mapped to and associated with address values such that when an address is accessed by the CPU, the address may refer to a portion of physical memory or a memory of the device.

In some examples, a descriptor size can be any size such as 16B, 32B, or 64B. For example, a descriptor in DR ADI 2104 can refer to a packet buffer (PB) in PM ADI. In some examples, a PB can be a 2 KB size region of the address space, although other sizes can be used. In some examples, addressing can be configured so that a descriptor read from location N of a descriptor ring R can always point to a same PB address P. Conversely, when this PB address P is accessed (written) by the NIC to write a received packet, use of the address P corresponds to a descriptor at location N of a ring R. In some examples, a descriptor ring can be assigned to a virtual function. A linear address correlation can be setup between descriptor slots in DR ADI and corresponding PB in PM ADI such that a PM address=PM ADI BASE+N*buffer_size. In some examples, a descriptor address=descriptor ring base+N*desc_size. When a NIC writes data into a particular PB of a NIM, the NIM can identify a corresponding descriptor location for the particular buffer and access the descriptor.

NIM can update the receive tail (RxTail) pointer of the NIC queue when it perceives that the NIC is short of descriptors. Generally, NEXT can provide the NIC with a full ring of descriptors. NEXT will try to keep the ring as full of empty descriptors but can provide descriptor locations that it has previously finished processing. As described earlier, the descriptor ring is mapped into NIM MMIO space in a descriptor ring region. Descriptor reads by the NIC can be routed to NIM and NIM can determine the ring index by a decode of the address being read from a descriptor ring.

In response to a descriptor read, the NIM can respond with a so-called "fake" descriptor with merely a pointer to a corresponding PB that points to a NIM queue/buffer/ring and not where packet would be stored. If a descriptor N is the descriptor at address RING BASE+N*descriptor_size, then the address provided when it is read is PM_BASE+N*buffer_size. There can be multiple "PM_BASE/RING_BASE" pairs. In other words, in response to a descriptor read by the NIC, the NIM can generate a "fake" (e.g., empty) descriptor in real time with a pointer to an address location of a packet buffer region in the memory of the NIM. A descriptor read from location N of ring R provides a corresponding packet buffer of address P in packet memory. Furthermore, when a packet buffer address is accessed (written) by the NIC, a decode of the address can identify that a corresponding descriptor N on ring R.

Various embodiments of NIM use an internal memory (e.g., SRAM or other type of memory) to buffer inbound received packets and the internal memory can be managed as a group of 256B buffers. However, the size of the buffer can be adjusted based on an expected received packet size. The 256B buffer size can remain fixed and buffer size can be increased using varying numbers of 256B buffers. Given the scarcity of internal memory, it can be desirable to have smaller buffer sizes so that smaller sized packets do not occupy larger buffers that leads to underutilized memory. For a received packet, the NIC copies content of the received packets into buffers identified in descriptors fetched from the NIM. For example, the NIC can write packet data directly to NIM memory using a P2P fabric or other communication interface.

In some examples, NIM does not need to provide 2048B buffer region in internal memory to store packets and instead NIM can break up packet data and put 256B packet data chunks into internal memory. The NIC can write packet data into the memory of the NIM as 256B (or other sized) increments. The NIM can decode the packet address in memory written-to to determine a corresponding descriptor even though such descriptor has not yet been written back by the NIC. In some cases, NIM can store packet data into multiple buffers in internal memory and create a scatter gather list (SGL) to identify the buffers that store the packet. For example, 2048B packet content can be stored into 256B increments of packet content can be stored into 8 buffers identified in an SGL. There can be a 1:1 correspondence between each SGL and each descriptor. The NIM can infer that the packet write has completed by detecting a write to another packet buffer or a descriptor write.

After data is written to memory, the NIC can write a completed descriptor into DR ADI 2104 and NIM can infer a position of SGL pointers as in a corresponding position in the PB as that of the completed descriptor. The NIC can write a completed descriptor to the origin position of the receive descriptor with meta data. The NIM handles descriptors subject to QOS policies as there may be many queues between NIM and NIC. When the NIM processes the Rx descriptor, the SGL can be copied or read from the corresponding SGL location and forwarded to the NEXT processing pipeline as part of meta data for the packet segments associated with the SGL to be processed. Note that this scheme allows a packet to chain multiple descriptors such as may occur for jumbo packets. As described herein, NIM can convert NIC descriptor format into NEXT format and reunites NEXT format with data and sends data for further processing. For example, a streamer can read the data from the buffers in the SGL and stream them to further processing, along with the descriptor content. When processing is completed, one or more 256B buffers can returned to the buffer manager so they can be reused by later packets.

Packet transmission scheme can use a NIM buffer manager that manages system memory buffers, provided by the VNFs at initialization. A similar buffer manager in NIM Rx can manage the 256B SRAM buffers. NIM can allocate these buffers (e.g., 2 KB granularity) to packets in system memory and store the packets in these locations prior to transmission. A NIC can read descriptors from the NIM but read data from system memory. An entry in DR ADI 2104 can be used for transmission. Tx descriptors pointing to these locations in system memory can be created and stored internally in the NIM, and the NIM can issue a NIC doorbell based aggregated packets for transmit or a timeout. The NIC can issue descriptor reads in response to the NIC doorbell and NIM can provide the stored descriptors over P2P to the NIC. The resulting packet reads by the NIC are from system memory buffers, not internal NIM memory. Completion writebacks by the NIC can be routed to NEXT and processed by NEXT. Completions can be writes to the descriptor ring that is part of a Tx DR ADI, and are detected. Completions allow the associated buffers to be freed to the buffer manager of NIM.

Figure 22:
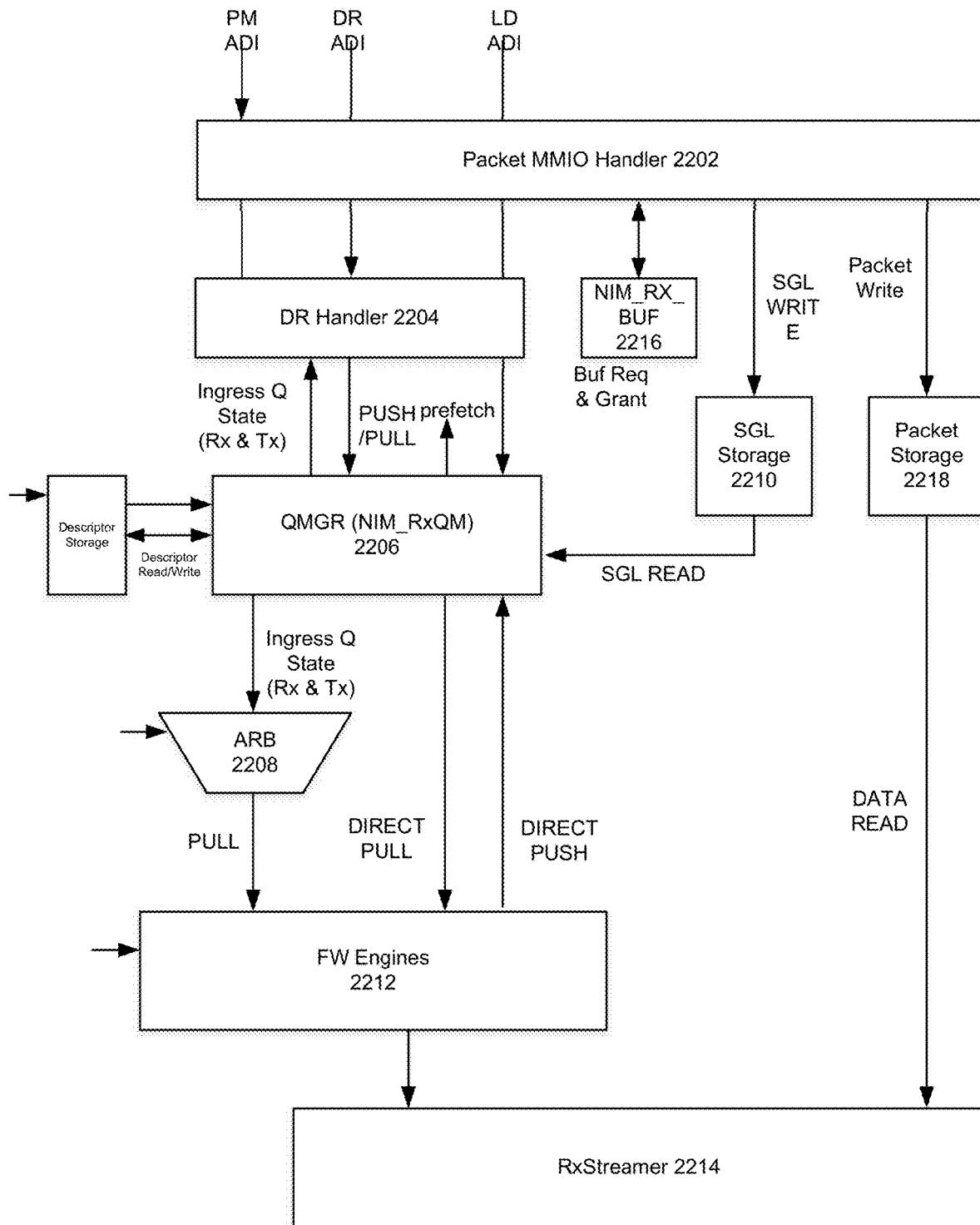
FIG. 22 depicts an example system that can be used to process received packets.

FIG. 22 depicts an example system that can be used to process received packets. A decoder (not shown) can provide inputs to a receive (RX) interface. Traffic from the NIC addressed to the DR/PM ADIs can be routed through the packet MMIO handler. Packet MMIO handler 2202 can obtain identifiers of available buffers from a buffer manager NIM_RX_BUF 2216 and store the data written in packet storage 2218. An SGL can include a list of buffers and include metadata (e.g., how many of the buffers are valid and an error flag which is set if an error occurs). As noted above, the list of buffers used for a written back packet can include an SGL and such SGLs can be stored in SGL storage based on the PM ADI buffer address. Various embodiments provide a 1:1:1 correspondence between packet buffer address, descriptor offset in ring and SGL location.

For data received from the NIC, packet MMIO handler 2202 can manage packet writes to packet memory. In some examples, for a packet write, a maximum data write for a descriptor is 2 KB but a buffer size in internal memory of the NIM can be smaller, e.g., 256B. Packet MMIO handler can use SGLs to allocate portions of packets that are larger than 256B to multiple buffers to save reserved memory space and not have too much unutilized internal memory.

NIM_RX_BUF can store address available for storage. Packet MMIO handler can write to packet storage using granted addresses from NIM_RX_BUF. Packet MMIO handler can create SGL pointers for packet portions written to packet buffers. For completed descriptors received from NIC, descriptor ring (DR) handler can manage descriptor and inserts descriptor into queue manager (QMGR) 2206. QMGR 2206 can access an SGL from SGL storage 2210 when or in response to reading of a corresponding descriptor.

Errors can be handled by a metadata flags in the SGL itself. For example, if there are no SGL buffers available (the SRAM storage is allocated on a per application/VM basis), the packet may be dropped and a DROP flag is set in the meta data. FW engine 2212 can detect this when it receives the SGL and drop the packet in the correct manner.

Descriptor ring (DR) Handler 2204 can write a tail pointer to end of descriptor ring. Writes by the NIC to the DR ADI can be ordered by Packet MMIO handler 2202 to push an earlier packet write. DR handler 2204 can creates the fake descriptors (for reads) and stores the written back descriptors. Written back descriptors can be queued for RX processing.

Figure 23:
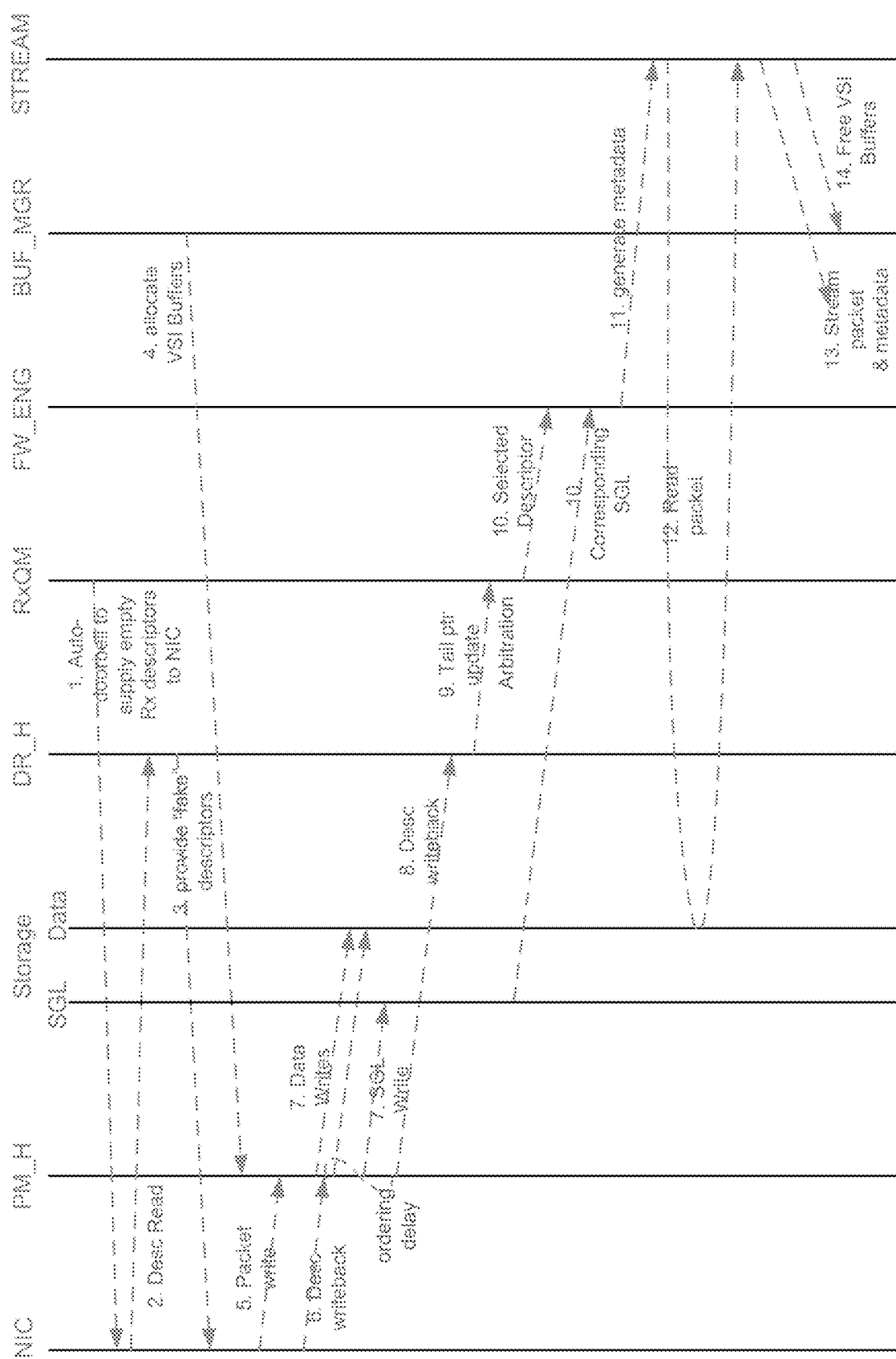
FIG. 23 depicts an example flow.

When arbiter (ARB) 2208 selects a descriptor, it can also read the SGL at the corresponding location and forwards both to the packet processing pipeline. This allows the descriptor to be linked to the correct data buffers for subsequent processing for the SGL info to be forwarded to RxStreamer 2214 which would read the packet data and stream it into the classification logic. RxStreamer 2214 can access a modified descriptor and SGL and read out data for processing, FIG. 23 depicts an example flow. At (1), receive queue manager in NIM provides auto-doorbell to supply empty Rx descriptors to NIC. At (2), NIC reads a descriptor from descriptor ring handler (DR_H). At (3), NIC receives empty "fake" descriptors from DR_H in response and a pointer to a correspond packet buffer in packet memory. At (4), buffer manager (BUF_MGR) can allocate VSI buffers in the packet memory handler (PM_H). At (5), NIC can write to the PM ADI. PM handler then uses the 256b VSI buffers to store this data, as it arrives. At (6), NIC can perform a descriptor (Desc) writeback to write over the read descriptor.

At (7), PM_H can cause packet data to be written to one or more buffers in internal memory and updates of an SGL that identifiers the buffers. An SGL can be stored in SGL storage. At (8), PM_H can write the completed descriptor to an original "fake" descriptor position in the descriptor ring. At (9), a DR_H can update a tail pointer (ptr) with the receive queue manager (RxQM). RxQM can perform arbitration to determine which descriptor is processed next using QOS and arbitration schemes. At (10), for a selected descriptor, a corresponding SGL can be retrieved from SGL storage to identify buffers that store portions of a received packet. At (11), FW_ENG (e.g., packet processing devices) can process the packets and generate metadata (e.g., descriptor content as created by the NIC can include information such as what TYPE of packet it is (e.g., IPv4) and hashes of some key fields). At (12), STREAM (e.g., RxStreamer) can read the packet data (pkt) and at (13), stream packet data and meta data into classification logic for processing. After a packet is processed, at (14), STREAM can free the buffers associated with the SGL so that BUF_MGR can allocate the buffers for other uses (e.g., other received packets).

Prioritization Based on Descriptor Content

Some NICs support programmable receive descriptors where such descriptors include additional information about received packet such as offsets to different protocols headers, for example, at which offset tunnel header of inner packet start; priority bits from different packet headers, for example, from VLAN/MPLS or DSCP bits from IP header; or packet data from arbitrary offset, for example, TCP flags field from TCP header, or specific bytes from packet payload.

In some examples, a NIC can provide information about a packet on the packet's receive descriptor. Information on receive path can include packet length, packet type: IPv4 or IPv6, UDP or TCP and validity flags for L3/L4 checksums. For the transmit side, information can be provided in TX descriptor to offload VLAN(s) insertion, checksum calculation for L3/L4 to NEXT.

A NIC can perform pre-classification of a packet and create programmable RX descriptors to provide pre-classification information/metadata to NEXT as described herein. In some examples, NIM can use some of the descriptor fields for load balancing processing of packets, direction of offload processing of packets, schedule offload communication to NIC, NIC pre-processing prior to processing by NEXT. NIM can read programmable receive descriptors to schedule performance of a distributed packet processing pipeline.

Programmable transmit descriptors (TXd) can be used to provide additional metadata to smart NICs, for example, security associations for encrypted traffic.

Prioritizing Network Packets Using Single Queue Interface

Received packet traffic from a NIC can be sent from a CPU to NEXT directly over an IO die for processing. Various embodiments of NIM provide descriptor storage and packet buffers for traffic received from the NIC. When the NIM receives a packet from NIC, NIM can utilize fields of the packet's receive descriptor to classify packet's type and priority to be used for slow or fast path flows separation or for sending high priority flows to the pipeline processing stage of the NEXT. Improved performance and reduced latency for high priority/fast path traffic can be achieved. By providing priority classification at early stage of packets processing, NIM can improve overall efficiency of the NEXT pipeline to avoid delays or underutilization of some processing stages.

Metadata in Inline Packet Processing

Some packet processing tasks can be moved from the host CPU and into hardware (e.g., NEXT, WAT, or offload processors). Information needs to be exchanged between hardware and software to communicate processing rules to be performed on ingress and egress packets. Some of this can be communicated out of band, via a control plane interface (e.g., rte_flow, tc flower, etc.). For example, a rule can indicate a match-action scheme where for packets having certain characteristics (e.g., header values), a particular action is to be performed. Rules can be sent for a flow (e.g., packets matching certain packet header values), rather than for every packet. In some cases, rules may be applied on a per-packet basis, in addition to the packet data itself.

For example, for inbound packets, the following metadata can be provided.

| Example meta data | Example information conveyed |
| --- | --- |
| VLAN and QinQ | VLAN tag extraction/stripping/presence |
| RSS hash | Presence, value |
| FDIR | Whether packet matched flow director rule. Pipeline path indicator or identifier. |
| Checksums | Whether L3 (IP) and L4 (TCP, UDP) checksum values were correct, incorrect or otherwise |
| Timestamp | Presence and value. Time stamp can comply with IEEE 1588-2008 (and derivatives thereof) or other standards. |
| LRO | Used to indicate that device has coalesced multiple packets |
| Security offload processing for IPsec, DTLS | Whether packet was successfully decrypted |

For example, for outbound packets, the following metadata can be provided.

| Example meta data | Example information conveyed |
| --- | --- |
| VLAN tag insertion | Whether to perform VLAN tag insertion and what tag to insert |
| Checksums | Whether to generate checksums |
| FDIR | Whether packet matched flow director rule. Pipeline path indicator or identifier. |
| Timestamp | Presence and value. Time stamp can comply with IEEE 1588-2008 (and derivatives thereof) or other standards. |
| Security (IPsec, MACsec) | Whether to encrypt content |
| Tunnelling | Whether to encapsulate packets |
| TCP segmentation offload (TSO) | Whether to perform TSO |

In some examples, metadata can be carried in the descriptor, or prepended or appended to the packet payload if there is not enough space in the descriptor. In some examples, DPDK flags can be used such as mbuf.ol_flags is a 64-bit field, with bits defined for rx (PKT_RX_*) and tx (PKT_TX_*). Linux flags can be used such as Checksum (NETIF_F_HW_CSUM), segmentation offload, IPsec (ESP), TLS (aka KTLS).

Various embodiments use metadata to pass data between a software application, device, or VEE and NEXT. Metadata can be conveyed from software to NEXT via flags in the descriptor, or via data prepended or appended to the payload.

For inbound packets, metadata can indicate whether the payload has been decrypted, whether the record has been authenticated (e.g., the authentication tag matches the calculated value), whether anti-replay window checks were performed and succeeded, etc.

Because TLS encryption occurs on TLS records, which can span multiple TCP packets, the inline device may perform reassembly of TLS records, similar to the Large Receive Offload (LRO) function in some NICs, and then send a single event to the software stack to indicate that a complete TLS record had been received.

Where packets arrive out of order, or some segments do not arrive within some timeout, the NEXT may fail to reassemble a record and/or fail to decrypt the record, in which case the metadata will reflect this.

For outbound TLS records, metadata can indicate whether the payload should be encrypted and authenticated, and any additional information that may be required for the inline accelerator to perform the required encryption and authentication.

As described herein, NEXT can be a software-defined hardware pipeline, with multiple entry and exit points into the hardware pipeline from software. Various embodiments provide for metadata to be used to specify which sages of the hardware pipeline are to be applied to the packet. For example, an outbound packet might specify one or more processing stages to be performed, after which the packet should be sent to the network or sent back to software.

The capabilities of the device may be queried by the driver to determine whether the device supports specific capabilities.

Separate from the metadata, which is used to specify per-packet behavior, it is also possible to configure per-flow behavior via APIs, which follow a match/action paradigm. The implementation of these APIs causes rules to be added to tables which are then looked up by WAT as part of processing the inbound or outbound packet.

Metadata can be passed not just between software and a device, but also between devices. A device can then consume that metadata (e.g., act upon it), or send that metadata to the next device in a chain or to software (so that it may act upon it).

Header and Payload Splitting

According to some embodiments, a NIC can provide ability to perform header splitting by which a header is copied (e.g., by DMA) to a receive buffer separately from a packet payload. In some embodiments, NEXT only processes a packet header received from or sent to a NIC whereas the payload can be copied directly (e.g., by DMA) to/from a buffer in system memory for processing by a VEE, application, or VNF. By doing so, NEXT does not have to process as much data, and can save a DMA operation by not copying the payload since the payload does not need to be copied from the NEXT to the VNF. The header splitting could be applied for flows in which the payload is not processed by NEXT.

Figure 24:
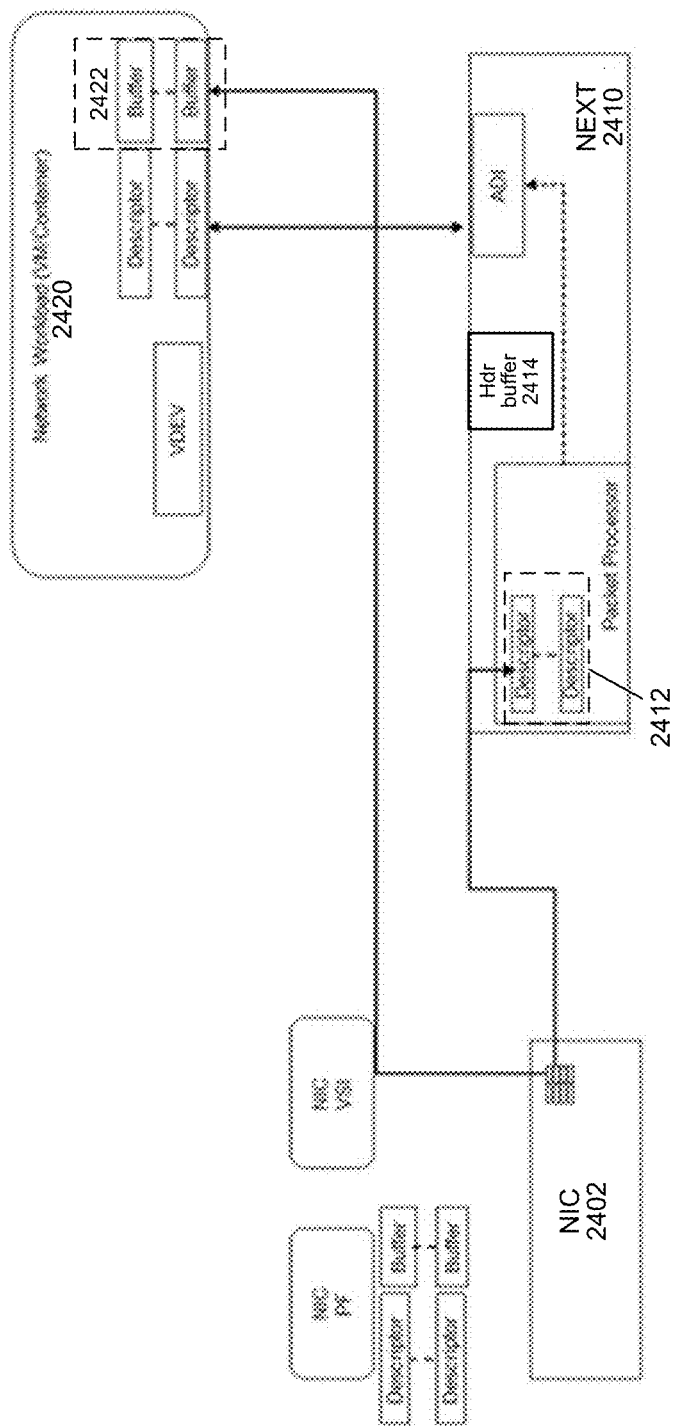
FIG. 24 depicts an example of header and payload splitting.

FIG. 24 depicts an example of header and payload splitting. Setup of split of header from payload can utilize packet processing input-output memory management unit (IOMMU) Address Translation, described herein. A packet buffer can be allocated in memory for access by a VM or container, such as VNF, and the packet buffer location can be provided to NEXT over a communication path using a configuration queue. Packet buffer memory can be identified by a Guest Physical Address (GPA). This GPA can in turn be provided to the downstream NIC by programming it into the NIC descriptors, that reside in the NEXT memory itself.

The IOMMU translations and setup for permitting splitting header and payload is described in the Packet Processing IOMMU Address Translation section. In various embodiments, IOMMU translations can occur for data copies between NIC and NEXT, data copies NIC to a VM, and data copies between a VM to NEXT.

Packet Receipt

When a packet arrives in NIC 2402 and is ready to be processed, NIC 2402 can read an available Rx descriptor (e.g., next available in a queue of Rx descriptors), read the destination buffer address (e.g., GPA of the buffer accessible to the VNF). NIC 2402 can DMA data of the packet payload (but not the header) to a destination buffer address among buffers 2422. The DMA operation can be intercepted by the IOMMU (e.g., Intel VT-d) in order and the data can be copied to the correct memory location within the VNF's allocated memory region (e.g., buffer 2422) instead of to the NEXT device.

NIC 2402 can copy or DMA the packet's header information into header (hdr) buffer 2414 identified by the Rx descriptor. Header buffer 2414 identified by the Rx descriptor can be memory within NEXT 2410 or system memory. NEXT 2410 can be notified of this descriptor update by NIC 2402 and process the packet header information. After processing the packet header, NEXT 2410 can DMA the processed or modified packet header into a buffer (e.g., buffer 2422) accessible to the VNF and update the corresponding descriptor within the VNF to indicate that it has a packet to process.

Packet Transmission

For a packet transmission, a VNF or other VEE 2420 can prepare a packet for transmission, update the Tx descriptor to point to a memory address of that packet in a buffer 2422. NEXT 2410 can be notified of the descriptor update by ringing a doorbell (e.g., tail bump) and perform a copy or DMA operation of only the packet header information into NEXT 2410. NEXT 2410 can process the packet header, potentially performing header modifications as requested by the application (e.g. adding a tunnel encapsulation header).

NEXT 2410 can prepare a Tx descriptor for NIC 2402. The Tx descriptor can indicate two buffers to DMA content from, including (1) packet header buffer (e.g., header (hdr) buffer 2414), which resides in the NEXT memory and (2) payload buffer (e.g., buffer 2422), which can be DMAd from the memory allocated to the VNF. NIC 2402 can copy (e.g., DMA) the data from these two locations, combining them into a single packet for transmission, perform packet formation according to application standards, and perform a packet transmission.

After transmission, the NIC can update the Tx descriptor which it received from the NEXT device, indicating the NIC has transmitted the packet. NEXT can then write back to the Tx descriptor issued to it by the VNF, indicating that the packet has been transmitted and the memory allocated for the transmitted packet can be reclaimed or reused.

IOMMU Address Translation

In some examples, to permit DMA writes to a memory region, the memory region or device accessible to a guest VM can be locked to only being accessible by the guest VM. Various embodiments provide a virtual IOMMU (vIOMMU) that allows a guest VM to allocate memory regions for access with finer grain control of access so that an entire memory region does not need to be exposed. IOMMU can perform remapping from physical-to-virtual addresses for DMA operations. Various embodiments provide that IOMMU Address Translations can be setup in order to permit an IOMMU to access buffers of an internal memory of NEXT for access by a VNF or other software executing within a VM. NEXT can provide inline packet processing before being accessible by the CPU and process or manipulate a packet and send out the packet without the packet being accessible by the CPU. Various embodiments provide an IOMMU whereby a guest OS can configure IO remapping which will be guest physical address to guest virtual address. When this mapping occurs in guest VM, a trap of the mapping occurs in host and actual real IOMMU programmed by the host IOMMU driver.

In some examples, a VNF runs in a VM and utilizes a driver to configure and utilize NEXT. A driver could be implemented as a Poll Mode Driver (PMD) or Kernel driver. In some examples, the VM supports vIOMMU.

Figure 25:
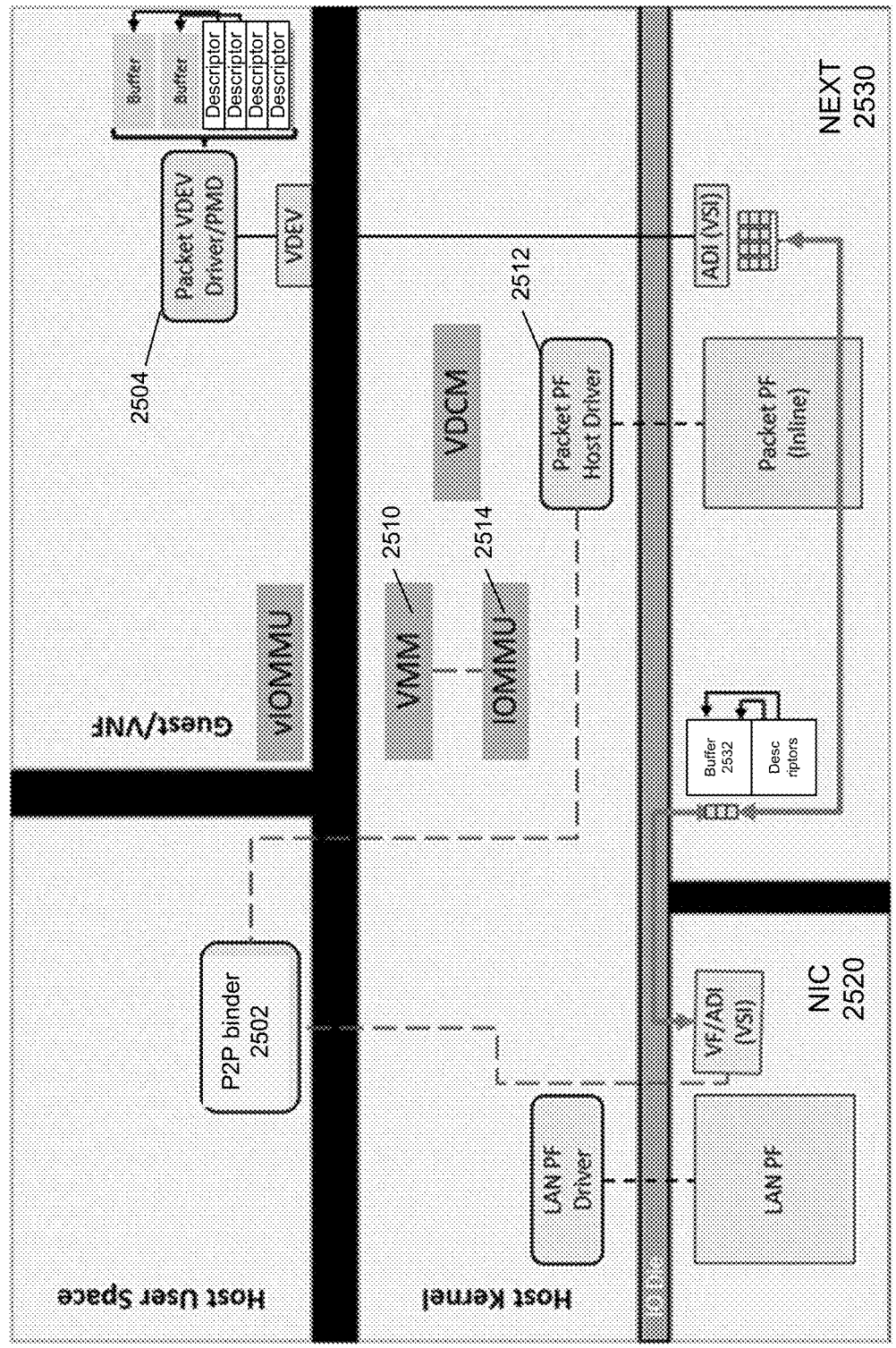
FIG. 25 depicts a system.

FIG. 25 depicts a system. Some example operations of the system of FIG. 25 are described with respect to one or more of FIGS. 26-33. Various embodiments provide for configuration of access rights to a memory region using traps and use of a peer-to-peer binder. Some examples can provide address translation for a virtual device (VDEV) 2504 where a VDEV is represented by a Process Address Space ID (PASID) along with the bus/device/function (BDF) of the device. VDEV can include a virtual device where the PCIe configuration space is emulated in software in the host, while the parts of the device used by the data plane, such as queue pairs used for receipt/transmission of data, can be mapped directly to NEXT. In some examples, NEXT exposes these queue pairs as Assignable Device Interfaces (ADIs).

In some examples, VMM 2510 traps guest virtual address (GVA) to guest physical address (GPA) mappings of buffers and programs Guest Physical Address (GPA) to host physical address (HPA) address translation tables. For example, see SIOV for examples of virtual device. The system can be used by any VDEV, whether it be a NEXT SIOV VDEV or some other device. Various embodiments also utilize Peer-2-Peer Binder (P2PB) 2502 that can communicate with NIC 2520 and with a NEXT driver 2512 to provide communication between NIC 2520 and NEXT 2530.

P2PB 2502 can be implemented as an application executing in user space. P2PB 2502 can communicate with NIC 2520 and NEXT 2530 can send commands to both devices to configure both NIC 2520 and NEXT 2530. P2PB 2502 can configure NEXT buffers 2532 for packet transmit/receipt using NIC 2520. P2PB 2502 can communicate with NEXT driver 2512 to receive memory addresses (e.g., input/output control (ioctl) (e.g., a system call for device-specific input/output operations), API, etc.). P2PB 2502 can receive addresses, perform address re-mapping, and program addresses into NIC 2520 so that address re-mapping occurs between peer NIC 2520 and NEXT 2530 rather than a device and memory so that NIC 2520 and NEXT 2530 can share or access memory independent from accessing system memory. P2PB 2502 can set up IOMMU 2514 to perform address re-mapping translation to allow DMA operations from NIC 2520 to NEXT 2530 or NEXT 2530 to NIC 2520.

In some examples, multiple NEXT devices can be available for access on a platform or distributed platform. An instance of a NEXT Packet PF driver can execute for each NEXT device on the platform. A NEXT device can have a device ID and an associated driver that will get loaded based upon the device ID. A device driver can register itself with the kernel. As with other devices that may have multiple instances (such as Ethernet Devices), each instance of a NEXT Packet PF driver can have a name associated with it. A NEXT packet PF driver 2512 can be passed to P2PB 2502 when P2PB 2502 is launched, so that P2PB 2502 can establish a communication link with NEXT Packet PF driver 2512.

NIC PCIe resource could be a VF or it could be a SIOV VDEV that has been setup. A PCIe address (Bus:Device:Function) can be associated with NIC 2520 and this PCIe address, in the form of a string can be passed to P2PB 2502 when launched.

A driver can be loaded for the Packet Processing NEXT PF. On a dual-socket server there could be four instances of this driver loaded. An administrator could determine which NEXT PFD to connect to P2PB 2502. NEXT PF driver 2512 can register a NEXT device with IOMMU 2514 as a memory domain for address translation. NEXT PF can have an interface by which P2PB 2502 can communicate with NEXT PFD 2512 to send and receive configuration information.

Figure 26:
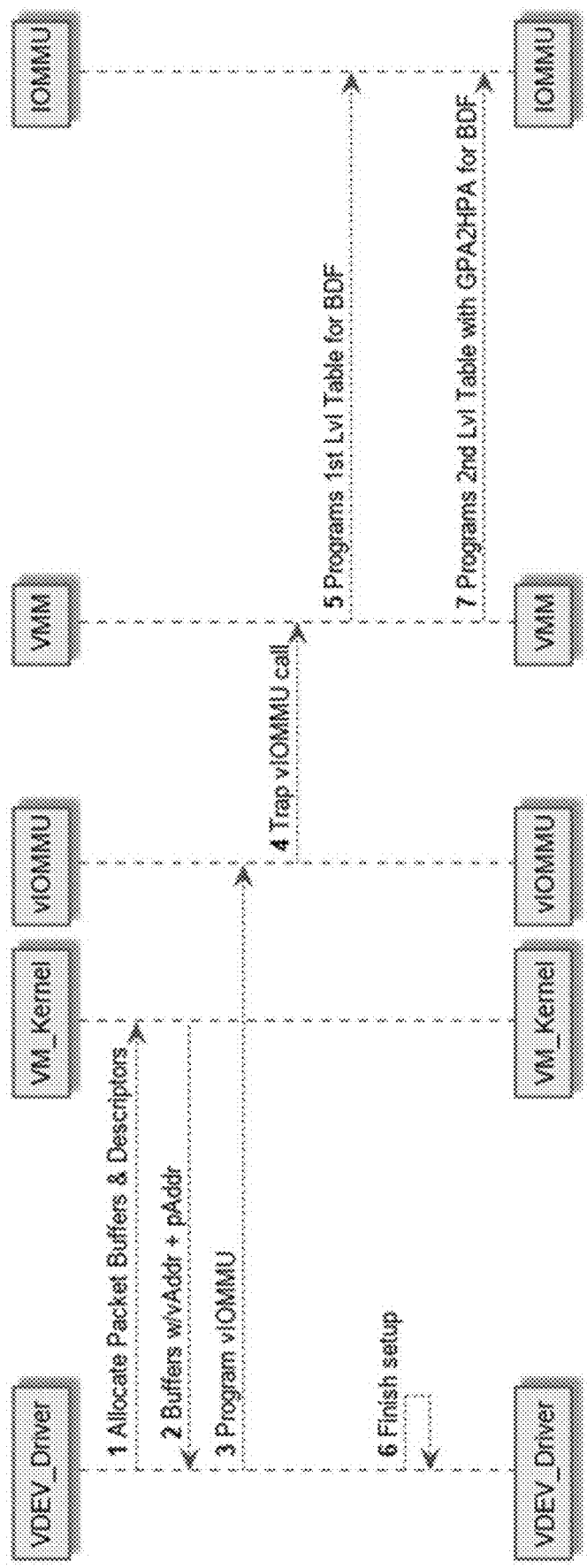
FIG. 26 depicts an example interaction to set up a trap of address mapping by a VMM.

FIG. 26 depicts an example interaction to set up a trap of address mapping by a VMM. At (1), a virtual device (VDEV) driver can allocate a memory region in internal NEXT memory to store transmit or receive packet buffers and descriptors. A VDEV driver can present an Ethernet device to a VNF or software running in a VEE. Some examples, a VDEV driver can be implemented as a Poll Mode Driver (PMD) or kernel. A VDEV driver can be implemented as a DPDK PMD (e.g., a device driver implemented as a user space driver that registers itself with the DPDK Ethernet framework) or as a kernel driver (e.g., a device driver implemented in the Linux kernel, that registers itself with the kernel TCP/IP stack).

At (2), a kernel (e.g., VM_Kernel) can provide guest virtual address (GVA) to guest physical address (GPA) mappings for buffers and descriptors. VM_Kernel can represent the Linux kernel in the guest or VM. A kernel can control IOMMU. At (3), the VDEV driver can program the vIOMMU with GVA-to-GPA address translation. At (4), the VMM can trap the GVA-to-GPA address translation configuration provided to the vIOMMU. Trapping can be part of the kernel configuration software and detects a particular activity and performs an action. In some examples, vIOMMU does not configure the IOMMU with the GVA-to-GPA address translation configuration. Instead, at (5), VMM provides a first level lookup table to VM for programming using BDF and PASID of VDEV. In some examples, two level IOMMU can allow ability to share discrete regions of memory within a VEE rather than all memory within the VEE to improve security. The two levels of translation allows applications running in a guest VM to share memory addresses with a device (e.g., NEXT or NIC).

At (6), VDEV Driver can finish its setup and configuration. At (7), the VMM can program GPA-to-HPA address translation tables using BDF and PASID of VDEV.

NIC Configuration

Figure 27:
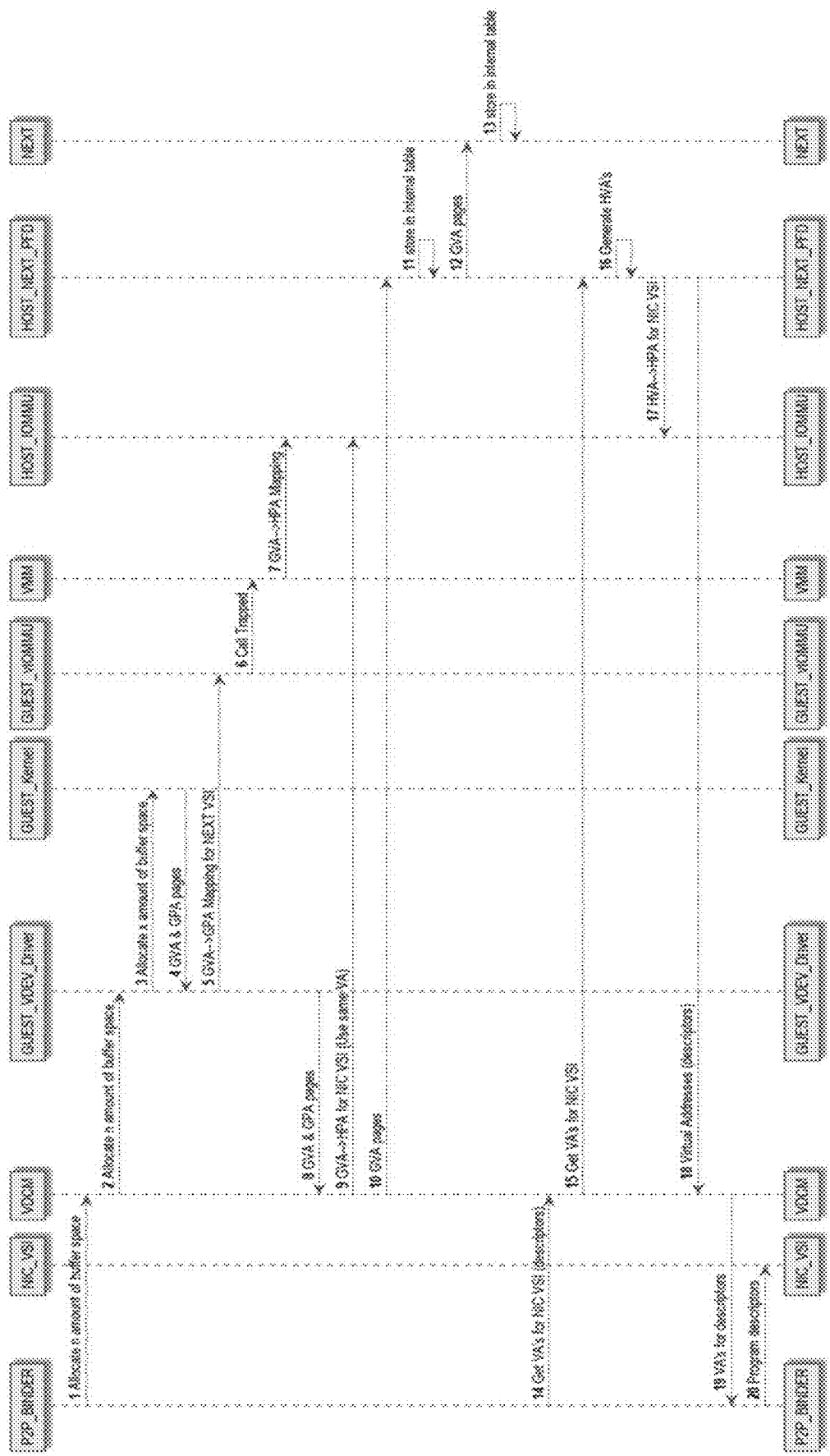
FIG. 27 provides an example of configuring an IOMMU.

FIG. 27 provides an example of configuring an IOMMU to provide address translation so that a NIC can access buffers within a memory of the NEXT device (e.g., descriptors and Rx Buffers) and also memory allocated to a VNF (e.g., Tx Buffers). In some examples, buffers within the NEXT device and memory allocated to a VNF can be in two different memory domains. In some examples, a NIC can be represented by a VF or SIOV VDEV. In some examples, a user space application can bind memory mapping between NEXT and one or more NICs so that a guest OS can configure GPA-to-GVA translation. When this mapping occurs in a guest VM, various embodiments provide a trap in host and IOMMU programmed by the host IOMMU driver.

In some examples, a VNF runs in a VEE and a VM Kernel supports vIOMMU. In some examples, P2PB can initiate these actions as part of its setup. At (1), P2PB (e.g., application executing in user space) can allocate n amount of buffer space in memory of the NEXT device. At (2), the Virtual Device Composition Module (VDCM) can indicate to the guest VDEV driver to allocate n amount of buffer space in memory of the NEXT device. At (3), the guest VDEV driver can request that the guest OS kernel allocate an amount of buffer space in memory of the NEXT device. At (4), the guest OS kernel can allocate memory regions identified by GVA and GPA to the VDEV driver. At (5), the VDEV driver can provide GVA to GPA translation mappings for NEXT (e.g., as represented by a VSI) to a vIOMMU. However, at (6), the VMM can trap the mappings and, at (7), issue GVA to HPA mappings to an IOMMU.

At (8), the guest VDEV driver can provide memory regions identified by GVA and GPA to the VDCM. At (9), the VDCM can provide GVA to HPA translations for the NIC to the IOMMU. At (10), the VDCM can provide GVA pages to the NEXT PFD. At (11), the NEXT PFD can store the GVA pages in an internal table and at (12), the NEXT PFD can provide the GVA page identifiers to NEXT. At (13), NEXT can store the GVA page identifiers in an internal table.

At (14), the P2PB can request available virtual addresses (VAs) for the NIC from VDCM. At (15), the VDCM can request access VAs for NIC from NEXT PFD. At (16), the NEXT PFD can generate HVAs and, at (17), provide the HVA to HPA conversion for the NIC to the IOMMU.

At (18), the NEXT PFD can provide virtual addresses to the VDCM. At (19), the VDCM can provide virtual addresses to P2P binder. At (20), the P2PB can program descriptors based on virtual addresses.

Peer-to-Peer Device Configuration

Figure 28:
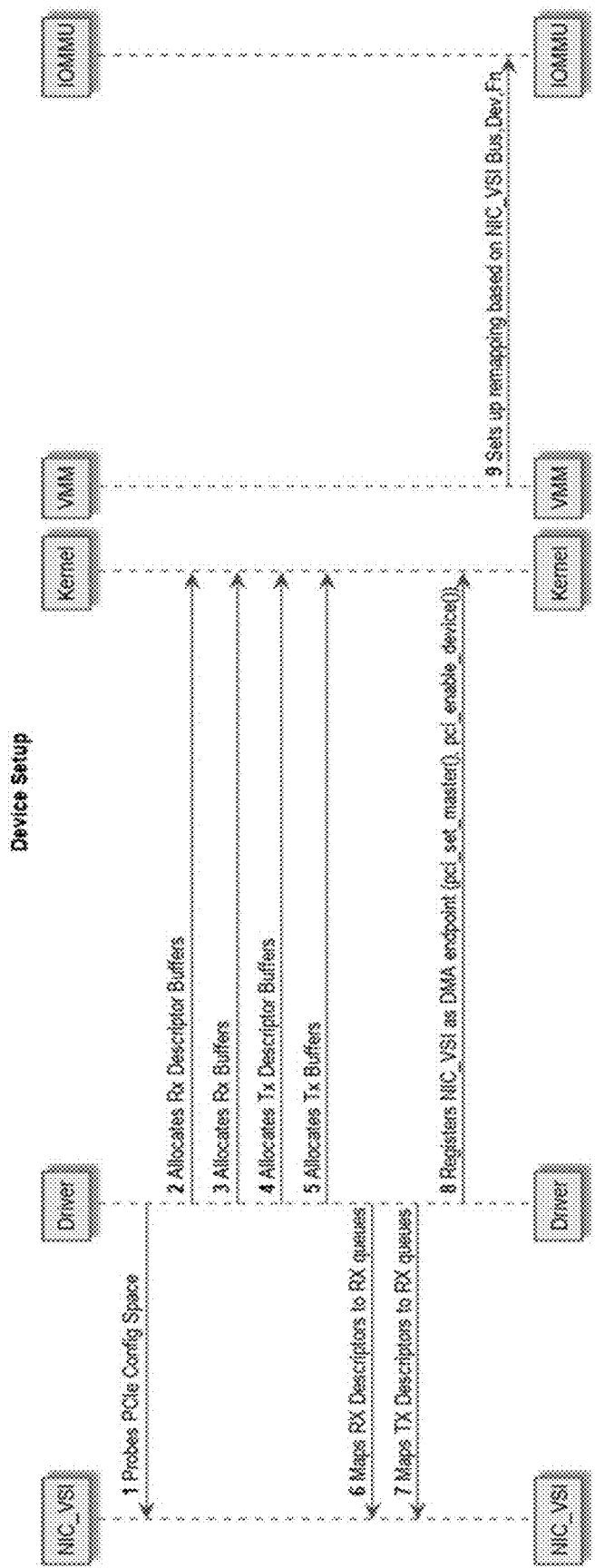
FIG. 28 depicts an example device setup.

FIG. 28 depicts an example known device setup for allocation of descriptors and buffers for use by a NIC.

Figure 29:
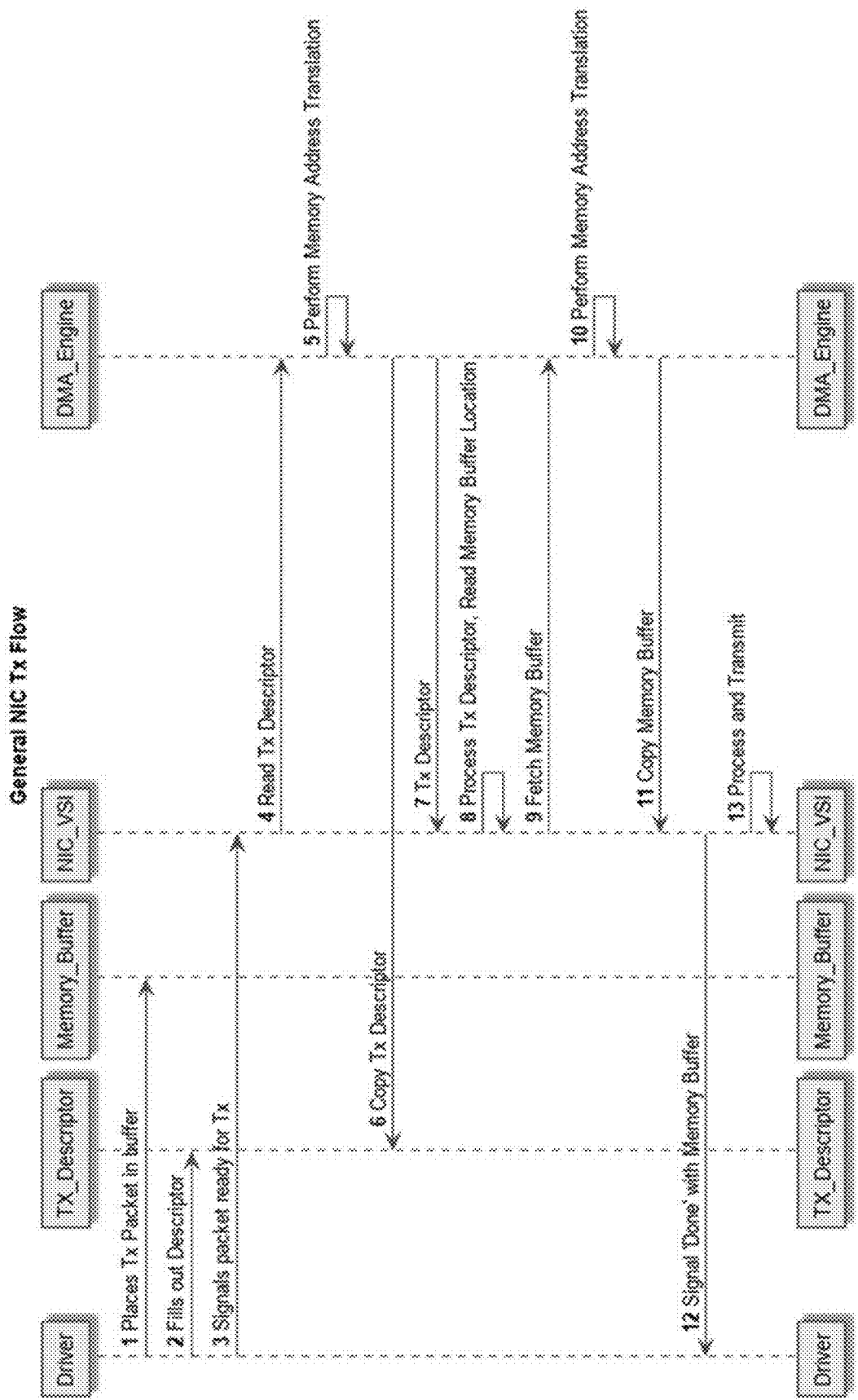
FIG. 29 depicts an example packet egress flow.

FIG. 29 depicts an example packet egress flow. At (1), in response to the driver having a packet to be transmitted, driver places it in a buffer that has been allocated. At (2), the driver fetches the next descriptor in the descriptor ring and provides transmit packet information (e.g., buffer identifier and metadata). At (3), the driver signals the NIC that there is data ready to be transmitted. In some NICs, signaling data is ready to be transmitted can be performed using a bit in the descriptor that the NIC hardware monitors, on other devices there may be a separate queue for this notification process. The NIC (e.g., as represented by a NIC VSI) can receive indication that there is data to be transmitted. At (4), the NIC can cause a read of the transmit (Tx) descriptor. At (5), a memory address translation operation can be performed to determine the memory address of the descriptor. this DMA operation is intercepted by the input-output memory management unit (IOMMU), which performs address translation of the buffer address from a virtual address to a physical address. IOMMU can include a memory management unit (MMU) that connects a direct-memory-access-capable (DMA-capable) I/O bus to the main memory. An example of an IOMMU is Intel® Virtualization Technology. Translation can be performed using a lookup table that uses the NIC Virtual Station Interface (VSI) Bus, Device, Function (BDF) as input into lookup tables on memory domains.

At (6), the DMA engine can copy the transmit descriptor. At (7), the NIC VSI can read the descriptor and at (8), the NIC VSI can process the descriptor. Within the descriptor is the address and size of the buffer where the packet resides in memory. At (9), the NIC initiates a DMA operation to copy that data from host memory into the NIC hardware. In some examples, at (10), this DMA operation is intercepted by the IOMMU, which performs address translation of the buffer address from a virtual address to a physical address. After this translation is performed, at (11), the DMA engine copies the packet data into NIC.

At (12), the NIC can notify the driver that it has successfully copied the data from the memory buffer and that the buffer is free for use (e.g., transmit or receive other data or the same data). On Ethernet NIC devices, a write-back descriptor can be used to update the descriptor to indicate that the driver is finished using the descriptor or a dedicated queue can be available for this type of communication. At (13), the NIC can process the packet data, form a packet, and transmit the packet.

Figure 30:
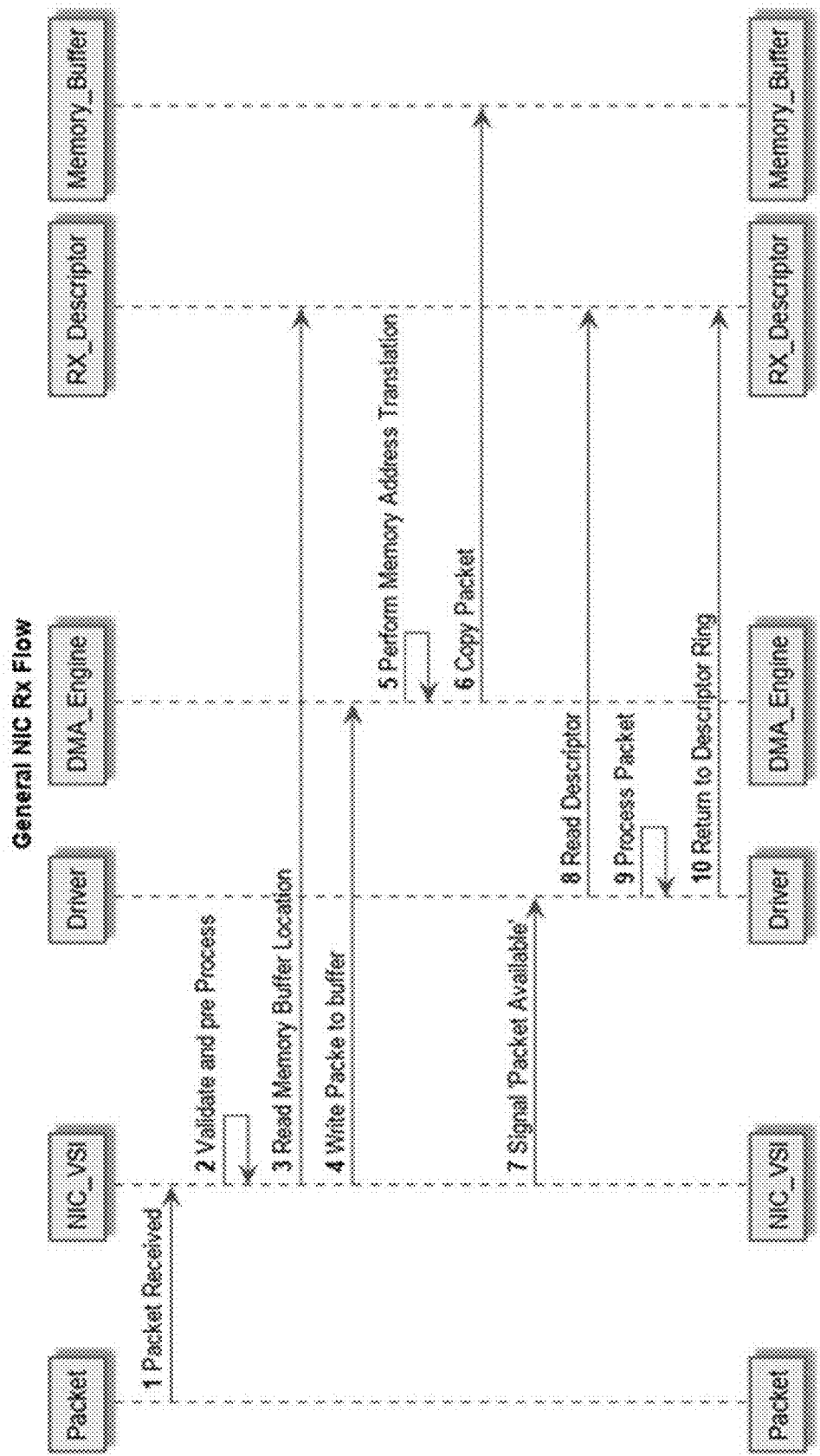
FIG. 30 depicts an example packet ingress flow.

FIG. 30 depicts an example packet ingress (receipt) flow. At (1), a packet arrives at a NIC (e.g., as represented by a NIC VSI) and, at (2) the NIC processes the packet (e.g., checksum validation, decapsulation, receive side scaling (RSS), etc.). At (3), the VSI fetches the next RX descriptor from the descriptor ring associated with the Rx queue that the packet has been filtered into. At (3), the NIC reads from the descriptor the location of the memory buffer of where to copy the packet (e.g., provided by the driver previously) and, at (4), the NIC initiates a DMA operation to copy the packet to that memory location. At (5), the DMA engine remaps that address from a virtual address to a physical address and, at (6), copies the packet to the physical address. At (7), the NIC fills out the receive descriptor with the required information and notifies the driver that there is data to be processed. At (8), the receive descriptor is read and at (9), the associated packet is processed. At (10), the descriptor can be returned to the descriptor ring.

Peer-2-Peer Binder (P2PB) for Driver to NIC

When the P2PB component is launched, the P2PB component can access information in order to connect the NIC VSI and the NEXT device. P2PB component can receive the name of the instance of the NEXT Packet PF to attach to, the PCIe addresses of a NIC resource and the PCIe address of the NEXT VDEV device.

At start-up of P2PB component, P2PB component can register as a system device with the NIC VSI. The P2PB component can be registered as capable of DMA operations. Next, P2PB component can register with the NEXT PFD it has been assigned to by a configuration utility (e.g., configured by system administrator). Registering with the NEXT PFD can include opening a communication channel with NEXT PFD, and registering itself with the NEXT PFD. P2PB component can also have a communication with NEXT VDEV to create a communication bridge using one or more parameters passed to P2PB described herein. The P2PB component can configure the NEXT by providing information about what kind of underlying NIC the NEXT is interacting with (e.g., from a supported list), and the NEXT PFD can allocate and configure resources that know how to handle that specific NIC device.

Registering with the NEXT PFD can override the function to allocate memory for the descriptor rings and cause allocation of memory in a specified NEXT memory device, rather than in system DRAM. This mechanism can be used for any other device where P2P communications is desired.

Figure 31:
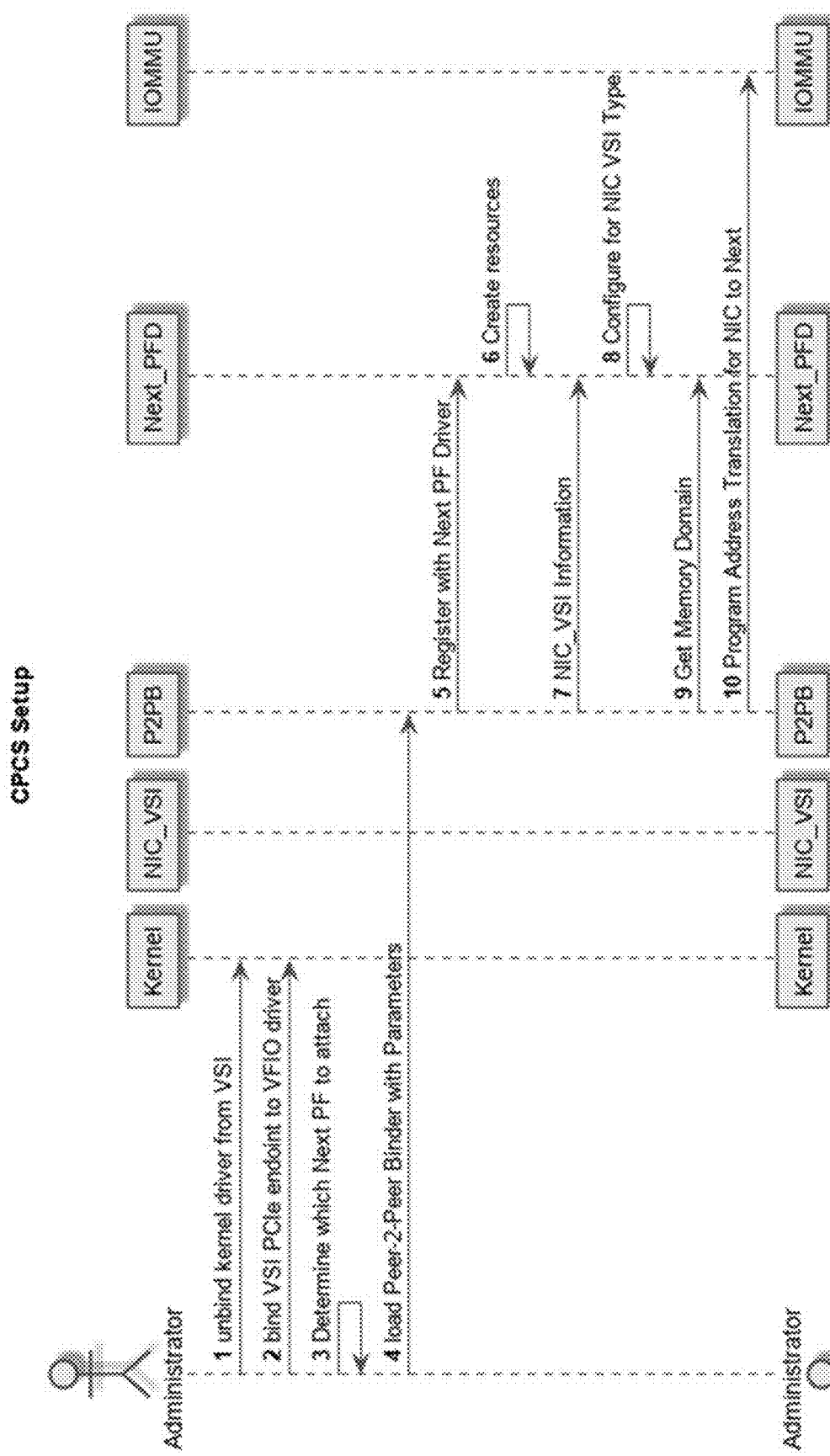
FIG. 31 shows an example of P2PB component setup and configuration.

FIG. 31 shows an example of P2PB component setup and configuration. The following describes an example of a manner of loading a P2PB component and attaching the P2PB to a NIC VSI and to a NEXT PF driver instance. In some examples, the P2PB and the associated PMD driver are a single logical unit. P2PB component can be responsible for binding a NIC resource (e.g., a SR-IOV VF or PF or a SIOV VDEV) to the NEXT device. P2PB component can be a user-mode application. P2PB component can communicate with the underlying NIC hardware but also with the NEXT PF driver in order to provide communication between the NIC and NEXT driver. However, in some examples, a kernel driver can be used as the P2PB to communicate with NEXT and one or more NICs.

In some examples, NIC VF/ADI/VSI can be available for assignment to a VFIO driver and the P2PB component and a PCIe address is available for the P2PB component. In some examples, NEXT VDEV can be available (e.g., a PCIe device) for assignment to the VNF by the VMM or orchestrator. In some examples, NEXT PF Driver is instantiated and running.

Unless the VF/SIOV driver for the NIC is black-listed, when VF/SIOV devices are created, VF/SIOV devices are instantiated as virtual network devices (netdevs) with the appropriate drivers. A kernel driver can be unloaded and not utilized and the device can be assigned to either UIO or VFIO and the P2PB component can be launched.

At (1), an administrator can unbind a kernel driver from a NIC VSI. At (2), the administrator can bind a VSI endpoint to a VFIO driver with the kernel (OS). At (3), the administrator can determine which NEXT PF to attach to. At (4), the administrator can load P2PB with parameters. At (5), P2PB can register with the NEXT PF driver. At (6), NEXT PF driver can create resources. In some examples, when the NEXT_PFD creates the resources, such as IOMMU setup described herein. At (7), the P2PB can provide NIC information (e.g., VSI information) to NEXT PFD. At (8), the NEXT PFD can configure the NIC VSI type. At (9), the P2PB can obtain memory domain from the NEXT PF driver. At (10), the P2PB can program address translations for the NIC to NEXT to the IOMMU. IOMMU can be configured so that when the NIC DMAs packets to NEXT, the correct address is used and that proper address isolation is ensured.

This can be done either by the P2PB or by the NEXT PFD, where the NIC VSI BUS, DEVICE, Function is used as a lookup into VTd for address translation to the memory domain associated with a NEXT device.

Scatter Gather List Buffers

As described earlier, memory allocated to a VM can be accessed by NEXT. In some cases, NEXT does not have enough buffer space so NEXT device driver in VM allocates extra memory for NEXT so NEXT can store SGL mapping of packet portions but portions are stored in memory reserved for a guest VM. In some examples, a driver allocates memory for packets and descriptors and allocates memory to NEXT and allows NEXT to use for any reasons. An SGL can break frames up into portions or fragments and store mappings of where fragments reside.

Figure 32:
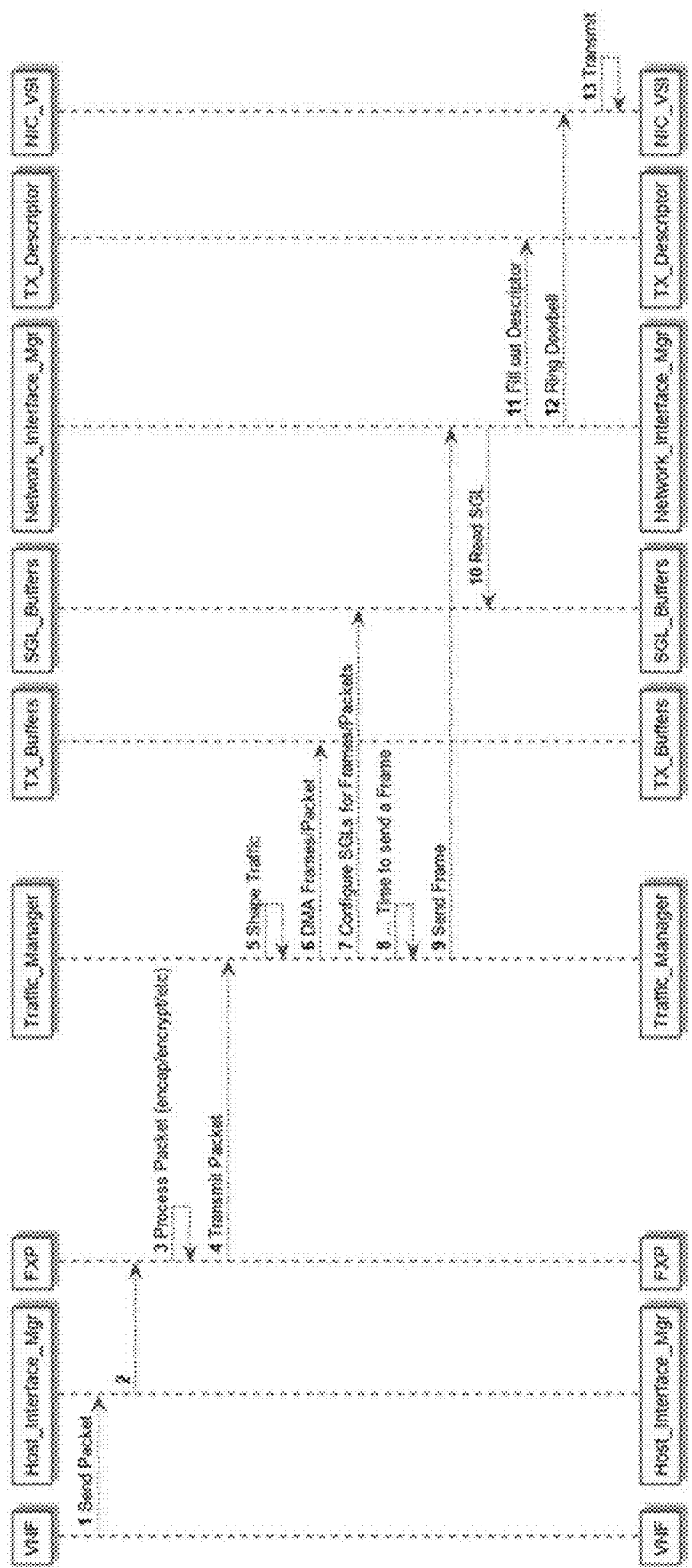
FIG. 32 depicts an example of configuring SGLs for packet transmission.

FIG. 32 depicts an example of configuring SGLs for packet transmission. At (1), the VNF can request a packet transmission. At (2), the HIM can provide the packet for processing by the FXP of NEXT to perform, at (3), various packet processing operations described herein. At (4), the FXP can cause the packet to be transmitted. At (5), a traffic manager can determine which packet to transmit and at (6), copy a selected packet to transmit to a transmit (TX) buffer. At (7), the traffic manager can configure SGLs for packets in an SGL buffer that identify where portions of the packet are stored. At (8), the traffic manager can identify a time to send the packet and at (9), the traffic manager can indicate to the NIM that a packet is to be transmitted. At (10), the NIM can read the SGL associated with the packet to determine locations of packet portions in memory. At (11), the NIM can complete a descriptor for the packet and at (12), ring a doorbell to cause the NIC to transmit the packet identified by the SGL at (13).

Figure 33:
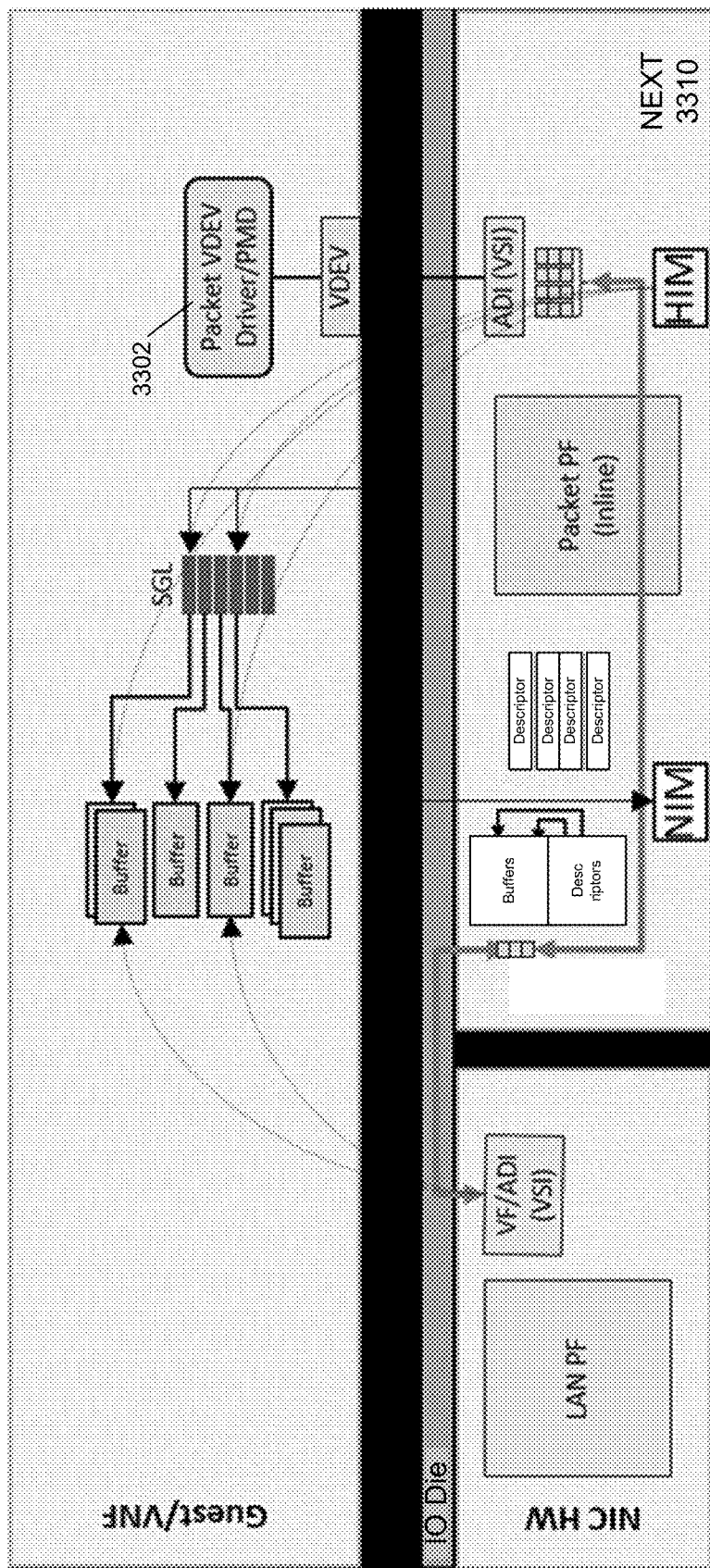
FIG. 33 depicts an example system that uses SGLs for packet transmission.

FIG. 33 depicts an example system that uses SGLs to store packet portions prior to transmission. VDEV Driver/PMD 3302 can create buffers or a larger buffer for NEXT 3310 to use for whatever purposes. In some examples, NEXT 3310 associates buffers with an SGL list and/or book keeping. VDEV Driver/PMD 3302 can allocate the buffers associated with an SGL and map those buffers to the HIM/ADI. NIM and HIM can receive the virtual address of the TX Buffers. The NIM can use the virtual address created by the VDEV Driver. The NIM, when it fills out the NIC VSI descriptor, can use the virtual address of the buffer that was created by the VDCM as described earlier. Virtual addresses can be tied to a BDF and PASID combination, which are different for the HIM and the NIC VSI.

Ternary Content-Addressable Memory (TCAM)

Figure 34:
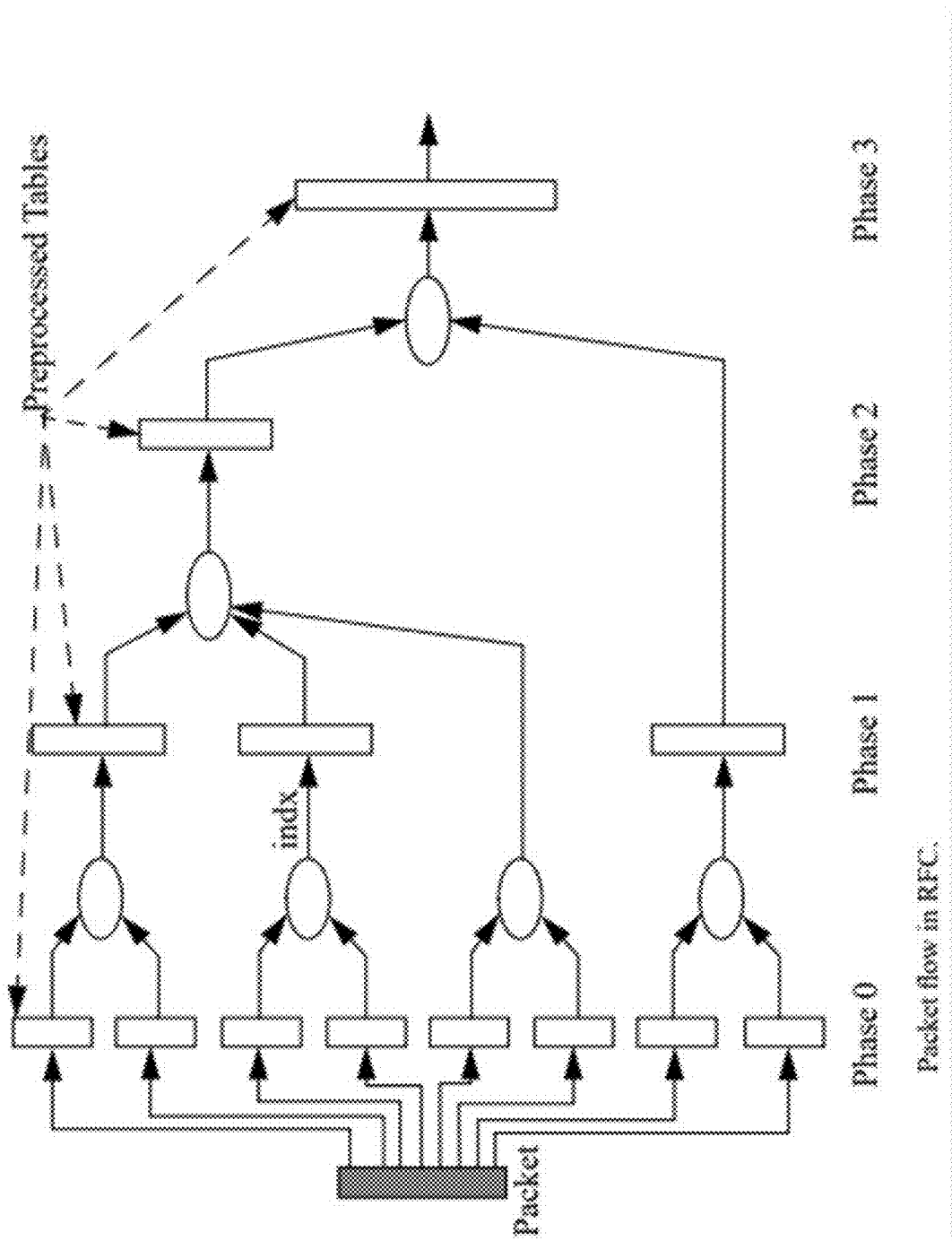
FIG. 34 depicts an example TCAM.

FIG. 34 depicts an example ternary content-addressable memory (TCAM). Various embodiments provide a logical TCAM without using an actual TCAM structure. Various embodiments use Recursive Flow Classification (RFC) with a TCAM for some of the more exception flows. RFC can use SRAM as the basis for implementing a TCAM with the main advantages being that of throughput and deterministic latency. RFC can be used to build any type of lookup table and not only TCAMs but longest prefix match (LPM) or exact match as well.

Various embodiments use cache structures (e.g., SRAM) to implement this type of RFC lookup such that software would not need to individually create and perform the table lookups at each stage but that hardware assist in cache could actually perform the sequential table lookups. For example, software executed by a CPU could initiate lookup to Phase 0 but then the assist in cache could walk the rest of the phases to complete the lookup. In Phase 0, fields of a packet header are split up into multiple segments that are used to index into multiple memories in parallel. In subsequent phases, the index into each memory can be formed a combination of results of lookups from earlier phases. In some examples, results from lookups can be concatenated to form a wider index and after successive combination and reduction, a result from the memory lookup in the final phase is provided.

Various embodiments use a TCAM at phase 0 to handle some of the more complex flow lookups as very complex lookups as non-sequential wildcards can consume a lot of table space within the SRAM structures within RFC. Various embodiments provide an assist engine in conjunction with an existing cache to perform phased lookup. Various embodiments provide that a core does not get IO bound waiting for each phase of the lookup to complete; the core can work on something else or sleep while the lookup completes thereby optimizing power; for any misses in cache the hardware assist would ensure those locations are fetched. Since latency of the lookup is improved then the overall cache efficiency is also improved as pages do not need to reside in cache for as long. Various embodiments provide compute cycles for walking each phase is taking off the core and moved to hardware assist alongside the cache optimizing performance of the lookup. Addition of a small TCAM optimizes the lookup table space for the most complex lookup keys.

Traffic Manager Offload

The scaling of cloud compute operations has resulted in migration of various traditional stand-alone compute applications into the cloud. This along with evolution of new traffic types have contributed to a significant increase in various different classes of service to be shared in the network. The term CoS or CLOS can refer to a particular class of service. These classes of service include data for highly critical real time applications such as intelligent and automated transport systems including self-driving automobiles, real time application data for factory automation, power distribution, facility automation systems, and process automation monitoring etc. Along with these classes of service a 5G network could channel other classes of service such as Mission Critical Video, Mission Critical Audio, VoIP, Real time gaming streaming, Video and Audio Streaming services, enterprise data as well as a big pool of best effort data services.

User Plane Function (UPF) is a fundamental component of a 3GPP 5G core infrastructure system architecture. The UPF can represent a data plane of a Control and User Plane Separation (CUPS) strategy, introduced as an extension to existing Evolved Packet Cores (EPCs) by the 3GPP in their Release 14 specifications. CUPS decouples Packet Gateway (PGW) control and user plane functions, enabling the data forwarding component (PGW-U) to be decentralized. This allows packet processing and traffic aggregation to be performed closer to the network edge, increasing bandwidth efficiencies while reducing network.

The UPF, as defined in 3GPP technical specification 23.501 v15.5.0 (2019) (as well as earlier versions, revisions, or variations thereof, provides one or more of the following (1) to (6). (1) An interconnect point between the mobile infrastructure and the Data Network (DN), e.g., encapsulation and decapsulation of GPRS Tunneling Protocol for the user plane (GTP U). (2) A Protocol Data Unit (PDU) session anchor point for providing mobility within and between Radio Access Technologies (RATs), including sending one or more end marker packets to the gNB. (3) Packet routing and forwarding, including performing the role of an Uplink Classifier/UL-CL (directing flows to specific data networks based on traffic matching filters) and a Branching point, when acting as an Intermediate UPF (I-UPF) multi-homed to more than one PDU session anchor (PSA). (4) Application detection using Service Data Flow (SDF) traffic filter templates or 3-tuple (protocol, server-side IP address and port number) Packet Flow Description (PFD) received from the SMF. (5) Per-flow QoS handling, including transport level packet marking for uplink (UL) and downlink (DL), rate limiting and reflective QoS (DSCP) marking on the DL. (6) Traffic usage reporting for billing and the Lawful Intercept (LI) collector interface.

Figure 35:
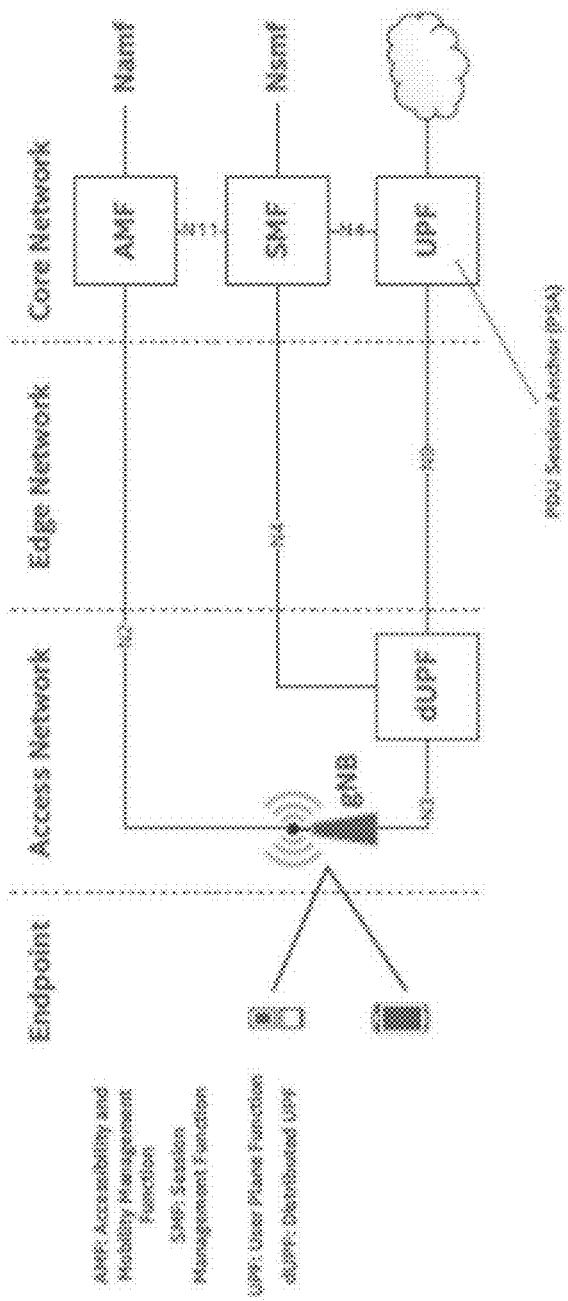
FIG. 35 depicts an example of endpoint communication with various network levels.

FIG. 35 depicts an example of endpoint communication with various network levels. As shown an endpoint UE can communicate with a gNB base station which provide interaction with an edge or core network to process packets and provide response packets.

A traffic manager (TM) can be employed in networking and communications when a host (e.g., server) or NIC decides to send packets on the networking transmit interface. This traffic is to be scheduled for transmission to honor traffic policies assigned across the entities that own the packets. Example entities include application queues, virtual functions, VEEs, Virtual Switch interfaces or even the host. A traffic policy could include traffic priority, traffic bandwidth allocation, burst limits etc.

A TM system can be utilized at packet transmission where packets are posted to the networking device from the host and host software can control the characteristics of the TM including the granularity at which the packets from a specific queue, VEE, VF or host are to be sent to the TM. Software can control how many packets are to be grouped in a specific scheduling group before being sent to the TM and program and assign the policies for the entities. Software can also decide how to map a packet to a specific queue when it posts the packet for transmission by the NIC.

For a fast path offloaded UPF acceleration device, the accelerator can process the UPF packets as they are received from the NIC, perform the QOS and traffic management functionality and re-transmit the packet back to the NIC. All of this is done without any interventions from the host software to free CPU utilization. In some examples, the TM can make autonomous decisions on when to send packets to the TM, how many packets to be included in a scheduling group and how to map the packets to a specific entity in the TM for which a policy is assigned.

An example approach includes building a TM hierarchical tree in the TM, programing the policies at each of the TM hierarchical level, setting up the packets for transmission in the host memory, setting up data pointers etc. for the device to fetch the packet, programming the TM to tell how many packets to include in a specific scheduling round for a queue, setting up a packet or batch of packets to the NIC and map those specific set of packets to a leaf Queue of the TM hierarchical tree. The NIC can fetch the packets and wait until all the packets are fetched to make a scheduling quanta to be send to the TM. The NIC can use the SGLs or data pointers to identify packet portions in memory. Since all the programming and posting of packets are controlled by the host there can be reduced decision making in the TM related to mapping of packets to queues, how many packets to include in a scheduling quanta, how to manage the SGLs etc. The host software can program the TM or NIC to ensure that the packet rate, packet clubbing for a quanta etc. meets the throughput requirement of the transmit network. Host software can manage packet memory in the host and perform any congestion management. However, this approach can involve CPU utilization as software involvement is utilized to decide how many packets to make a scheduling quanta, manage the SGLs, mapping of packets to Leaf Qs and so forth. In a full offloaded fast path accelerator mode, sending the packets to the host and then having host software perform the described management can significantly increase packet transmission latency and also utilize the CPU for packet processing.

Various embodiments provide an autonomous TM that can enforce a QOS acceleration on a fast path packet for a UPF networking device. Various embodiments provide a high performance fully hardware offloaded TM accelerator that requires minimal dynamic involvement from the software and frees up CPU core cycles that can be used for additional compute. In addition, or alternative, to fast path mode, TM can also perform QoS acceleration for packets that are sent by the host in post processing mode.

Figure 36:
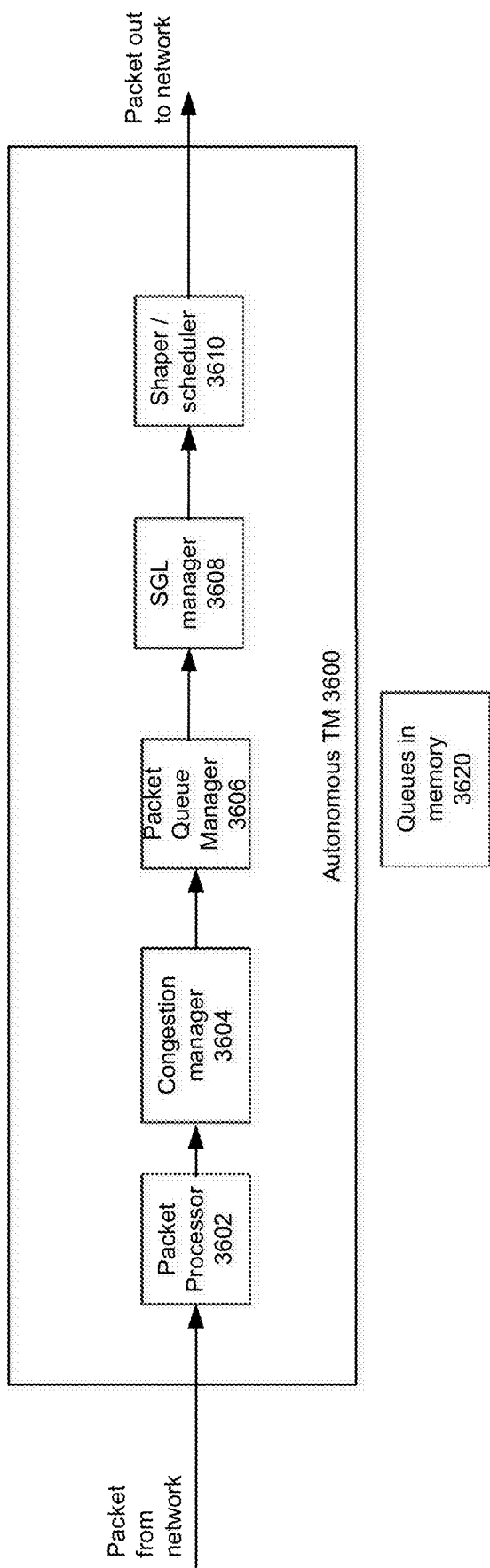
FIG. 36 depicts an example traffic manager system.

FIG. 36 depicts an example system. The system can be performed using NEXT in some embodiments to perform TM. A server or host can offload traffic management to NEXT at least for 5G UPF packets. TM 3600 can be programmed by a driver running in a VEE, hypervisor, driver running on hypervisor (e.g., PF driver), host OS, or a trusted entity. TM 3600 can decide port allocation of packets to be transmitted for VEEs. In some examples, a VEE can offload packet transmission (e.g., set up packets in memory, setting up descriptors for every packet) to the NEXT that implements TM 3600 or part of a NIC or switch. TM 3600 can process packets and packet headers and make packet routing decisions based on policies set by a VEE or application. In addition, or alternative to application to 5G UPF, TM 3600 can be used with other applications that need traffic management capabilities (e.g., Router/Gateway applications, Broadband Network Gateway (BNG) or Broadband Remote Access Server (BRAS) applications, etc.).

Packet processor 3602 can process a received packet from a network to map the received packet to a specific leaf queue of a TM hierarchy. Packet processor 3602 can parse the packet headers, perform look ups based on the header fields to map the packet to a TM queue (e.g., queues 3620 in memory) based on look up or match-action. Queues 3620 in memory can be allocated in a NEXT internal memory or system memory. Memory can be allocated to TM at boot and an application or other software could add or remove queues in memory during runtime.

Congestion manger 3604 can detect early congestion to throttle the incoming packets so that hardware packet memory is used efficiently. Congestion manager 3604 can use an early congestion detection algorithm for each of the supported TM queue such as random early detection (RED). Congestion manager 3604 can apply congestion policies (e.g., RED, Weighted RED (WRED), adaptive RED, robust random early detection (RRED)) and based on the congestion policy the packet can be dropped or accepted.

Packet queue manager 3606 can determine when to allow TM 3600 to schedule packet for transmission, how many packets to include in a quanta to ensure that the TM performance is efficiently used, packets are not stuck in TM or queue for a prolonged period of time waiting for other packets in the same queue to arrive. Packet queue manager 3606 can manage burst characteristics of a queue so that it is not driven to an under subscribed or oversubscribed state.

Queue SGL manager 3608 can keep track of an SGL or pointers to where the packets are stored in the memory, create linking between the packets of a queue, perform memory pointer allocation and de allocation. Scheduler/shaper 3610 can perform transmit rate limiting and determine which packet or packets to transmit to the network.

Scheduler/shaper 3610 can make scheduling decisions complying to network QoS standards such as data center bridging (DCB), priority flow control (PFC), and network traffic shaping, rate limiting and bandwidth allocation.

Network traffic shaping can include policing and shaping to identify and respond to traffic violations against a configured permitted rate and perform actions such as dropping or re-marking excess traffic. Policing may not delay traffic in some examples. Shaping can attempt to limit traffic transmission peak rates to limit spikes above a SLA-contracted rate by buffering or delaying packet traffic to transmit until transmit bandwidth is available.

In some examples, features of TM 3600 can be implemented using components of the system of FIG. 8B. For example, packet processor of FIG. 8B can perform operations of packet processor 3602; queue manager of FIG. 8B can perform operations of congestion manager 3604, packet queue manager 3606, and SGL manager 3608; and traffic manager of FIG. 8B can perform operations of shaper/scheduler 3610.

5G UPF

Figure 37:
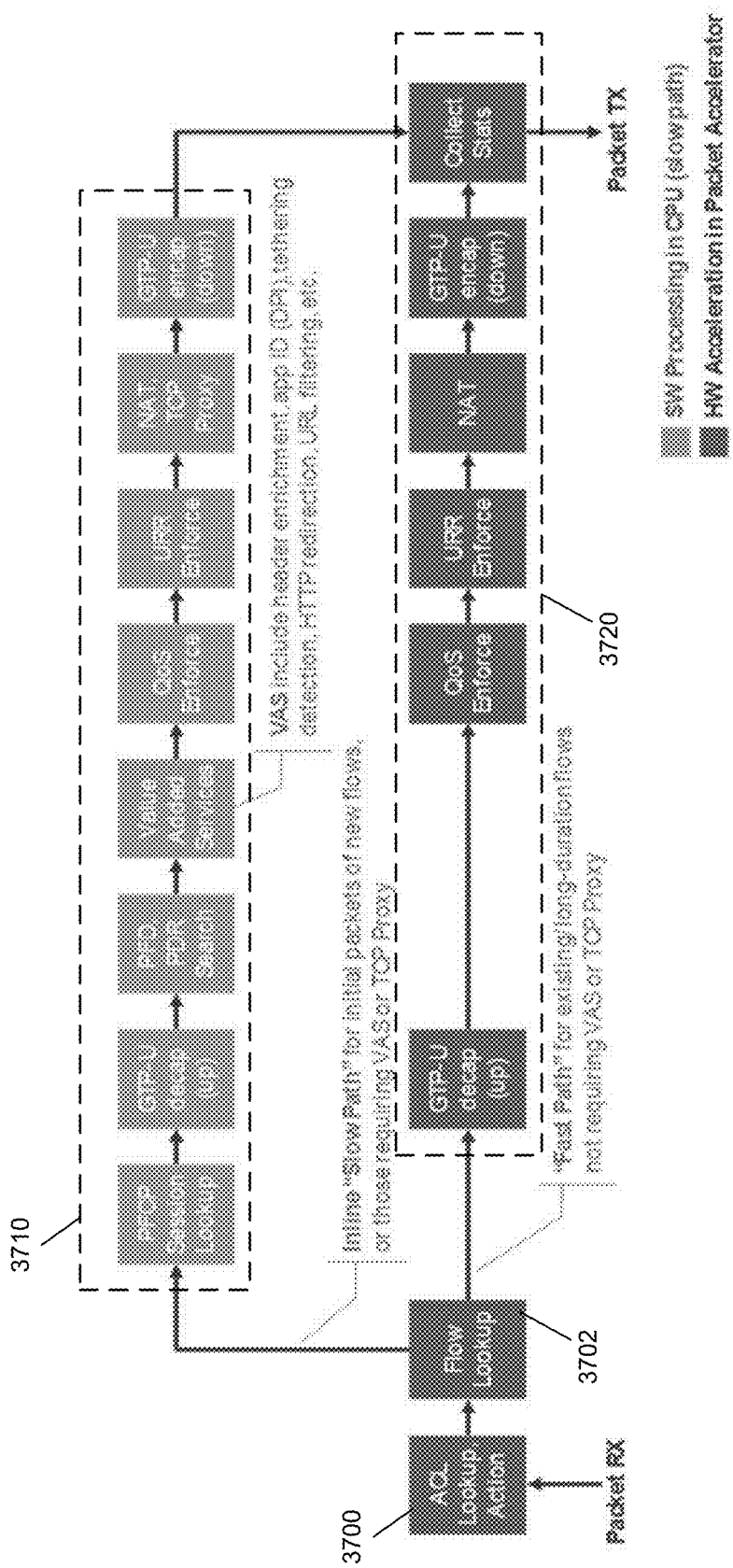
FIG. 37 depicts an example of processing using WAT and CPU.

FIG. 37 depicts an example of use of WAT for 5G-UPF. In this example, WAT can provide fast path hardware acceleration and CPU cores can execute software to perform packet processing. 5G UPF provides packet routing and forwarding, packet inspection, QoS handling, traffic usage reporting and other related functions. The UPF is used to interconnect the Radio Access Network to the Data Network.

The packets arriving at a NIC can be transferred peer-to-peer to the receive function of the WAT. Access control list (ACL) engine 3700 (e.g., an IP block) of WAT can perform flow lookup to determine if packets are to be processed in WAT or by the CPU. Flow lookup 3702 operation of WAT can forward packets of flows that do not match the flow lookup are forwarded to the CPU for further processing in CPU cores (shown as 3710).

In path 3710, CPU can perform 5G UPF through execution on cores. Packet forwarding control protocol (PFCP) can perform a session lookup to identify if the packets are control plane packets or user plane packets. PFCP control packets can be used for control and management of the UPF and hence are handled by the software running on CPU cores. User plane packets can be encapsulated over GTP-U encapsulation protocol (e.g., GTP-GPRS tunneling protocol or GTP-U-GTP user data tunneling). GTP-U decapsulation (decap) can decapsulate the tunnel header and pass the header to Packet flow description/Packet detection rules (PFD/PDR) search block to classify the traffic to identify whether the traffic is associated with a certain application and if any value added functions are to be performed on the packet. For the packets (e.g., packet data units (PDUs)) matching PDRs, associated forwarding action rules (FAR) are performed on the packets. These FAR could include forward, drop, buffer, or certain QoS enforcement rules (QER), and the UPF may also perform usage reporting rules (URR) for usage measurements, reporting, charging, billing, etc. Depending on the forwarding action the packet could further undergo Transmission Control Protocol (TCP) proxy function and/or Network Address Translation (NAT) before further encapsulation over GTP-U protocol and transmission to WAT for packet transmission. WAT may collect statistics on such frames before transferring the packets peer-to-peer to the NIC.

After a packet flow has been identified by the packet processing in CPU cores, the software may determine that subsequent packets of that flow (e.g., elephant flows, certain application flows like a video stream, audio stream, data stream, etc.,) could be handled directly by the WAT. Hence the CPU-executed software could program the WAT to handle further packets of that flow in the hardware fast path (shown as path 3720) without further processing in software until the duration of that flow. Subsequent packets of the flow could be directly identified by flow lookup engine for processing by WAT and all packet forwarding and transformation could be performed in hardware and directly transferred back to the NIC without CPU intervention for the duration of that flow (until terminated). The software could program flow lookup of WAT with a flow signature or flow identifier that identifies a packet flow such that WAT can perform all the packet transformation such as GTP-U decapsulation function, perform FAR forwarding functions, QER QoS enforcement functions, URR user reporting functions, and perform other functions such as Network address translation, packet encapsulation (GTP-U and any other additional overlay encapsulations such as VXLAN, etc.) and provide packets in the flow to the NIC hardware over "Packet TX" (peer-to-peer transfer).

Some examples provide a hybrid model where certain functions of the flow are performed in hardware (e.g., pre-processing) in WAT on ingress before being transferred to CPU-executed software. Examples of such pre-processing could include access control, GTPU decapsulation, PFCP control packet identification, etc. Similarly, software could perform certain value-added functions and offload packet processing functions to be handled by WAT (e.g., post-processing). Examples of post-processing could include Forwarding functions, QoS enforcement functions, transmit scheduling functions, NAT functions, URR, statistics, GTPU encapsulation functions etc.

Similarly, other inline encryption and decryption functions for encrypted flows to and from UPF could also be handled in WAT's crypto engine for pre-processing, post-processing and/or fast path processing. In some cases, gateway and routing functions, network virtualization overlay functions could also be handled in conjunction with the UPF function in WAT.

Some examples provide multiple virtualized applications running on the server CPU, for example one of the virtual machines (VM) is running 5G UPF function and another virtual machine is running a gateway function. The WAT could be logically partitioned for accelerating both Gateway function and 5G-UPF function. Each application running on the virtual machines could be managing their offload or acceleration policies on its own logical partition of the WAT.

Next Generation Firewall

Figure 38:
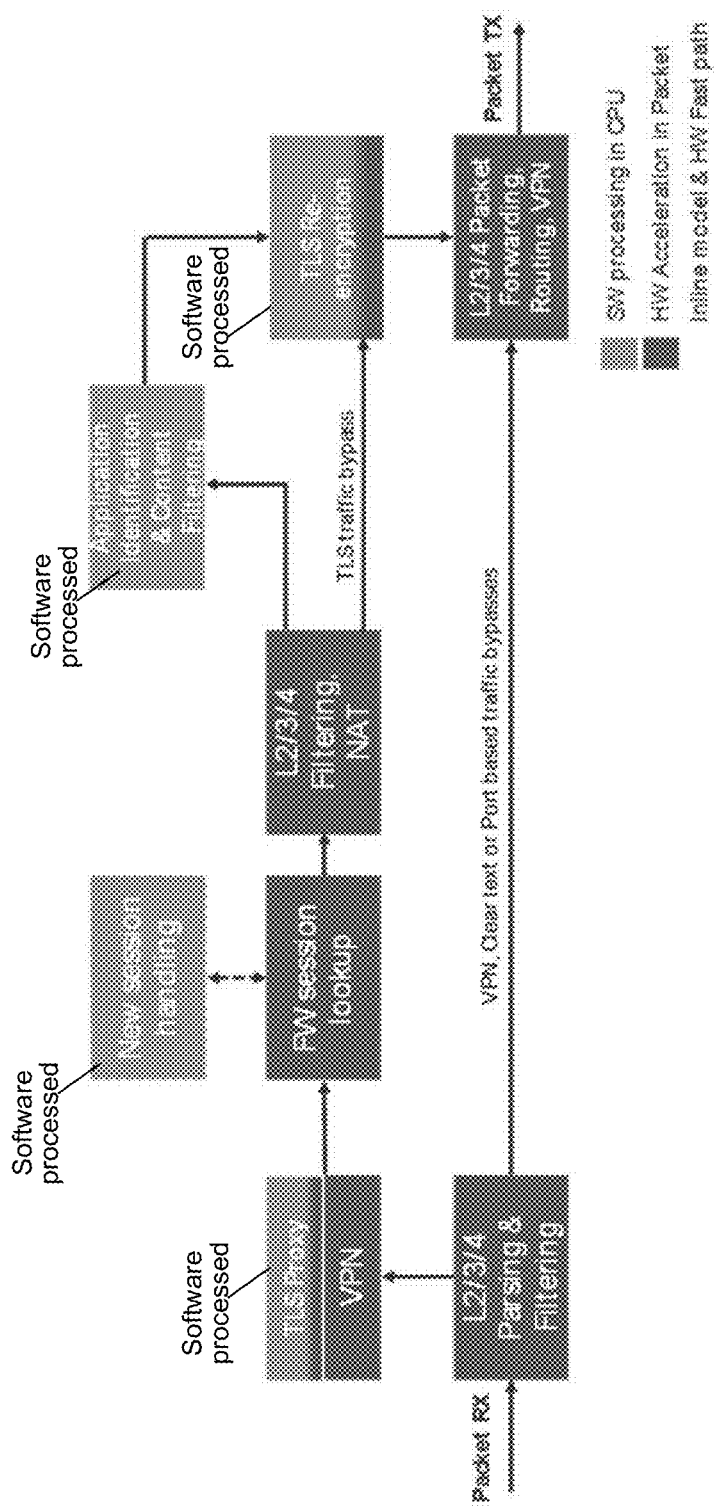
FIG. 38 shows an example of an Next Generation Firewall (NGFW) application implemented in WAT and packet processing executed on CPU cores.

FIG. 38 shows an example of a Next Generation Firewall (NGFW) application implemented in WAT and packet processing executed on CPU cores. NGFW is a network security function or appliance that includes intrusion detection and prevention, deep packet inspection, application identification, threat detection, and related functions. NGFW may also integrate VPN function, TLS proxy function, and Gateway/Routing and forwarding functions.

WAT's flexible packet processing pipeline can be programmed in such a way to perform hardware acceleration of next generation firewall to perform (1) pre-processing of packets on ingress that include packet inspection, decryption, firewall session lookup, filtering, etc., before forwarding them to software running on CPU cores for further inspection for application detection etc., (2) post processing of packets on egress that include network address translation, encryption, routing and forwarding, VPN handling, QoS, and statistics, (3) bypass of certain flows that are not to be examined by the advanced firewall functions such as deep packet inspection, application detection. WAT would directly handle certain flows that are not to be examined by the advanced firewall functions in a hardware fast path, including but not limited to VPN, routing, forwarding and NAT functions, etc.

Different profiles could be established for handling different packet types or flows with different level of pre-processing, post processing and fast path handling by WAT. WAT could identify those profiles and flows associated with the profile and be able to provide the programmed level of packet handling/acceleration by WAT thereby providing the desired level of performance. Accordingly, WAT in combination with CPU cores can provide a NGFW function/appliance system can be able to provide best performance for targeted throughput with optimum amount of processing resources.

Received packets at a NIC can be transferred peer-to-peer to the receive function of the WAT. WAT can classify ingress packets by L2/3/4 packet classification and filtering. Certain packet flows may be identified as traffic that does not need further inspection and hence bypass the advanced firewall functions and directly forwarded by the WAT to the Packet TX. The packets are transferred peer-to-peer to the NIC for egress. The packet flows that are qualified for bypass could be directly handled by the WAT packet processing functions without intervention by the software running on CPU cores. WAT could perform packet filtering, virtual private network (VPN) handling (e.g., packet decryption and encryption), packet routing and forwarding functions, network address translation (NAT), packet inspection at L2/3/4 level, QoS functions including ingress policing, transmit scheduling, and statistics, and related functions. Some operations can be performed by CPU-executed software, some operations can be performed by WAT, and some operations can be performed by a combination of CPU-executed software and WAT.

Management software could configure the WAT to detect the packet flows that can be directly handled by WAT's processors. The flows could also undergo different levels of packet transformation. Certain flows may undergo VPN processing, firewall session lookup, network address translation etc., while certain other flows may directly go to packet forwarding. These policies can be configured or programmed by the control and management software that manages WAT.

Traffic flows that are to undergo traffic inspection as identified by the FW session lookup function as well as new (or unknown) flows that need inspection by the advanced firewall functions can be sent by the WAT to the software executing on CPU cores. For example, software processing via execution on CPU cores can include deep packet inspection, application detection, intrusion detection, application level content filtering etc. WAT can provide packet flows to be TLS encrypted (e.g., web and application flows can be SSL/TLS encrypted) to TLS proxy function that includes TLS decryption before further packet inspection such as application detection etc. CPU cores can perform re-encryption on egress after the packet inspection operations such as intrusion detection or content filtering. In some examples, TLS re-encryption could be partly handled by WAT (e.g., encryption and decryption) and partly handled by CPU-executed software (e.g., protocol termination and proxy function).

For flows that are processed by CPU cores, WAT can perform decryption on ingress and encryption on egress for such packet flows. Flows that are processed by CPU cores that utilize VPN services for secure transport level encryption can be processed by WAT, in addition to WAT performing packet forwarding, routing, NAT, and statistics.

Virtualization of WAT Pipeline

WAT can be virtualized for access by applications or VEEs. WAT and its flexible hardware pipeline can be virtualized or logically partitioned such that each logical partition can be provided to different virtual machines or contains. Hence multiple applications would be able run simultaneously taking advantage of the acceleration capability provided by the NIC. The resource can be partitioned at the initialization and/or dynamically assigned during run time. With the HW virtualization capability in WAT, it is possible to concurrently run multiple different applications such as Next Gen Firewall and Internet Gateway/router functions, UPF functions, Network proxy functions, etc., The WAT could be used in a virtualized server system with virtual machines to accelerate network appliances, virtual network functions (VNFs), etc., or in containerized environments (cloud native environment) to accelerate applications or cloud native functions (CNFs) running on containers or to accelerate proxy functions (e.g., Envoy) in a Kubernetes cloud native environment. If there are not enough resources in WAT, a request to utilize WAT can be rejected or the request can be transferred to another CPU with available WAT resources by transferring the request to another CPU socket or other platform in rack.

Subscriber Level Quality of Service (QOS) Control

A 5G UPF can manage a significant scale of discrete User Equipments (UEs) that can be in the range of millions of UE. UEs can send and receive data that can be categorized in to one of the several classes of service mentioned earlier. Because of the wide range of classes of service whose Packet Delay Budget could range from 5 ms to 300 ms, a 5G UPF accelerator scaling the 5G QOS functionality faces following challenges. The 5G UPF QOS enforces a QOS policy for multitudes of User Equipments (UEs) to ensure that a specific UE's assigned QOS policy is satisfied across the categories of one or more of Guaranteed Bit Rate (GBR), Non-GBR, DC-GBR (Delay Critical Guaranteed Bit Rate) and AMBR (Aggregate Maximum Bit Rate). For example, 5G UPF QOS can be used to enforce a QOS policy to satisfy the QOS requirements of the wide ranges class of service (CLOS) associated with the traffic. These class of service (CLOS) can be categorized into 20 or more 5G QOS index (5QI) classes with each 5QI having a separate priority and Packet Delay Budget (PDB) requirements that spans wide spectrum of latency requirements.

A group of UEs can be divided among various Network Function Virtualization (NFV) functions (or VNFs). The group of UEs can span across multiple UPFs within a service provider. QOS can be enforced across the VNFs. Also, the QOS tree could be a representation of the wireless hierarchy that starts from the UPF traversing through back haul, mid haul and front haul. A separate QOS policy could be enforceable for each of these hierarchical levels.

Performance of QOS function by 5G UPF can experience one or more of the following challenges. (1) Scale the QOS performance to meet the highly latency critical Classes of services such as Mission Critical and Real time applications that would require a QOS enforcement and decision made in few nanoseconds. (2) Scale the QOS nodes to enforce QOS policy across a million UE within a 5G UPF and potential path to exponentially scale for next generations of Wireless Standards as the UE and Subscriber usage increases. (3) Support a multi-level QOS model from a million UE converging to VNFs/VMs in the range of 100 including the entire hierarchy supporting a coherent QOS policy and enforcing the separate QOS for each section of the QOS tree. (4) Modulate the QOS policy decisions based on the network traffic and congestion and performance in NICs to incorporate and dynamically tune the QOS decisions. (5) Fully autonomous 5G QOS engine with no real time intervention from CPU-executed software for low latency and high performance CLOS. (6) A software and driver stack that can pre-program the 5G QOS components and enable these components for fully autonomous QOS decision making as the stack would ensure the programming enforces a coherency in decision making across various levels of the QOS tree.

In some examples, a QOS application (e.g., software executed by one or more processors) can perform an analysis of each of the UE packets, infer its CLOS, review the QOS policy associated with the UE, compare the QOS policy of that UE with other UEs, compare the CLOS policy of that CLOS with other UE traffic CLOS and enforce a QOS decision. This first level QOS decision can be performed by a QOS application within a VNF/VM. A packet processor accelerator processing the UPF packets sends each and every packet to the application host memory accessible by the QOS application, waits for a QOS decision, and return of the packet to the NIC to transmit the packet to the network. This will affect the packet performance and throughput significantly and this will not be able to keep up with the scaling of the bandwidth and packet throughput. Slow software may not be able to achieve tight latency and tight Packet Delay Budget requirement of CLOS that are getting added to 5G such as Mission Critical Applications, Real time Applications etc. This approach may fail in a scenario where a full 5G UPF function need to be offloaded to a fixed function accelerator for performance. In some cases, the QOS application will not have any effective real time solutions to feedback a downstream NIC QOS scenario to dynamically change the QOS behavior on the fly.

In some examples, a device (e.g., ASIC, FPGA, etc.) node corresponding to each of the UE can be programmed with a policy and one or more CLOS s supported by the UE. A QOS tree can represent multiple hierarchical levels representing various aspects of the 5G Wireless Hierarchy from the UE to Front Haul to Mid Haul to Back Haul to UPF to VNF. Each level of the QOS tree can include a leaf which represents UE and make a scheduling decision to pick a winner from that level to move forward to transmission or processing. However, a hierarchical QOS tree with the UE as leaf will run in to scalability issues as the number of UEs increase. Even with 1 Million UEs, having hardware nodes to enforce the QOS on each one of them and having a scheduling decision done at the leaf level will affect from a performance perspective and from a scalability perspective. In some examples, QOS level of downstream receiver NIC cards may not be used to dynamically modify the QOS for the UPF. Processor-executed software may be used to pre-process 5G UPF packets and extract and filter the 5G QOS information that can be used either by a 5G QOS accelerator or a 5G QOS application.

Various embodiments program QOS polices and any classification, filtering and pre-processing information upfront so that a hardware device can make QOS decisions autonomously for meeting the performance and latency. Various embodiments provide a 5G QOS hardware offload solution. Various embodiments may have no dependency real time on the QOS application to make a QOS decision.

Various embodiments may allow for scalability of the UEs for next generation wireless standards by decoupling the UEs from a leaf of QOS scheduling tree. The QOS scheduling tree may perform scheduling from the UE CLOS which is an aggregate of several 1000s of UEs. The QOS scheduling tree can perform scheduling for other hierarchical levels within the QOS tree to satisfy the 5G QOS requirements.

Figure 39A:
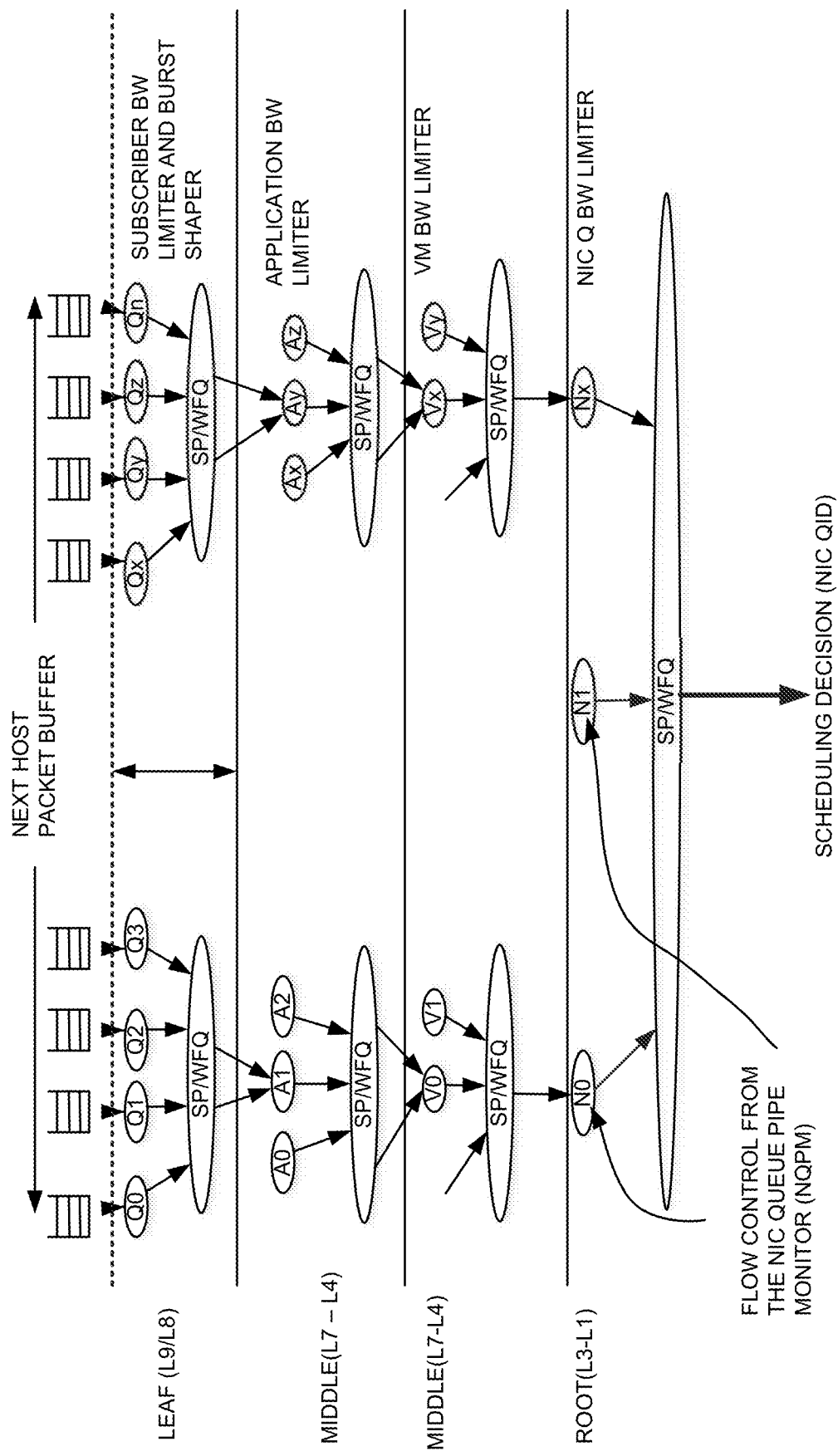
FIGS. 39A to 39C depict an example of multi-layer hierarchical metering.
Figure 39B:
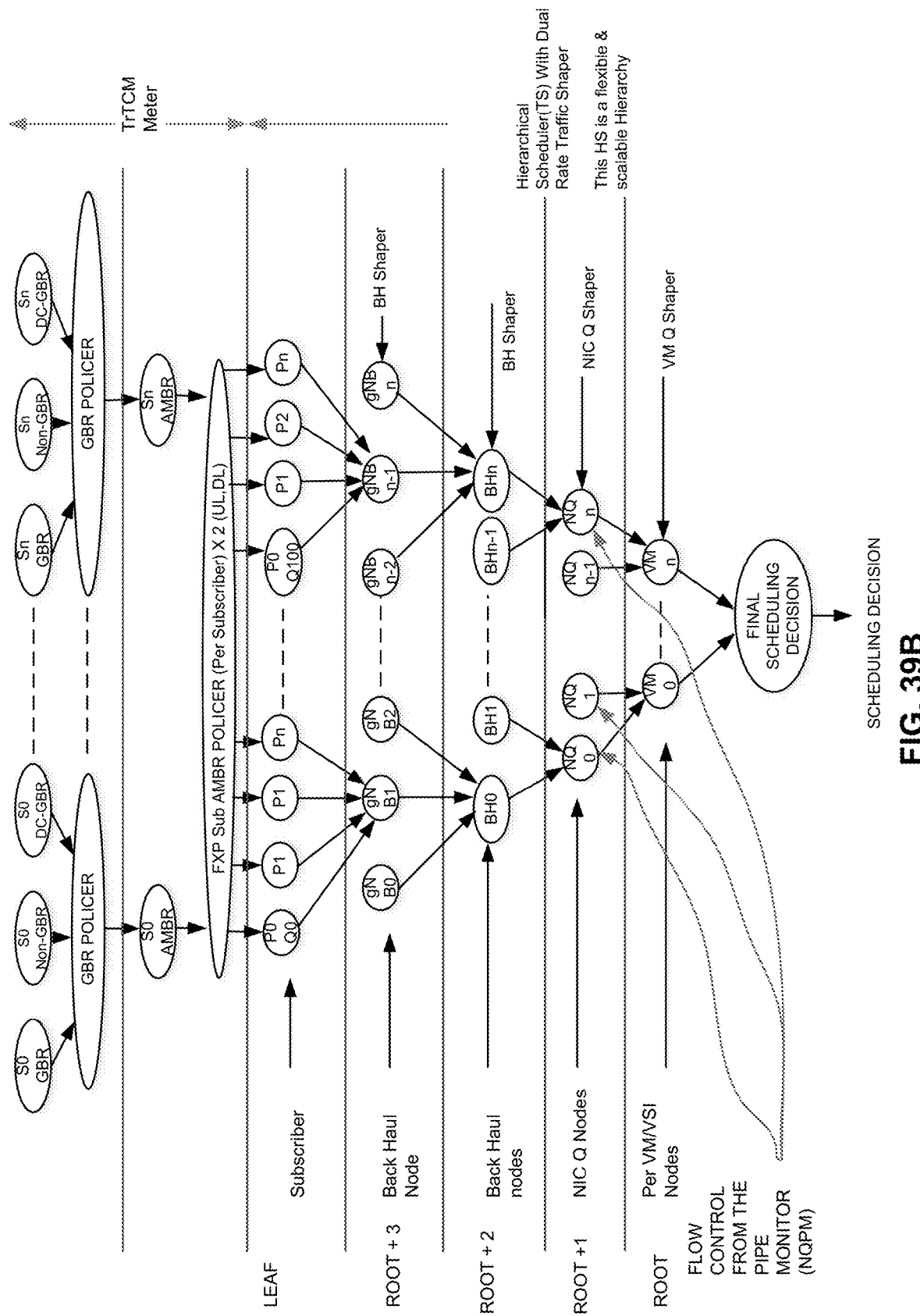
Figure 39C:
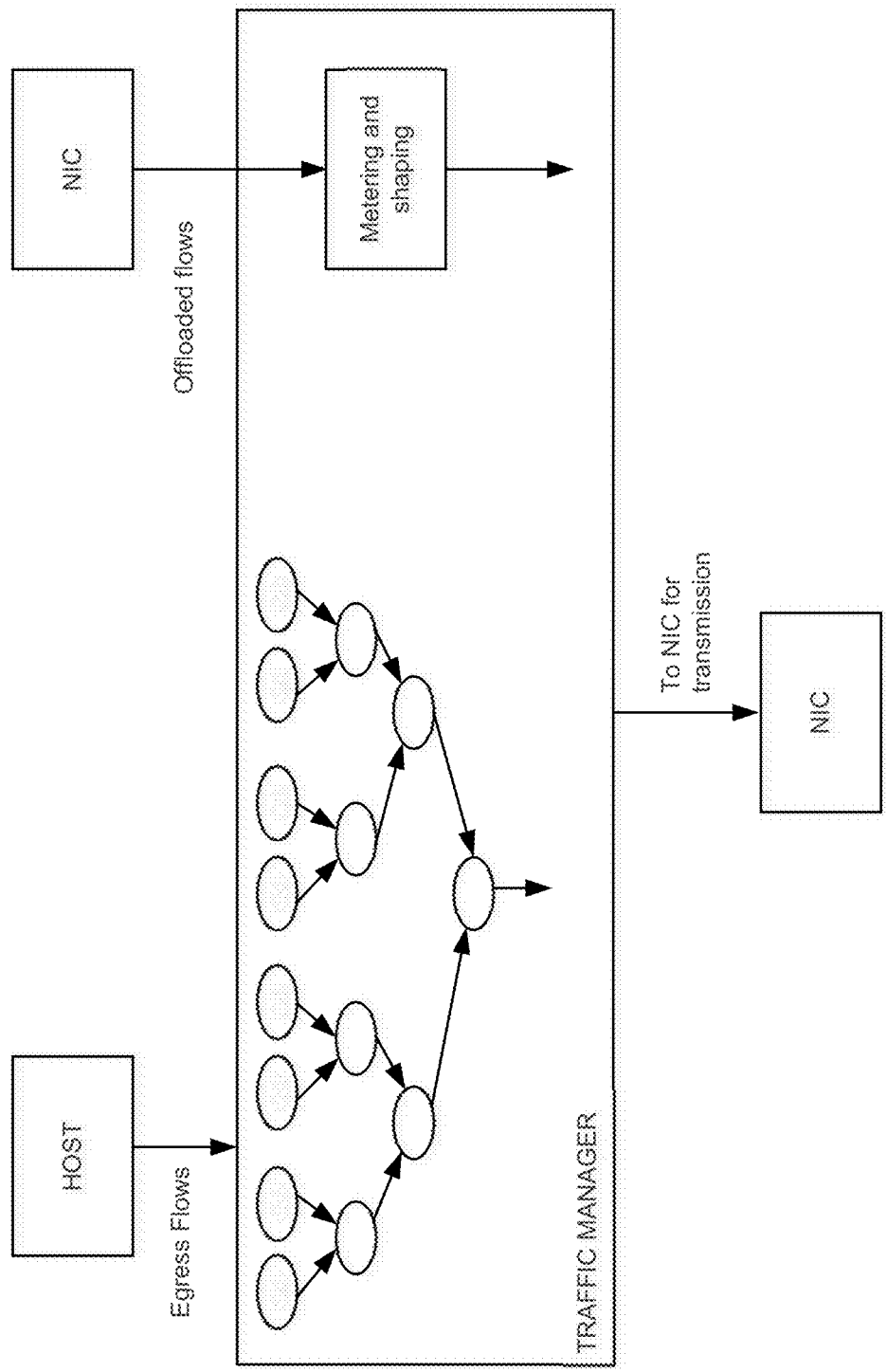

FIGS. 39A to 39C depict an example of multi-layer hierarchical metering. The multi-layer hierarchical metering can be applied by any traffic manager described herein. FIG. 39A depicts an example of a Hierarchical Scheduler (TS) that can provide a flexible and scalable hierarchy with leaf to root hierarchy.

Packets from a NEXT host packet buffer can be subject to multiple layers of scheduling. Scheduling of different groups of one or more packet buffers can be performed in parallel. LEAF (L9/L8) can represent subscriber queues or different CoS for a subscriber. Bandwidth limiting and burst shaping can be applied at the subscriber level. For example, 128K queue can be available as subscriber queues. MIDDLE(L7-L4) can represent an application layer. MIDDLE(L7-L4) can represent a VM layer. Bandwidth limiting and burst shaping can be applied at the application and VM level. For example, 64K nodes or queues can be supported and available for the middle layer. ROOT(L3-L1) can represent NIC queues. For example, 1K queues can be available. Bandwidth limiting and burst shaping can be applied at the application and NIC level. A scheduling decision can be made to determine a queue identifier that is associated with a packet to be transmitted. Strict priority (SP) or weighted fair queuing (WFQ) can be performed by any layer.

Note that though MIDDLE layers L4-L7 are represented as a VM layer, the MIDDLE layers L4-L7 could in addition or alternatively be applied for one or more of: a virtual network function (VNF) application in a NFV mode, or an application, an appliance in a monolithic application model (non-virtualized application or appliance application), a containerized application, or a cloud native function (CNF) in a cloud native model. A VM layer can represent one or more of the above cases, with respect to TM hierarchy. In other words, per VM could refer to per VM, per VNF, per container, per CNF, and so forth. For example a VM bandwidth limiter could include a VNF bandwidth limiter, container bandwidth limiter, or CNF bandwidth limiter in FIG. 39A, and a VM Q shaper in FIG. 39B could represent a VNF Q shaper or a container or CNF Q shaper, etc.

FIG. 39B depicts an example representation of multiple levels of scheduling. Guaranteed Bit Rate (GBR) policers can apply GBR to GBR, non-GBR, and Dual Connectivity (DC) traffic from subscribers S0 to Sn. GBR policers can be applied per subscriber, per resource, for uplink (UL) and/or downlink (DL). For outputs from GBR policers, Aggregate Maximum Bit Rate (AMBR) policer can apply AMBR per subscriber for UL and/or DL. In some examples, GBR and AMBR metering can be performed in accordance with A Two Rate Three Color Marker (trTCM) of RFC 2698 (1999), although other examples can be used.

Leaf level and root levels can perform traffic shaping as a Hierarchical Scheduler with dual rate traffic shaper that is flexible and scalable. A leaf level can provide a per backhaul (BH) priority queue where a Priority Q (P0-Pn) can represent a 5G QOS priority Level (5QI). ROOT+3 and ROOT+2 can perform back haul node level shaping. ROOT+1 can perform NIC queue shaping. ROOT can perform per VM or VSI level shaping. Flow control can be applied from pipe monitor to ROOT+1 (NIC queue nodes). A scheduling decision can be made after the multiple levels of shaping.

FIG. 39C depicts an example of a host and NIC offloading flows to a traffic manager for metering and/or shaping.

Figure 40:
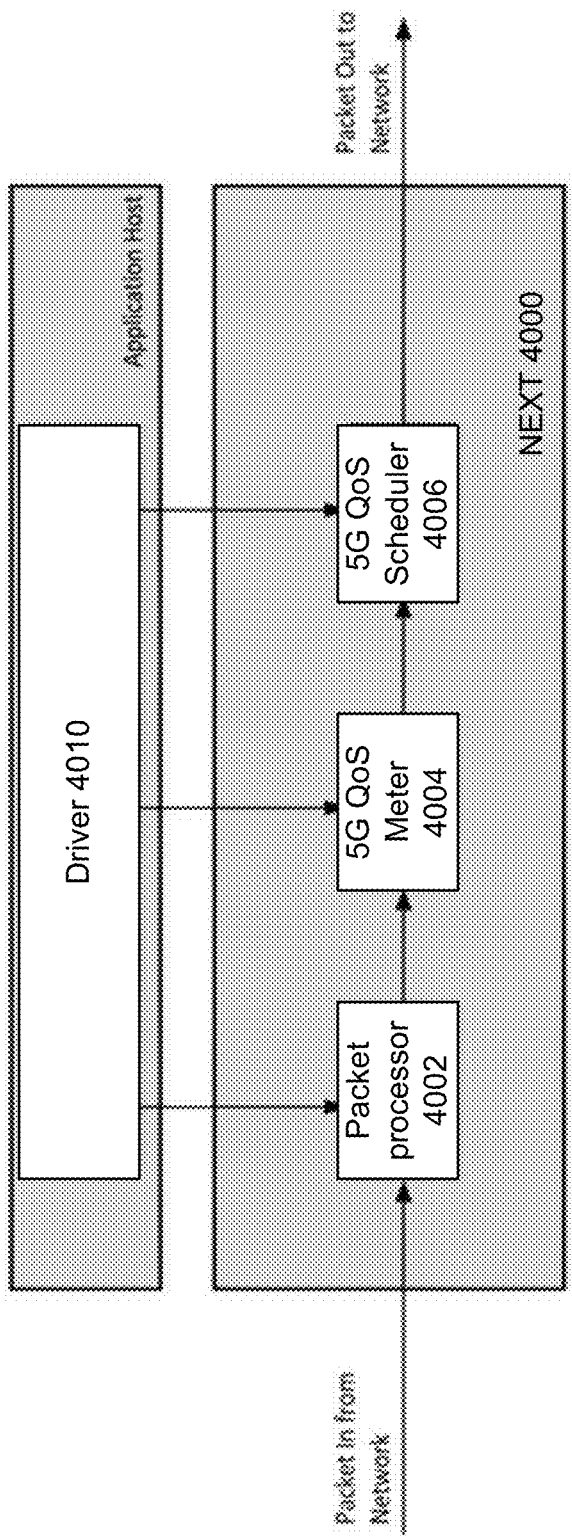
FIG. 40 depicts an example system.

FIG. 40 depicts an example system. Various embodiments provide a host executed device driver and software stack that configure packet processor, Multi-Layer Meter and 5G QOS scheduler to autonomously process the 5G packets, identify and extract the 5G QOS information with no software intervention, enforce the 5G QOS requirements at UE level and perform high throughput 5G QOS scheduling to meet the latency and performance requirements across all CLOS. For a fast path offloaded UPF acceleration device, the purpose of the accelerator is to process the UPF packets as it is received from the interface, perform the QOS and re-transmit the packet. All of this can be performed without any interventions from the host software to free CPU utilization.

A received packet can be associated with a UE. Packet processor 4002 can map the packet to its UE and a scheduler can apply metering and QoS policy to that packet based on its UE. Driver 4010 can configure NEXT 4000 to process received packets in order to that can classify, parse and process 5G UPF packets to map and extract the 5G QOS information from the packet autonomously without any dependency on the software to allow for full hardware automation and offload of the 5G UPF functionality.

Driver 4010 can configure 5G QOS meter 4004 to perform metering on the UE traffic to meet the 5G bitrate requirements at an individual UE level. Various embodiments may perform hierarchical metering and rate limiting so that both Guaranteed Bit Rate (GBR) and Aggregate Maximum Bit Rate (AMBR) policies can be enforced for a UE. Metering and rate limiting can smooth out bandwidth and limit rate by performing packet acceptance or wait until bandwidth available or congestion levels are appropriate to send the packet, or determine to drop the packet. After configuration, NEXT can operate autonomously from a CPU core with no involvement of cores for classification or policy application. NEXT 4000 can scale up or down to support a number of subscribers up to maximum.

5G QOS meter 4004 can perform scalable Multi-Layer hierarchical metering that allows for the QOS enforcement at UE level to guarantee the GBR, non-GBR, AMBR, Dual Connectivity (DC) GBR for individual UEs. Various embodiments may autonomously process 5G packets without any real time CPU-executed software intervention to make a QOS decision per-packet.

Driver 4010 can configure 5G QOS high performance flexible scheduler 4006 to implement a multi-layer scheduling tree that works in close conjunction with the hierarchical UE metering. Various examples of a multi-layer scheduler can scale with the packet throughput matching scheduling decisions such as to X million scheduling decisions, where X million scheduling decisions is equal to X million packets/second throughput supported over the network. A scheduling tree can be flexible to support various 5G QOS tree structures and guarantee low latency scheduling to meet the Packet Delay Budget (PDB) value for the highest 5G QoS Identifier (5QI) CLOS to permit most or all CLOS in the 5G to be supported.

For example, a traffic manager of NEXT can perform metering 4004 and scheduling 4006.

Figure 41:
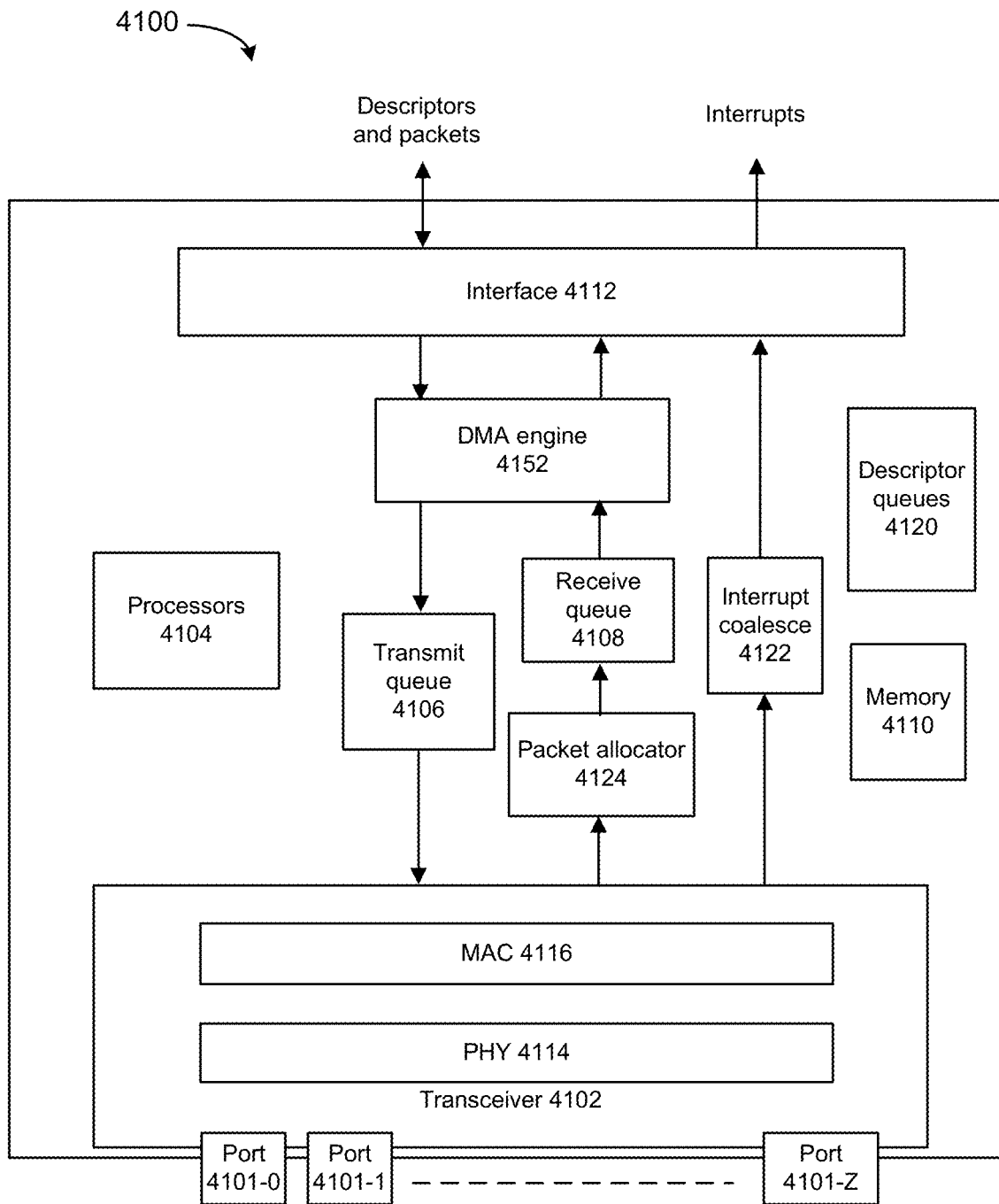
FIG. 41 depicts an example of a network interface.

FIG. 41 depicts an example of a network interface. Various embodiments of the network interface can interface with a CPU and NEXT in accordance with embodiments described herein. Transceiver 4102 can be capable of receiving and transmitting packets using various ports 4101-0 to 4101-Z in conformance with the applicable protocols such as Ethernet as described in IEEE 802.3, although other protocols may be used. Transceiver 4102 can receive and transmit packets from and to a network via a network medium (not depicted). A network medium can be a wired or wireless medium. A wired medium can conduct electrical and/or optical signals. For example, a medium can be any type of cable such as but not limited to optical fiber (e.g., 25GBASE-SX, 25GBASE-LX, 1000BASE-X, 1000BASE-SX, 1000BASE-LX, 1000BASE-BX, 1000BASE-RHx, or 1000BASE-PX), twisted pair cable (e.g., 1000BASE-T, 1000BASE-T1, 1000BASE-TX), shielded balanced copper cable (e.g., 1000BASE-CX), copper backplane (e.g., 1000BASE-KX), as well as other speeds (e.g., 10 Gbps). In some examples, a network interface can include one or more of a host fabric interface (HFI), a host bus adapter (HBA), network interface connected to a bus or connection (e.g., PCIe, CXL, DDR, and so forth). Transceiver 4102 can include PHY circuitry 4114 and media access control (MAC) circuitry 4116.

Some examples of NIC 4100 are part of an Infrastructure Processing Unit (IPU) or data processing unit (DPU). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In some examples, NIC 4100 can include a smartNIC. A smartNIC can include one or more of a NIC, NEXT, DPU, or IPU and include programmable processors (e.g., XPU, CPU, FPGAs, ASICS, system on chip) to perform operations offloaded by a host. In some examples, NIC 4100 includes a network interface, network interface controller or a network interface card. In some examples, a network interface can be part of a switch or a system-on-chip (SoC) with devices such as a processor or memory.

PHY circuitry 4114 can include encoding and decoding circuitry (not shown) to encode and decode data packets according to applicable physical layer specifications or standards. MAC circuitry 4116 can be configured to perform MAC address filtering on received packets, process MAC headers of received packets by verifying data integrity, remove preambles and padding, and provide packet content for processing by higher layers. MAC circuitry 4116 can be configured to assemble data to be transmitted into packets, that include destination and source addresses along with network control information and error detection hash values.

Processors 4104 and packet processing circuitry can include any combination of a: processor, core, graphics processing unit (GPU), field programmable gate array (FPGA), application specific integrated circuit (ASIC), or other programmable hardware device that allow programming of network interface 4100. For example, processors 4104 can provide for identification of a resource to use to perform a workload and generation of a bitstream for execution on the selected resource. For example, a "smart network interface" can provide packet processing capabilities in the network interface using processors 4104.

Packet allocator 4124 can provide distribution of received packets for processing by multiple CPUs or cores using timeslot allocation described herein or RSS. When packet allocator 4124 uses RSS, packet allocator 4124 can calculate a hash or make another determination based on contents of a received packet to determine which CPU or core is to process a packet.

Interrupt coalesce 4122 can perform interrupt moderation whereby network interface interrupt coalesce 4122 waits for multiple packets to arrive, or for a time-out to expire, before generating an interrupt to host system to process received packet(s). Receive Segment Coalescing (RSC) can be performed by network interface 4100 whereby portions of incoming packets are combined into segments of a packet. Network interface 4100 provides this coalesced packet to an application.

Direct memory access (DMA) engine 4152 can copy a packet header, packet payload, and/or descriptor directly from host memory to the network interface or vice versa, instead of copying the packet to an intermediate buffer at the host and then using another copy operation from the intermediate buffer to the destination buffer.

Memory 4110 can be any type of volatile or non-volatile memory device and can store any queue or instructions used to program network interface 4100. Transmit queue 4106 can include data or references to data for transmission by network interface. Receive queue 4108 can include data or references to data that was received by network interface from a network. Descriptor queues 4120 can include descriptors that reference data or packets in transmit queue 4106 or receive queue 4108. Interface 4112 can provide an interface with host device (not depicted). For example, interface 4112 can be compatible with PCI, PCI Express, PCI-x, Serial ATA, and/or USB compatible interface (although other interconnection standards may be used).

In some examples, processors 4104 can determine whether a packet includes content for which receipt can be acknowledged prior to processing by an application in accordance with embodiments described herein. In some examples, processors 4104 can perform one or more of: large receive offload (LRO), large send/segmentation offload (LSO), TCP segmentation offload (TSO), Transport Layer Security (TLS) offload, receive side scaling (RSS) to allocate a queue or core to process a payload. LRO can refer to reassembling incoming network packets and transfer packet contents (e.g., payloads) into larger contents and transferring the resulting larger contents but fewer packets for access by the host system or a virtualized execution environment.

LSO can refer to generating a multipacket buffer and providing content of the buffer for transmission. A host device can build a larger TCP message (or other transport layer) and processors 4104 can segment the message it into smaller data packets for transmission. TLS is defined at least in The Transport Layer Security (TLS) Protocol Version 1.3, RFC 8446 (August 2018). TLS offload can refer to offload of encryption or decryption of contents in accordance with TLS in processors 4104. Network interface 4100 can receive data for encryption and perform the encryption of data prior to transmission of encrypted data in one or more packets. Network interface 4100 can receive packets and decrypt content of packets prior to transfer of decrypted data to a host system. In some examples, any type of encryption or decryption be performed such as but not limited to Secure Sockets Layer (SSL).

Figure 42:
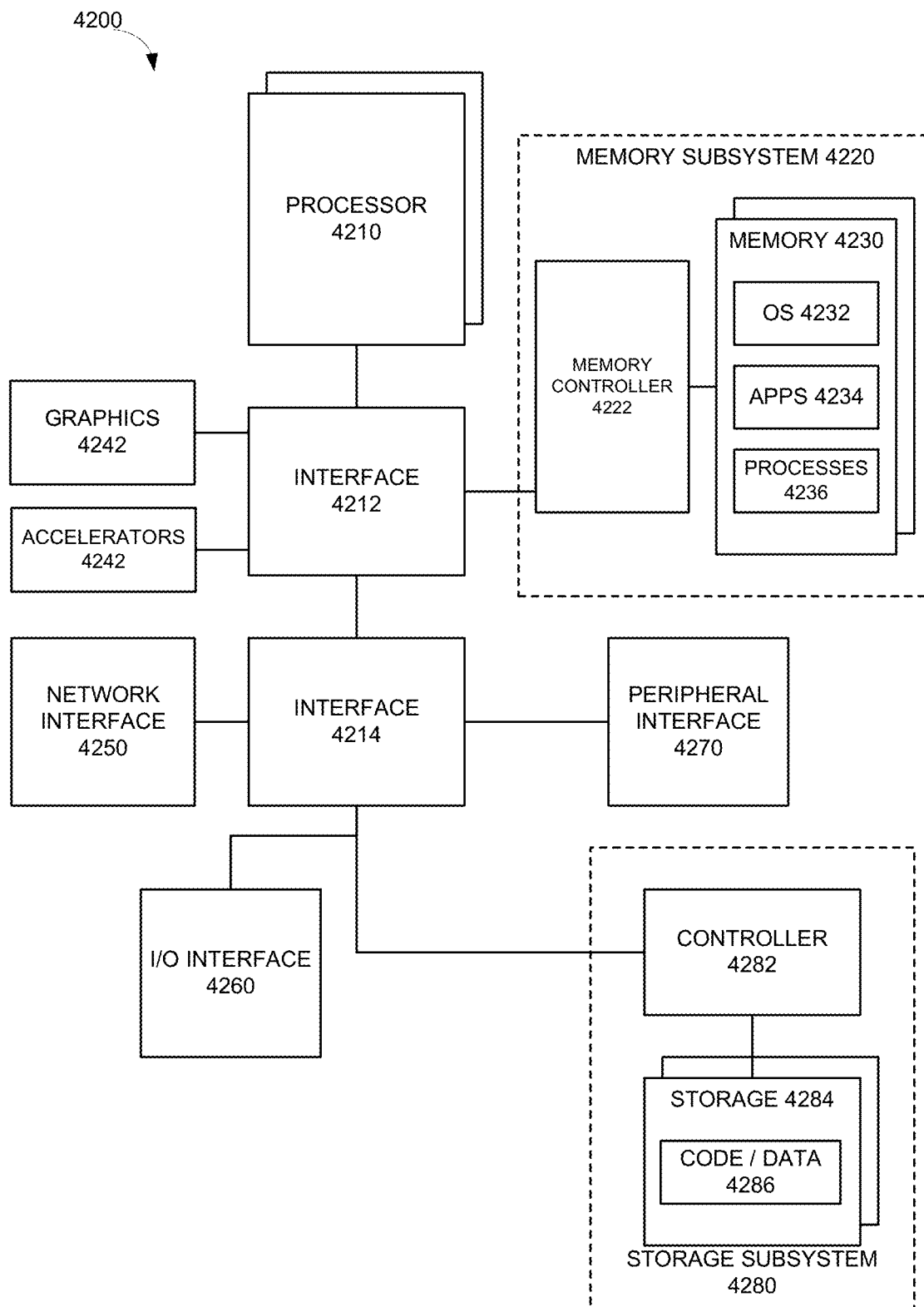
FIG. 42 depicts a system.

FIG. 42 depicts a system. Various embodiments can be used by system 4200 to utilize NEXT in accordance with embodiments described herein. System 4200 includes processor 4210, which provides processing, operation management, and execution of instructions for system 4200. Processor 4210 can include any type of microprocessor, central processing unit (CPU), graphics processing unit (GPU), processing core, or other processing hardware to provide processing for system 4200, or a combination of processors. Processor 4210 controls the overall operation of system 4200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices. In some examples, a NEXT is integrated into a processor 4210. In some examples, processor 4210 can include a NEXT. An XPU or xPU can refer to any processor include one or more of: an IPU, DPU, CPU, GPU, GPGPU, and so forth.

In one example, system 4200 includes interface 4212 coupled to processor 4210, which can represent a higher speed interface or a high throughput interface for system components that needs higher bandwidth connections, such as memory subsystem 4220 or graphics interface components 4240, or accelerators 4242. Interface 4212 represents an interface circuit, which can be a standalone component or integrated onto a processor die. Where present, graphics interface 4240 interfaces to graphics components for providing a visual display to a user of system 4200. In one example, graphics interface 4240 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 4240 generates a display based on data stored in memory 4230 or based on operations executed by processor 4210 or both. In one example, graphics interface 4240 generates a display based on data stored in memory 4230 or based on operations executed by processor 4210 or both.

Accelerators 4242 can be a fixed function or programmable offload engine that can be accessed or used by a processor 4210. For example, an accelerator among accelerators 4242 can provide compression (DC) capability, cryptography services such as public key encryption (PKE), cipher, hash/authentication capabilities, decryption, or other capabilities or services. In some embodiments, in addition or alternatively, an accelerator among accelerators 4242 provides field select controller capabilities as described herein. In some cases, accelerators 4242 can be integrated into a CPU socket (e.g., a connector to a motherboard or circuit board that includes a CPU and provides an electrical interface with the CPU). For example, accelerators 4242 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 4242 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 4220 represents the main memory of system 4200 and provides storage for code to be executed by processor 4210, or data values to be used in executing a routine. Memory subsystem 4220 can include one or more memory devices 4230 such as read-only memory (ROM), flash memory, one or more varieties of random access memory (RAM) such as DRAM, or other memory devices, or a combination of such devices. Memory 4230 stores and hosts, among other things, operating system (OS) 4232 to provide a software platform for execution of instructions in system 4200. Additionally, applications 4234 can execute on the software platform of OS 4232 from memory 4230. Applications 4234 represent programs that have their own operational logic to perform execution of one or more functions. Processes 4236 represent agents or routines that provide auxiliary functions to OS 4232 or one or more applications 4234 or a combination. OS 4232, applications 4234, and processes 4236 provide software logic to provide functions for system 4200. In one example, memory subsystem 4220 includes memory controller 4222, which is a memory controller to generate and issue commands to memory 4230. It will be understood that memory controller 4222 could be a physical part of processor 4210 or a physical part of interface 4212. For example, memory controller 4222 can be an integrated memory controller, integrated onto a circuit with processor 4210.

In some examples, OS 4232 can determine a capability of a device associated with a device driver. For example, OS 4232 can receive an indication of a capability of a device (e.g., NIC 4250 or a NEXT) to configure a NIC 4250 or NEXT to perform any embodiments described herein. OS 4232 can request a driver to enable or disable NIC 4250 or NEXT to perform any of the capabilities described herein. In some examples, OS 4232, itself, can enable or disable NIC 4250 or NEXT to perform any of the capabilities described herein. OS 4232 can provide requests (e.g., from an application or VM) to NIC 4250 to utilize one or more capabilities of NIC 4250 or NEXT. For example, any application can request use or non-use of any of capabilities described herein by NIC 4250 or NEXT.

While not specifically illustrated, it will be understood that system 4200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 4200 includes interface 4214, which can be coupled to interface 4212. In one example, interface 4214 represents an interface circuit, which can include standalone components and integrated circuitry. In one example, multiple user interface components or peripheral components, or both, couple to interface 4214. Network interface 4250 provides system 4200 the ability to communicate with remote devices (e.g., servers or other computing devices) over one or more networks. Network interface 4250 can include an Ethernet adapter, wireless interconnection components, cellular network interconnection components, USB (universal serial bus), or other wired or wireless standards-based or proprietary interfaces. Network interface 4250 can transmit data to a device that is in the same data center or rack or a remote device, which can include sending data stored in memory. Network interface 4250 can receive data from a remote device, which can include storing received data into memory. Various embodiments can be used in connection with network interface 4250, processor 4210, and memory subsystem 4220. Various embodiments of network interface 4250 use embodiments described herein to receive or transmit timing related signals and provide protection against circuit damage from misconfigured port use while providing acceptable propagation delay.

In one example, system 4200 includes one or more input/output (I/O) interface(s) 4260. I/O interface 4260 can include one or more interface components through which a user interacts with system 4200 (e.g., audio, alphanumeric, tactile/touch, or other interfacing). Peripheral interface 4270 can include any hardware interface not specifically mentioned above. Peripherals refer generally to devices that connect dependently to system 4200. A dependent connection is one where system 4200 provides the software platform or hardware platform or both on which operation executes, and with which a user interacts.

In one example, system 4200 includes storage subsystem 4280 to store data in a nonvolatile manner. In one example, in certain system implementations, at least certain components of storage 4280 can overlap with components of memory subsystem 4220. Storage subsystem 4280 includes storage device(s) 4284, which can be or include any conventional medium for storing large amounts of data in a nonvolatile manner, such as one or more magnetic, solid state, or optical based disks, or a combination. Storage 4284 holds code or instructions and data 4286 in a persistent state (e.g., the value is retained despite interruption of power to system 4200). Storage 4284 can be generically considered to be a "memory," although memory 4230 is typically the executing or operating memory to provide instructions to processor 4210. Whereas storage 4284 is nonvolatile, memory 4230 can include volatile memory (e.g., the value or state of the data is indeterminate if power is interrupted to system 4200). In one example, storage subsystem 4280 includes controller 4282 to interface with storage 4284. In one example controller 4282 is a physical part of interface 4214 or processor 4210 or can include circuits or logic in both processor 4210 and interface 4214.

A volatile memory is memory whose state (and therefore the data stored in it) is indeterminate if power is interrupted to the device. Dynamic volatile memory uses refreshing the data stored in the device to maintain state. One example of dynamic volatile memory includes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 4200. More specifically, power source typically interfaces to one or multiple power supplies in system 4200 to provide power to the components of system 4200. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 4200 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), Infinity Fabric (IF), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 43:
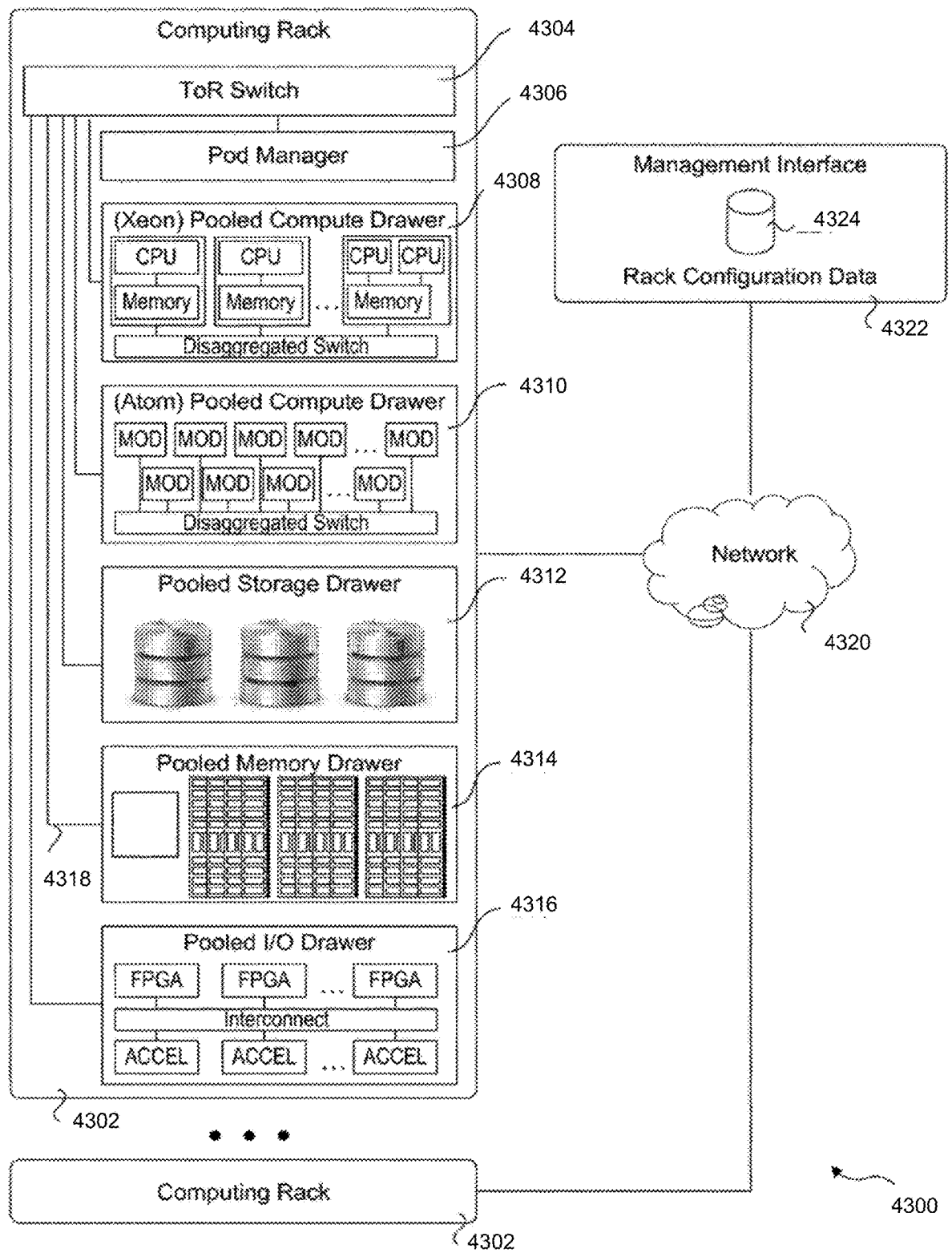
FIG. 43 depicts an environment.

FIG. 43 depicts an environment 4300 includes multiple computing racks 4302, each including a Top of Rack (ToR) switch 4304, a pod manager 4306, and a plurality of pooled system drawers. The environment can utilize NEXT or WAT in accordance with embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® processor pooled computer drawer 4308, and Intel® ATOM™ processor pooled compute drawer 4310, a pooled storage drawer 4312, a pooled memory drawer 4314, and a pooled I/O drawer 4316. Each of the pooled system drawers is connected to ToR switch 4304 via a high-speed link 4318, such as a Ethernet link and/or a Silicon Photonics (SiPh) optical link.

Multiple of the computing racks 4302 may be interconnected via their ToR switches 4304 (e.g., to a pod-level switch or data center switch), as illustrated by connections to a network 4320. In some embodiments, groups of computing racks 4302 are managed as separate pods via pod manager(s) 4306. In one embodiment, a single pod manager is used to manage all of the racks in the pod. Alternatively, distributed pod managers may be used for pod management operations.

Environment 4300 further includes a management interface 4322 that is used to manage various aspects of the environment. This includes managing rack configuration, with corresponding parameters stored as rack configuration data 4324. In an example, environment 4300 can be implemented using interconnected compute sleds of processors, memories, storages, network interfaces, and other components.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a system comprising: a processing unit package comprising: at least one core and at least one offload processing device communicatively coupled inline between the at least one core and a network interface controller, the at least one offload processing device configurable to perform packet processing.

Example 2 includes any example, wherein the interconnect includes one or more of: an Embedded Multi-die Interconnect Bridge (EMIB), interposer, System In Package (SiP), bridge, 2.5D integrated circuit, or 3D integrated circuit.

Example 3 includes any example, wherein the at least one offload processing device and the at least one core are to share use of at least one cache devices and share use of at least one memory device.

Example 4 includes any example, wherein the at least one offload processing device is to allow mapping of packet processing pipeline stages of networking applications among software running on the at least one core and the at least one offload processing device to permit flexible entry, exit, and re-entry points among the at least one core and the at least one offload processing device.

Example 5 includes any example, wherein a core is to offload to the at least one offload processing device one or more of: packet parsing, packet encryption, packet decryption, access control list, match-action activities, packet policing, or traffic management.

Example 6 includes any example, wherein the at least one offload processing device comprises a host interface manager (HIM), network interface manager (NIM), memory interface, packet processor, Flexible Packet Processor (FXP), traffic manager, internal memory, and at least one field programmable gate array (FPGA).

Example 7 includes any example, wherein the at least one offload processing device comprises a network interface manager (NIM) to perform descriptor translation from a descriptor provided by software executed on a core to a second descriptor format accepted by a network interface controller.

Example 8 includes any example, wherein the at least one offload processing device comprises a network interface manager (NIM) to access descriptor fields to perform load balancing of processing of packets by the offload processing device.

Example 9 includes any example, wherein the at least one offload processing device is to utilize at least two different priority level ring buffers to differentiate priority of packets based on placement of corresponding descriptors into a particular priority level ring buffer and wherein the at least one offload processing device is to access descriptors from a higher priority ring buffer more frequently than descriptors from a lower priority ring buffer.

Example 10 includes any example, wherein for packets received at a network interface controller (NIC), the offload processing device is to generate a descriptor with a corresponding buffer address and scatter gather list (SGL) and wherein a defined correspondence is utilized among positions of the descriptor in a ring, packet buffer address, and SGL buffer location.

Example 11 includes any example, wherein a core is to execute a user space application to bind a memory mapping between a network interface controller (NIC) and the at least one offload processing device to configure address translations to permit the NIC to access buffers within a memory allocated to the at least one offload processing device and a memory region allocated to a virtual execution environment.

Example 12 includes any example, wherein a network interface controller (NIC) is configured to access at least one buffer within a memory of the at least one offload processing device and access memory allocated to a virtual execution environment.

Example 13 includes any example, and includes an input-output memory management unit (IOMMU) Address Translation to provide address translation so that the NIC is capable to access at least one buffer within a memory of the at least one offload processing device and access memory allocated to a virtual execution environment.

Example 14 includes any example, wherein: at least one buffer within a memory of the at least one offload processing device is to store descriptors and at least one packet buffer and the memory region allocated to the virtual execution environment comprises at least one packet buffer.

Example 15 includes any example, wherein a core is to execute software that is to bind specified queue pairs associated with a network interface controller (NIC) to specified queue pairs associated with the at least one offload processing device so that packets arriving at the NIC to a target queue pair are accessible to the at least one offload processing device from the target queue pair.

Example 16 includes any example, wherein a core is to execute software that is to bind specified queue pairs associated with a network interface controller (NIC) to specified queue pairs associated with the at least one offload processing device so that packets processed by the at least one offload processing device and accessible at a source queue pair are accessible to the NIC from the source queue pair.

Example 17 includes any example, comprising a network interface controller (NIC) that, in response to a received packet, is to provide a first descriptor referencing a header of the received packet to the at least one offload processing device to process the header and a second descriptor referencing a payload of the received packet to a buffer accessible to a virtualized execution environment to process the payload.

Example 18 includes any example, comprising a network interface controller (NIC) and wherein, in response to a request to transmit a packet by a virtualized execution environment, the virtualized execution environment is to provide a first descriptor referencing a header of the packet to the at least one offload processing device to process the header and the at least one offload processing device is to provide a second descriptor referencing a payload of the packet to the NIC to cause transmission of the packet using a header provided by the at least one offload processing device and a payload.

Example 19 includes any example, comprising a network interface controller (NIC) to perform pre-classification of a packet and create programmable descriptors to provide pre-classification information to the at least one offload processing device.

Example 20 includes any example, wherein the at least one offload processing device virtualized to permit multiple applications to utilize the at least one offload processing device.

Example 21 includes any example, wherein the at least one offload processing device is programmable to autonomously perform traffic management at least for 5G User Plane Function (UPF)-related packets, wherein traffic management comprises one or more of: packet-to-queue mapping, congestion management, and transmission scheduling.

Example 22 includes any example, wherein the at least one core and the at least one offload processing device are to perform operations of 5G User Plane Function (UPF) and wherein operations of 5G UPF comprise one or more of: packet routing and forwarding, packet inspection, QoS handling, traffic usage reporting and other related functions.

Example 23 includes any example, wherein the at least one core and the at least one offload processing device are to perform operations of Next Generation Firewall (NGFW), wherein operations of NGFW comprise one or more of: packet decryption, packet encryption, intrusion detection and prevention, deep packet inspection, application identification, threat detection, virtual private network (VPN) management, transport layer security (TLS) handling, proxy, or Gateway/Routing and forwarding functions.

Example 24 includes any example, wherein the at least one offload processing device is programmable to autonomously process the 5G packets, identify and extract the 5G quality of service (QOS) information, enforce the 5G QOS requirements at User Equipment (UE) level and perform 5G QOS scheduling to meet the latency and performance requirements across multiple class of service (CLOS).

Example 25 includes any example, and includes at least one computer-readable medium, comprising instructions stored thereon, that if executed by at least one processor, cause the at least one processor to: execute a driver to configure a processing unit complex package to utilize at least one offload engine, wherein the complex package comprises at least one offload processing device communicatively coupled inline between at least one core and a network interface controller, the at least one offload processing device configurable to perform packet processing by the driver.

Example 26 includes any example, wherein the at least one offload processing device is to allow mapping of packet processing pipeline stages of networking applications among software running on the at least one core and the at least one offload processing device to permit flexible entry, exit, and re-entry points among the at least one core and the at least one offload processing device.

The invention claimed is:

1. A system comprising:
   a processing unit package comprising:
      at least one core and
      at least one offload processing device communicatively coupled inline between the at least one core and a network interface controller, the at least one offload processing device configurable to perform packet processing, wherein a packet received by a network interface controller (NIC) is associated with a descriptor and a scatter gather list (SGL) and wherein the SGL is to identify one or more buffers that store the packet.

2. The system of claim 1, wherein the processing unit package comprises an interconnect that includes one or more of: an Embedded Multi-die Interconnect Bridge (EMIB), interposer, System In Package (SiP), bridge, 2.5D integrated circuit, or 3D integrated circuit and wherein the interconnect is coupled to the at least one core and the at least one offload processing device.

3. The system of claim 1, wherein the at least one offload processing device and the at least one core are to share use of at least one cache device and share use of at least one memory device.

4. The system of claim 1, wherein the at least one offload processing device is to map packet processing pipeline stages of networking applications among software running on the at least one core and the at least one offload processing device to permit flexible entry, exit, and re-entry points among the at least one core and the at least one offload processing device.

5. The system of claim 1, wherein a core of the at one core is to offload to the at least one offload processing device one or more of: packet parsing, packet encryption, packet decryption, access control list, match-action activities, packet policing, or traffic management.

6. The system of claim 1, wherein the at least one offload processing device comprises one or more of: a host interface manager (HIM), network interface manager (NIM), memory interface, packet processor, Flexible Packet Processor (FXP), traffic manager, internal memory, and at least one field programmable gate array (FPGA).

7. The system of claim 1, wherein the at least one offload processing device comprises a network interface manager (NIM) that is to perform descriptor translation from a descriptor provided by software executed on a core of the at one core to a second descriptor format accepted by a network interface controller.

8. The system of claim 1, wherein the at least one offload processing device comprises a network interface manager (NIM) that is to access descriptor fields to perform load balancing of processing of packets by the at least one offload processing device.

9. The system of claim 1, wherein the at least one offload processing device is to utilize at least two different priority level ring buffers to differentiate priority of packets based on placement of corresponding descriptors into a particular priority level ring buffer and wherein the at least one offload processing device is to access descriptors from a higher priority ring buffer more frequently than descriptors from a lower priority ring buffer.

10. The system of claim 1, wherein positions of the descriptor in a ring, a packet buffer address, and SGL buffer location have a defined correspondence.

11. The system of claim 1, wherein a core of the at one core is to execute a user space application to bind a memory mapping between a network interface controller (NIC), wherein the at least one offload processing device comprises a memory, and wherein the at least one offload processing device to configure address translations to permit the NIC to access buffers within the memory allocated to the at least one offload processing device and a memory region allocated to a virtual execution environment.

12. The system of claim 1, comprising a network interface controller (NIC), wherein the at least one offload processing device comprises a memory and wherein the NIC is configured to access at least one buffer within the memory of the at least one offload processing device and access memory allocated to a virtual execution environment.

13. The system of claim 12, wherein the at least one offload processing device comprises a memory and comprising:
an input-output memory management unit (IOMMU) Address Translation to provide address translation so that the NIC is capable to access at least one buffer within a memory of the at least one offload processing device and access memory allocated to a virtual execution environment.

14. The system of claim 1, wherein:
the at least one offload processing device comprises a memory;
at least one buffer within the memory of the at least one offload processing device is to store descriptors and at least one packet buffer; and
a memory region allocated to a virtual execution environment comprises at least one packet buffer.

15. The system of claim 1, wherein a core of the at one core is to execute software that is to bind queue pairs associated with a network interface controller (NIC) to queue pairs associated with the at least one offload processing device so that packets arriving at the NIC to a target queue pair are accessible to the at least one offload processing device from the target queue pair.

16. The system of claim 1, wherein a core of the at one core is to execute software that is to bind queue pairs associated with a network interface controller (NIC) to queue pairs associated with the at least one offload processing device so that packets processed by the at least one offload processing device and accessible at a source queue pair are accessible to the NIC from the source queue pair.

17. The system of claim 1, comprising a network interface controller (NIC) that, in response to receipt of the packet, is to provide a first descriptor referencing a header of the received packet to the at least one offload processing device to process the header and a second descriptor referencing a payload of the received packet to a buffer accessible to a virtualized execution environment to process the payload.

18. The system of claim 1, comprising a network interface controller (NIC) and wherein, in response to a request to transmit a packet by a virtualized execution environment, the virtualized execution environment is to provide a first descriptor referencing a header of the packet to the at least one offload processing device to process the header and the at least one offload processing device is to provide a second descriptor referencing a payload of the packet to the NIC to cause transmission of the packet using a header provided by the at least one offload processing device and a payload.

19. The system of claim 1, comprising a network interface controller (NIC) to perform pre-classification of the packet and create descriptors to provide pre-classification information to the at least one offload processing device.

20. The system of claim 1, wherein the at least one offload processing device is virtualized to permit multiple applications to utilize the at least one offload processing device.

21. The system of claim 1, wherein the at least one offload processing device is programmable to autonomously perform traffic management at least for 5G User Plane Function (UPF)-related packets, wherein traffic management comprises one or more of: packet-to-queue mapping, congestion management, and transmission scheduling.

22. The system of claim 1, wherein the at least one core and the at least one offload processing device are to perform operations of 5G User Plane Function (UPF) and wherein operations of 5G UPF comprise one or more of: packet routing and forwarding, packet inspection, QoS handling, traffic usage reporting and other related functions.

23. The system of claim 1, wherein the at least one core and the at least one offload processing device are to perform operations of Next Generation Firewall (NGFW), wherein operations of NGFW comprise one or more of: packet decryption, packet encryption, intrusion detection and prevention, deep packet inspection, application identification, threat detection, virtual private network (VPN) management, transport layer security (TLS) handling, proxy, or Gateway/Routing and forwarding functions.

24. The system of claim 1, wherein the at least one offload processing device is programmable to autonomously process 5G packets, identify and extract 5G quality of service (QOS) information, enforce 5G QOS requirements at User Equipment (UE) level and perform 5G QOS scheduling to meet latency and performance requirements across multiple class of service (CLOS).

25. At least one non-transitory computer-readable medium, comprising instructions stored thereon, that if executed by at least one processor, cause the at least one processor to:
execute a driver to configure a processing unit complex package to utilize at least one offload engine, wherein the complex package comprises at least one offload processing device communicatively coupled inline between at least one core and a network interface controller, the at least one offload processing device configurable to perform packet processing by the driver, wherein a packet received by a network interface controller (NIC) is associated with a descriptor and a scatter gather list (SGL) and wherein the SGL is to identify one or more buffers that store the packet.

26. The at least one non-transitory computer-readable medium of claim 25, wherein the at least one offload processing device is to allow mapping of packet processing pipeline stages of networking applications among software running on the at least one core and the at least one offload processing device to permit flexible entry, exit, and re-entry points among the at least one core and the at least one offload processing device.

* * * * *

UNITED STATES PATENT AND TRADEMARK OFFICE
CERTIFICATE OF CORRECTION

| | |
|---|---|
| PATENT NO. | : 12,026,116 B2 |
| APPLICATION NO. | : 17/134361 |
| DATED | : July 2, 2024 |
| INVENTOR(S) | : Patrick G. Kutch et al. |

It is certified that error appears in the above-identified patent and that said Letters Patent is hereby corrected as shown below:

In the Claims

Claim 1: "wherein a packet received by a network interface controller (NIC) is associated with a descriptor and a scatter gather list (SGL) and wherein the SGL is to identify one or more buffers that store the packet." should read wherein a packet received by the network interface controller (NIC) is associated with a descriptor and a scatter gather list (SGL) and wherein the SGL is to identify one or more buffers that store the packet.

Signed and Sealed this
Fifteenth Day of October, 2024

*Katherine Kelly Vidal*

Katherine Kelly Vidal
*Director of the United States Patent and Trademark Office*